(12) United States Patent
Fujita

(10) Patent No.: US 8,287,047 B2
(45) Date of Patent: Oct. 16, 2012

(54) VEHICLE SEAT AND VEHICLE SEAT EVALUATION METHOD

(75) Inventor: Etsunori Fujita, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 249 days.

(21) Appl. No.: 12/159,219

(22) PCT Filed: Nov. 30, 2006

(86) PCT No.: PCT/JP2006/323899
§ 371 (c)(1),
(2), (4) Date: Sep. 25, 2008

(87) PCT Pub. No.: WO2007/077699
PCT Pub. Date: Jul. 12, 2007

(65) Prior Publication Data
US 2009/0051206 A1 Feb. 26, 2009

(30) Foreign Application Priority Data

Dec. 28, 2005 (JP) ................................. 2005-378662
Jan. 23, 2006 (JP) ................................. 2006-014485
Apr. 22, 2006 (JP) ................................. 2006-118593

(51) Int. Cl.
*A47C 7/02* (2006.01)
(52) U.S. Cl. .......... 297/452.49; 297/452.55; 297/452.56
(58) Field of Classification Search ............. 297/452.49, 297/452.5, 452.55, 452.56, 452.52
See application file for complete search history.

(56) References Cited

U.S. PATENT DOCUMENTS

| | | | | |
|---|---|---|---|---|
| 5,624,161 A * | 4/1997 | Sorimachi et al. | ........ | 297/452.52 |
| 6,158,815 A * | 12/2000 | Sugie et al. | .............. | 297/452.61 |
| 7,090,300 B2 * | 8/2006 | Fujita | ........................ | 297/452.49 |
| 7,275,793 B2 * | 10/2007 | Fujita et al. | .............. | 297/452.56 |
| 7,731,294 B2 * | 6/2010 | Yasuda et al. | ............ | 297/452.56 |
| 2004/0256905 A1 | 12/2004 | Fujita | | |
| 2006/0055225 A1 | 3/2006 | Yasuda et al. | | |
| 2007/0236071 A1 | 10/2007 | Fujita et al. | | |

FOREIGN PATENT DOCUMENTS

| | | |
|---|---|---|
| JP | 2005 7078 | 1/2005 |
| JP | 2005 287935 | 10/2005 |
| WO | 2004 026080 | 4/2004 |

* cited by examiner

*Primary Examiner* — Sarah B McPartlin
(74) *Attorney, Agent, or Firm* — Oblon, Spivak, McClelland, Maier & Neustadt, L.L.P.

(57) ABSTRACT

A vehicle seat allowing to improve a vibration absorption characteristic, securing a stable seating posture, having high vehicle operability, and allowing to alleviate fatigue due to long time seating. In a seat cushion of a vehicle seat, a first human body support portion having a center at a position corresponding to a substantially center between the pair of ischial tuberosities of a human body, and a second human body support portion corresponding to the vicinities of femoral bases of a human body and having a center at a position located forward at a horizontal distance of 100 mm along a longitudinally center line of the seat cushion from the first human body support portion are regarded respectively as spring elements, and static spring constants and dynamic spring constants thereof are set to a predetermined relationship. Thus, stability and vibration absorbency during static seating are improved.

25 Claims, 70 Drawing Sheets

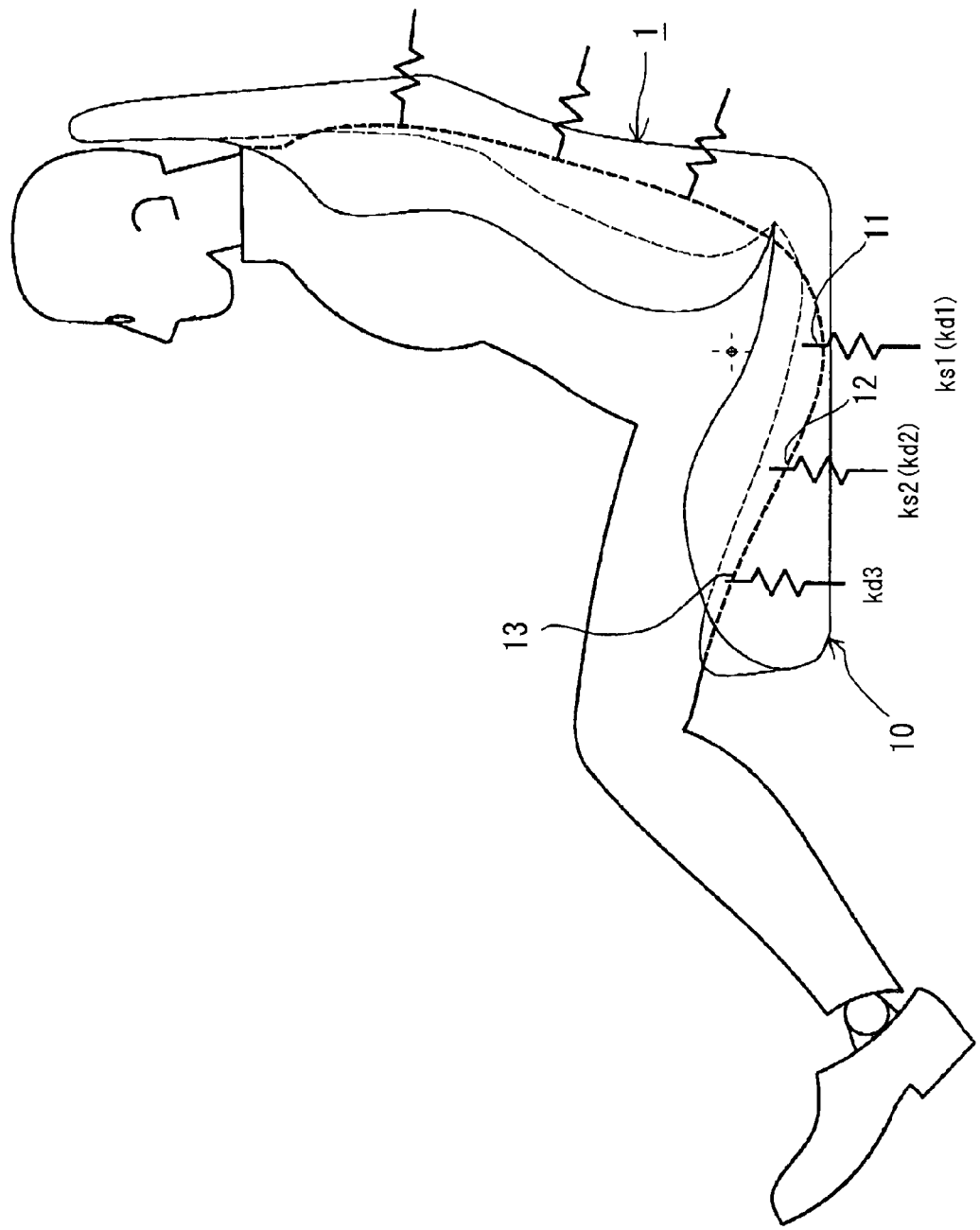

| Frequency (Hz) | EXAMPLE 1 kd2/kd1 | EXAMPLE 1 kd3/kd2 | EXAMPLE 1 kd3/kd1 | COMPARATIVE EXAMPLE 1 kd2/kd1 | COMPARATIVE EXAMPLE 1 kd3/kd2 | COMPARATIVE EXAMPLE 1 kd3/kd1 |
|---|---|---|---|---|---|---|
| 4 | 2.10 | 1.16 | 2.44 | 0.66 | 0.74 | 0.49 |
| 5 | 2.16 | 1.41 | 3.05 | 0.68 | 0.82 | 0.55 |
| 6 | 2.04 | 1.46 | 2.98 | 0.72 | 0.80 | 0.58 |
| 7 | 2.09 | 1.09 | 2.28 | 0.74 | 0.75 | 0.56 |
| 8 | 1.59 | 1.47 | 2.34 | 0.72 | 0.71 | 0.52 |
| 9 | 1.41 | 1.68 | 2.37 | 0.64 | 0.80 | 0.51 |
| 10 | 1.13 | 2.10 | 2.37 | 0.86 | 0.80 | 0.69 |

- ●— EXAMPLE 1 − kd2/kd1    --●-- COMPARATIVE EXAMPLE 1 − kd2/kd1
- ○— EXAMPLE 1 − kd3/kd2    --○-- COMPARATIVE EXAMPLE 1 − kd3/kd2
- ▲— EXAMPLE 1 − kd3/kd1    --▲-- COMPARATIVE EXAMPLE 1 − kd3/kd1

| FREQUENCY (Hz) | EXAMPLE 2 kd2/kd1 | EXAMPLE 2 kd3/kd2 | EXAMPLE 2 kd3/kd1 | COMPARATIVE EXAMPLE 2 kd2/kd1 | COMPARATIVE EXAMPLE 2 kd3/kd2 | COMPARATIVE EXAMPLE 2 kd3/kd1 |
|---|---|---|---|---|---|---|
| 4 | 1.38 | 1.15 | 1.59 | 0.73 | 0.72 | 0.53 |
| 5 | 1.64 | 1.86 | 3.06 | 0.89 | 0.63 | 0.57 |
| 6 | 2.39 | 1.74 | 4.16 | 0.76 | 0.75 | 0.58 |
| 7 | 1.58 | 1.76 | 2.79 | 0.79 | 0.71 | 0.56 |
| 8 | 1.02 | 2.12 | 2.16 | 0.77 | 0.63 | 0.49 |
| 9 | 1.37 | 2.53 | 3.47 | 0.74 | 0.82 | 0.61 |
| 10 | 1.32 | 2.70 | 3.55 | 0.78 | 0.86 | 0.67 |

F I G. 14
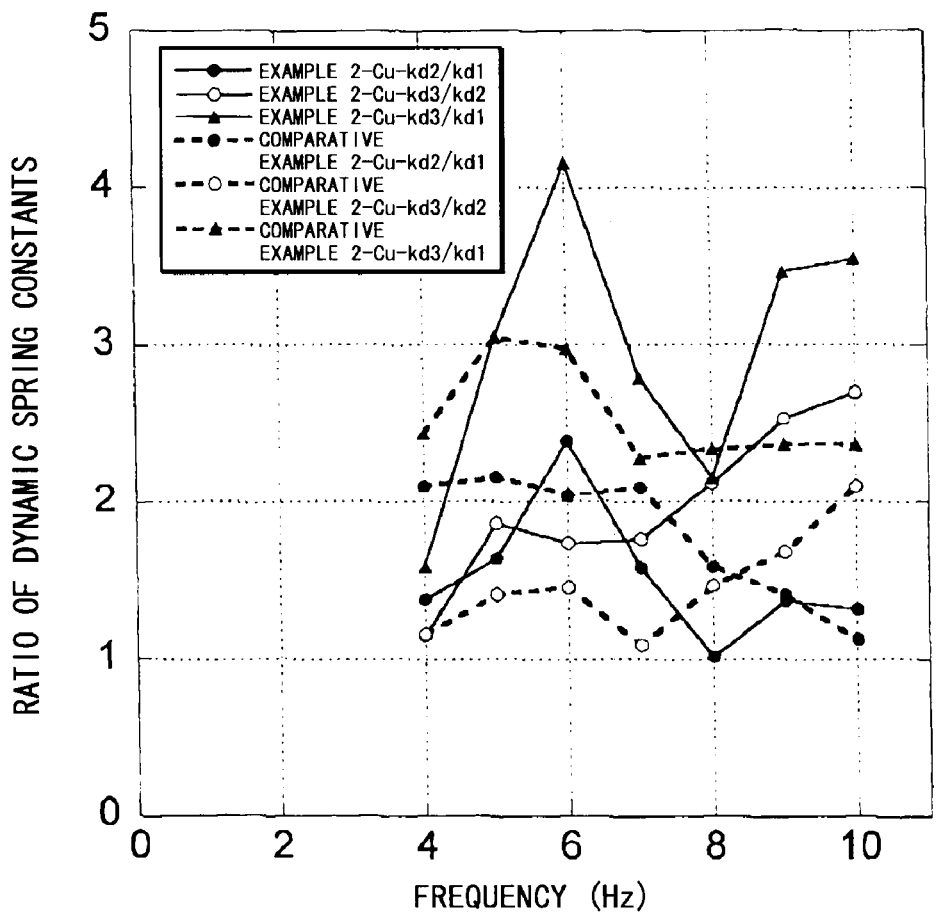
| FREQUENCY (Hz) | EXAMPLE 2 kd2/kd1 | EXAMPLE 2 kd3/kd2 | EXAMPLE 2 kd3/kd1 | EXAMPLE 1 kd2/kd1 | EXAMPLE 1 kd3/kd2 | EXAMPLE 1 kd3/kd1 |
|---|---|---|---|---|---|---|
| 4 | 1.38 | 1.15 | 1.59 | 2.10 | 1.16 | 2.44 |
| 5 | 1.64 | 1.86 | 3.06 | 2.16 | 1.41 | 3.05 |
| 6 | 2.39 | 1.74 | 4.16 | 2.04 | 1.46 | 2.98 |
| 7 | 1.58 | 1.76 | 2.79 | 2.09 | 1.09 | 2.28 |
| 8 | 1.02 | 2.12 | 2.16 | 1.59 | 1.47 | 2.34 |
| 9 | 1.37 | 2.53 | 3.47 | 1.41 | 1.68 | 2.37 |
| 10 | 1.32 | 2.70 | 3.55 | 1.13 | 2.10 | 2.37 |

| FREQUENCY (Hz) | EXAMPLE 2 (SEAT OF TEST EXAMPLE 2-4) kd2/kd1 | EXAMPLE 2 (SEAT OF TEST EXAMPLE 2-4) kd3/kd2 | EXAMPLE 2 (SEAT OF TEST EXAMPLE 2-4) kd3/kd1 |
|---|---|---|---|
| 4 | 4.36 | 1.18 | 5.17 |
| 5 | 5.21 | 1.32 | 6.89 |
| 6 | 2.49 | 1.31 | 3.27 |
| 7 | 1.21 | 1.22 | 1.48 |
| 8 | 1.13 | 1.22 | 1.38 |
| 9 | 1.13 | 1.17 | 1.32 |
| 10 | 1.10 | 1.16 | 1.27 |

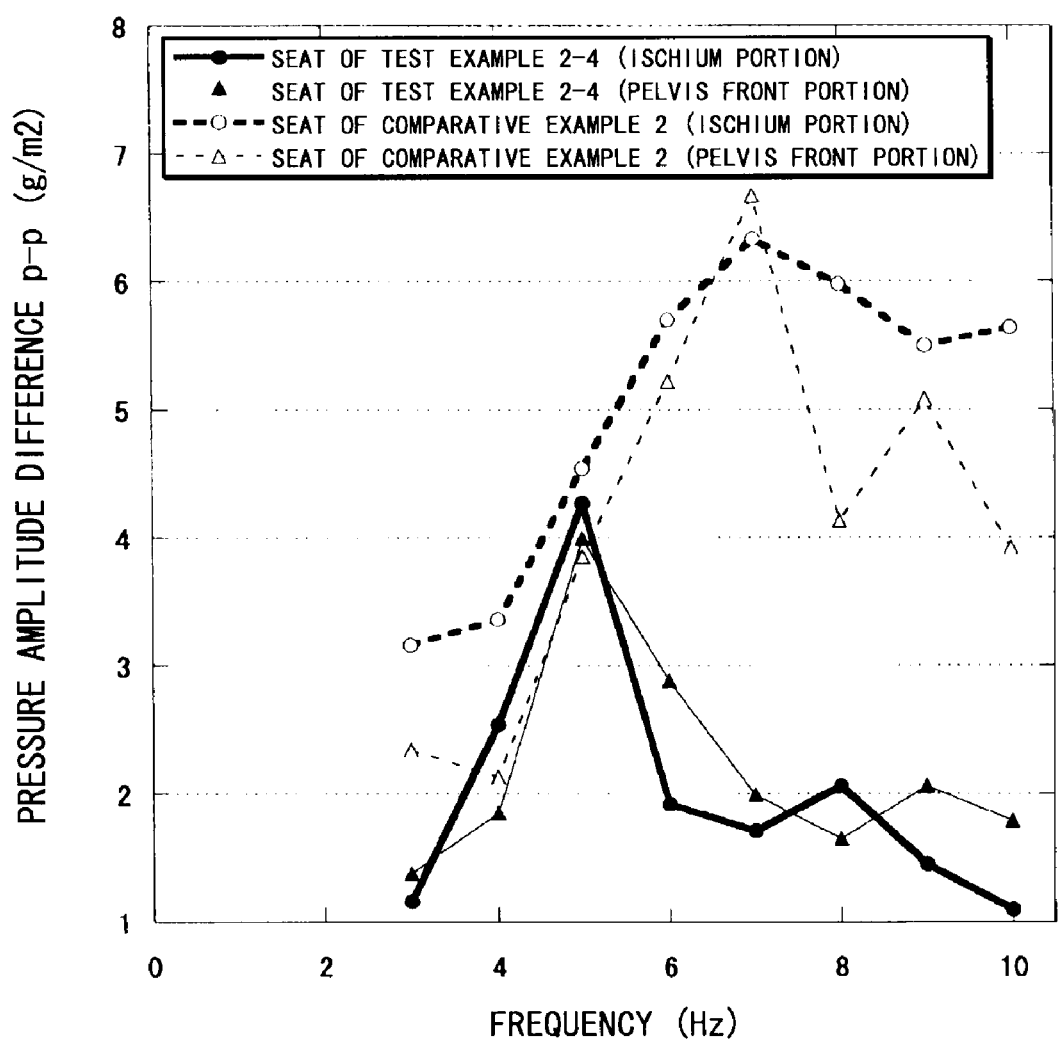
F I G. 1 8

F I G. 2 7
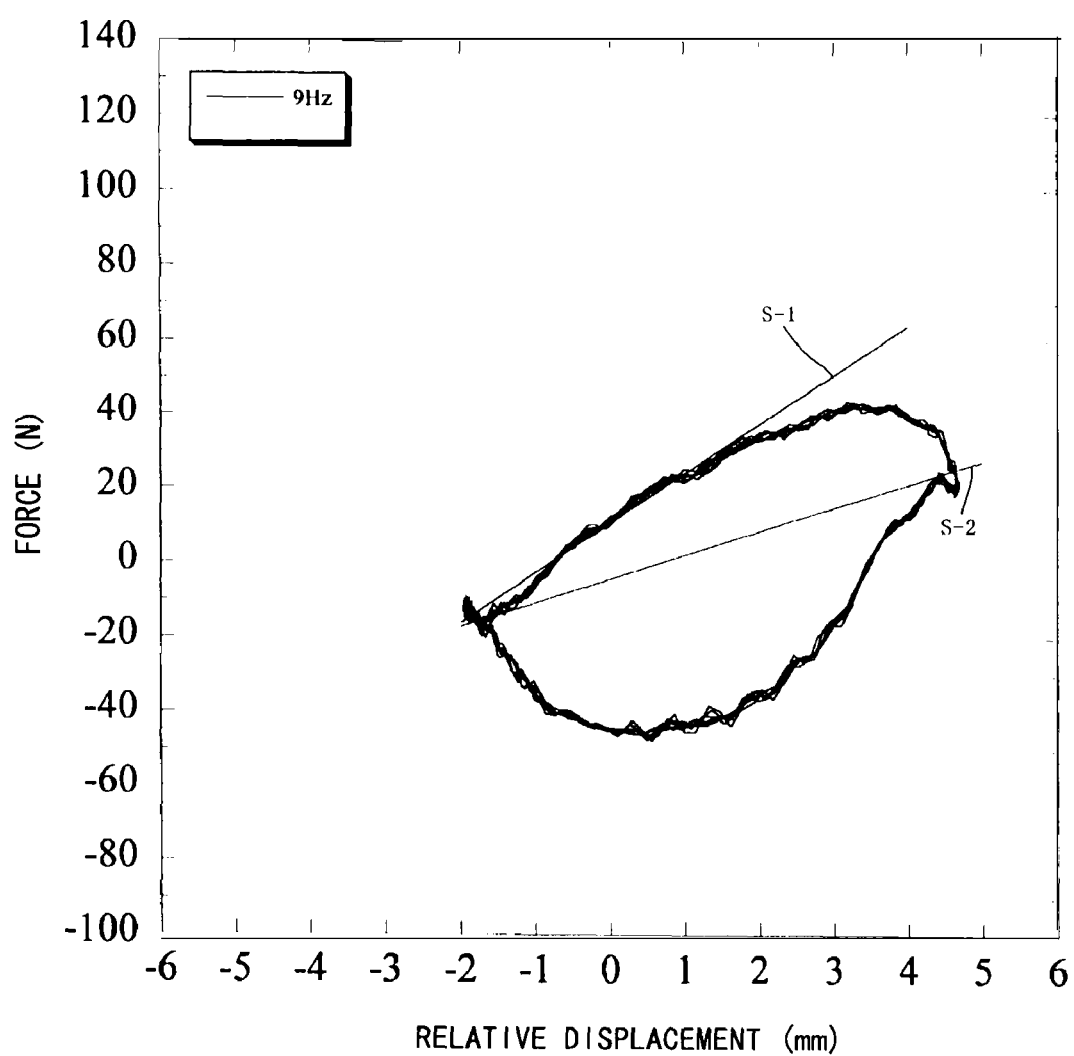

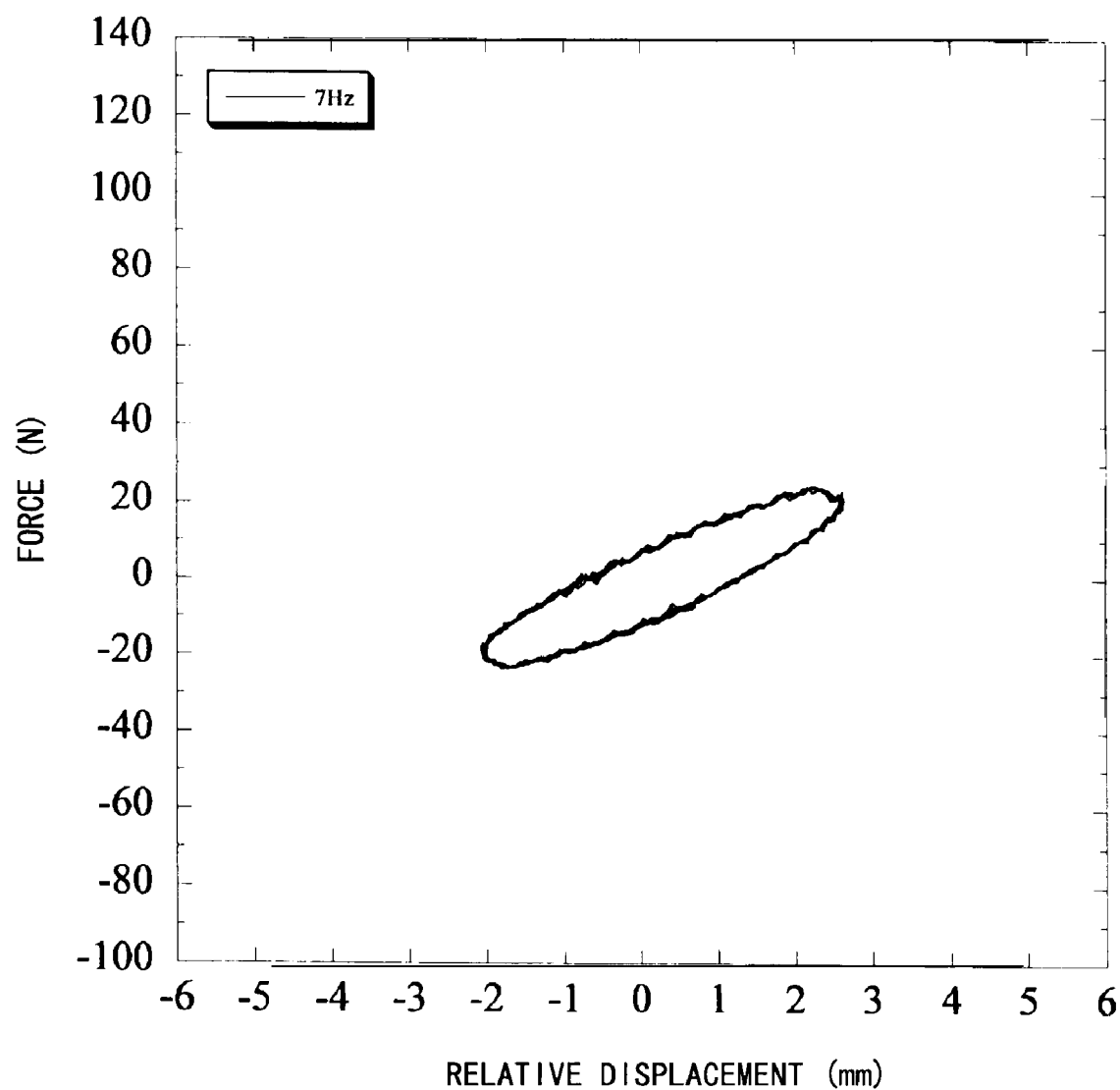
F I G. 35

F I G. 3 7
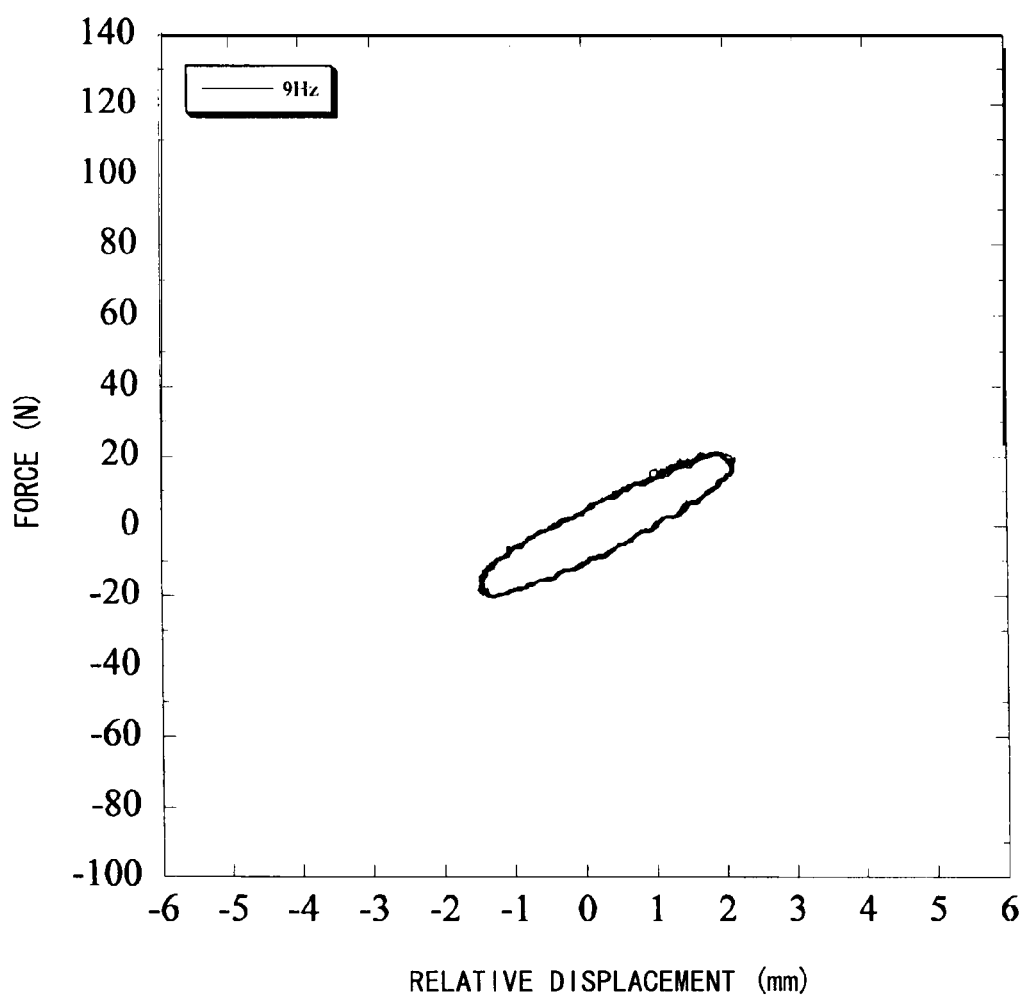

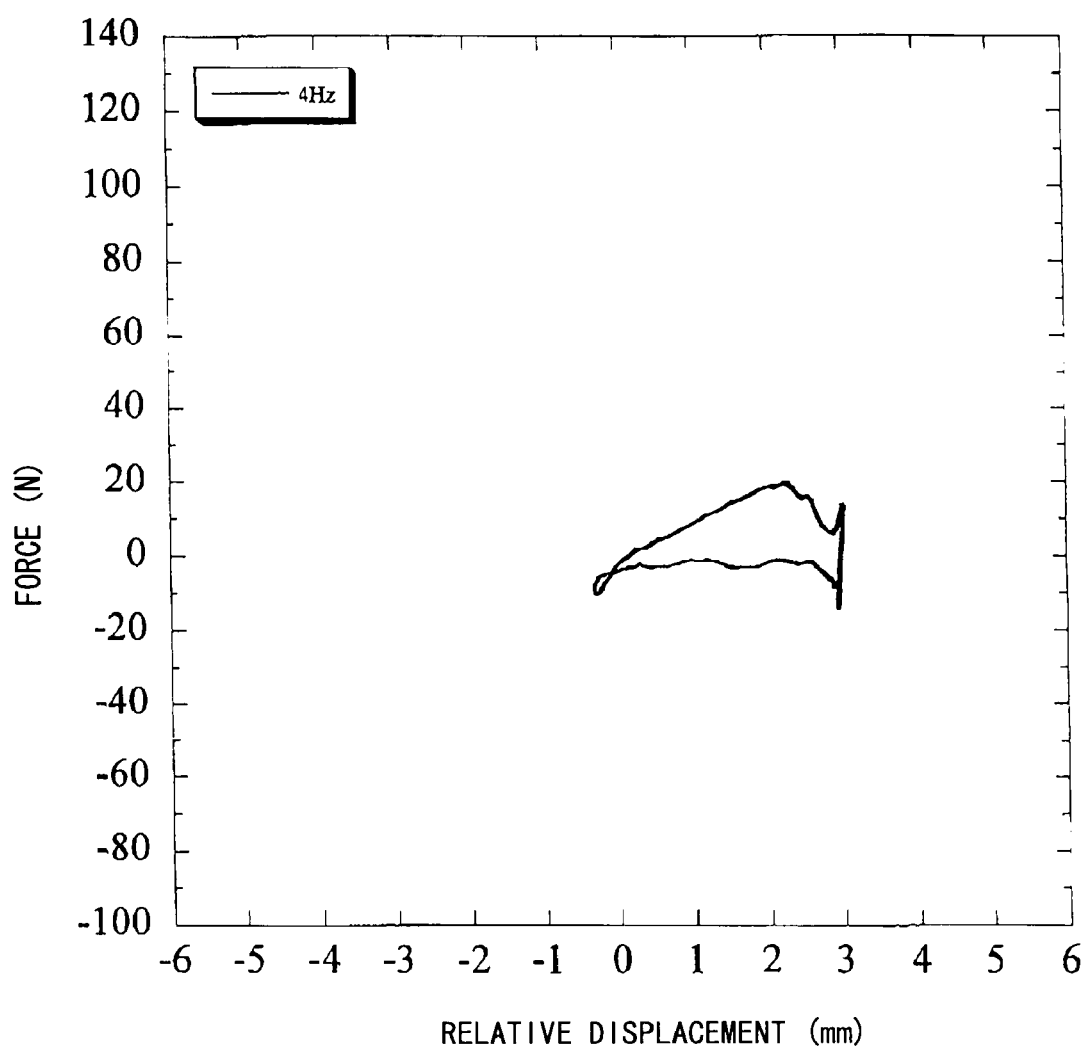
F I G. 4 2

F I G. 5 0
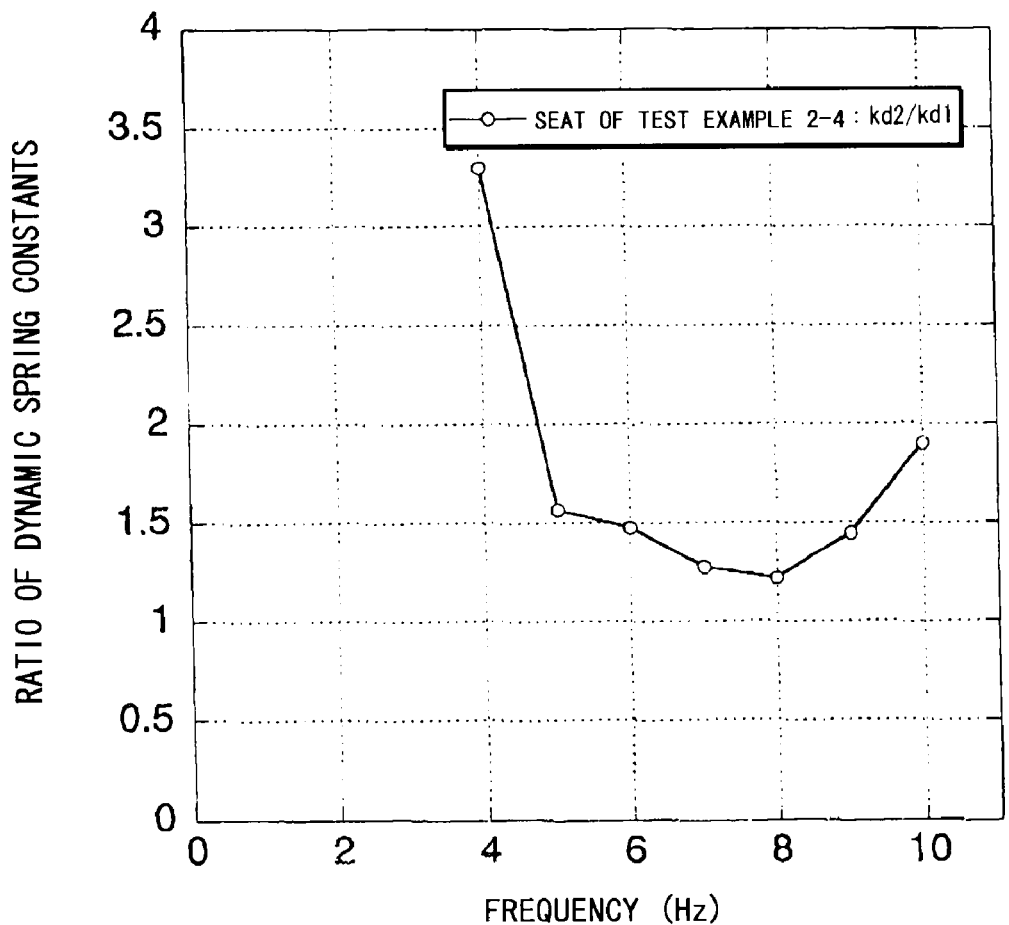

F I G. 6 2 A
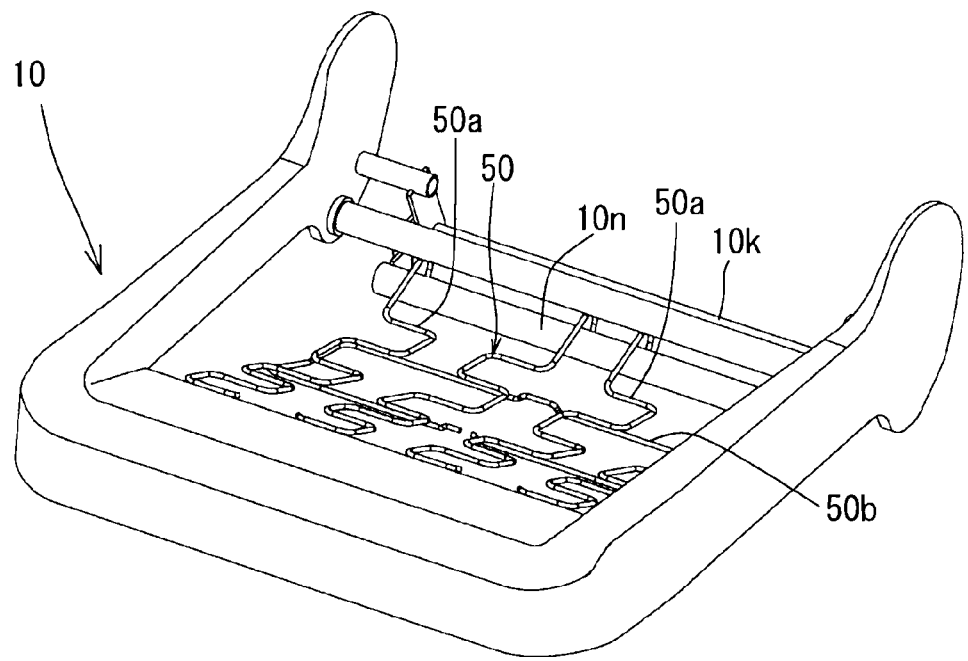
F I G. 6 2 B
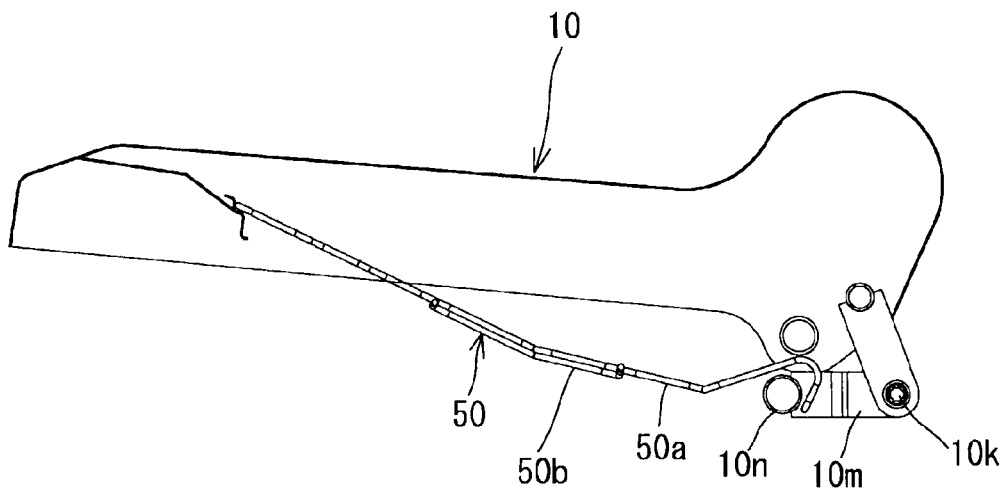

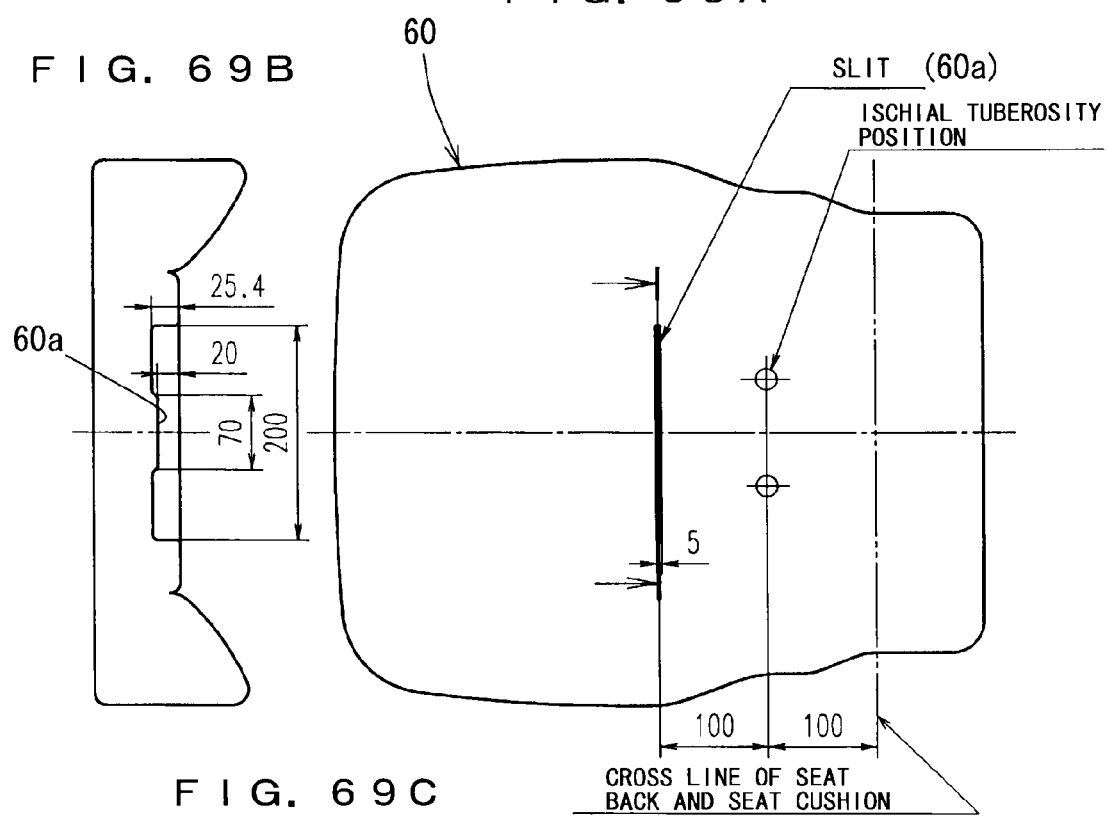
FIG. 69A
FIG. 69B
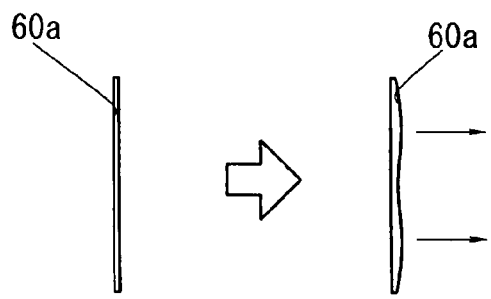
FIG. 69C

F I G. 7 4 A
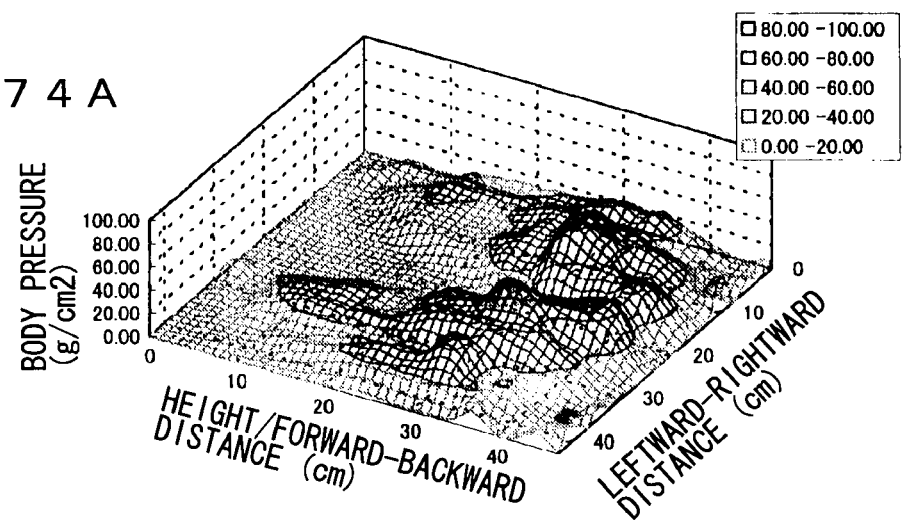
F I G. 7 4 B
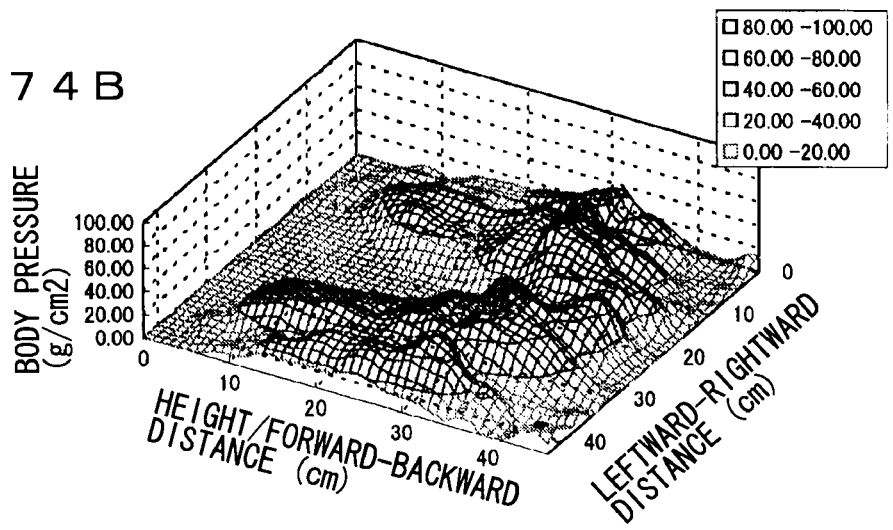

VEHICLE SEAT AND VEHICLE SEAT EVALUATION METHOD

TECHNICAL FIELD

The present invention relates to a vehicle seat for automobiles, aircrafts, trains, ships, forklifts, and the like, and a vehicle seat evaluation method.

BACKGROUND ART

As a method of evaluating the performance of a seat, there are performed pressing a predetermined portion by a pressure board, obtaining a relationship between force (load) and a displacement (bending) at this moment, and thereby obtaining a spring constant (static spring constant) as an elasticity characteristic of the portion, or there are performed mounting a weight on a predetermined portion, applying vibration in a state of being stable by its own weight, drawing on a Lissajous figure a relationship between a load working on the weight (F=ma (m is mass of the weight, a is acceleration generated on the weight by vibration) and a relative displacement of the weight, and obtaining the static spring constant from inclination in the Lissajous figure. On the other hand, for evaluating vibration damping performance, there is performed obtaining a spring constant (dynamic spring constant) as a dynamic elasticity characteristic from the static spring force and damping force.

When evaluating seating performance, it is preferable to use a pressure board or weight that is close to a human model, and it is based on evaluation using a pressure board or weight with the size corresponding to the range of a diameter of approximately 100 mm (diameter of 98 mm precisely) around a portion below the ischial tuberosities to be the apex of a body pressure distribution, that is, the size corresponding to one of the buttocks or one of the femurs of a human. Further, the mass of a weight when measuring the dynamic spring constant is based on a mass corresponding to pressure in the range of a diameter of approximately 100 mm (diameter of 98 mm precisely) around the portion below the ischial tuberosities.

Then, when evaluating a seat on the assumption that the feeling of support when a person is seated on the seat cushion is determined by whether sufficient support can be obtained or not in the portion below the ischial tuberosities, evaluation using the pressure board or weight with the diameter of 98 mm is regarded as important for both the static spring constant and the dynamic spring constant, and in the evaluation data, both the static spring constant and the dynamic spring constant are typically set to be highest in the portion located below the ischial tuberosities and to decrease toward a front side of the seat cushion, such as decreasing in order of the portion corresponding to the vicinities of femoral bases and the portion corresponding from the vicinities of substantially centers of the femurs to the vicinities of the backs of knees. Specifically, seat designing is based on increasing the supportability for a human body by setting to high values the static spring constant and the dynamic spring constant below the ischial tuberosities corresponding to the barycentric position of a human body. However, since the seat having such a structure has a large dynamic spring constant below the ischial tuberosities, it has a drawback in that the influence of vibration inputted via members (cushion member, frame member, and the like) arranged below the ischial tuberosities is large.

In view of such point, the present inventor has suggested in Patent document 1 a seat in which spring members having different spring constants are coupled in series to thereby make the static spring constant of a human body support portion (spring element) below the ischial tuberosities to be small, and thereby make the dynamic spring constant to be small as well. According to this structure, the influence of vibration transmitted via the members arranged below the ischial tuberosities becomes small.

Patent document 1: Japanese Patent Application Laid-open No. 2005-7078

DISCLOSURE OF THE INVENTION

Problems to be Solved by the Invention

However, although the static spring constant and the dynamic spring constant of the human body support portion below the ischial tuberosities are small, the seat disclosed in Patent document 1 has no difference from the above-described general seat in that both the static spring constant and the dynamic spring constant decreases toward the front side of the seat cushion along the longitudinally center line, such as decreasing in order of the portion corresponding to the vicinities of femoral bases and the portion corresponding from the vicinities of substantially centers of the femurs to the vicinities of the backs of knees, which is not described clearly in Patent document 1. Further, for such kind of seat, as a contrivance to alleviate the sense of discomfort by a frame to the backs of knees, although not clearly described in patent document 1, it is often adopted a structure supporting from substantially center portions of femurs to the vicinities of the backs of knees with a relatively soft urethane member. However, even when such a urethane member is disposed, the vicinities of the backs of knees, where the peripheral nervous system and peripheral circulation system exist and thus being sensitive, are pressed by reaction force due to compression, and this may discomfort the occupant and further cause increase in fatigue. Thus it is necessary to use a further softer urethane member, but the softer it is, the more the feeling of hitting the backs of knees by the frame increases. As a countermeasure thereto, it is conceivable to thicken the urethane member, but in this way the degree of pressing the backs of knees increases again. Therefore, it has been a situation that a compromise has to be made with a member having a certain degree of softness and thickness.

On the other hand, when the static spring constant and the dynamic spring constant below the ischial tuberosities are made small, the ratio of shared loads supported by side frames of the seat cushion becomes relatively high, and high frequency vibration may then be inputted to the side of a femur or the side of a buttock via a side frame. Further, posture instability may be induced due to slipping of the buttocks. To improve the sense of fatigue, there has been room for improvement in posture instability and absorption characteristic of the high frequency vibration.

The present invention is made in view of the above situation, and an object thereof is to provide a vehicle seat allowing to improve a vibration absorption characteristic further, securing a stable seating posture, allowing to improve operability of pedals for a driver's seat, and thereby alleviating fatigue due to long time seating. Further, an object of the present invention is to provide an evaluation method for determining whether or not it is a vehicle seat able to achieve securing of a high vibration absorption characteristic and a stable seating posture and to alleviate fatigue due to long time seating.

Means for Solving the Problems

To solve the above problems, as a result of dedicated studies, the present inventor has obtained the following knowledge. Specifically, first, for the static spring constant evaluating the feeling of support in a static seating state in the portion below the ischial tuberosities that is the barycentric position of a human, evaluation with a pressure board having a diameter of 200 mm, ranging from a buttock to a middle portion of a femur of a human, is regarded as important rather than evaluation with the pressure board with a diameter of 98 mm, and attention is focused on the point that if the static spring constant below the ischial tuberosities is high in this evaluation, sufficient feeling of support can be obtained when a person is actually seated thereon. Further, given that evaluation is performed on a characteristic of absorbing impacting vibration of large amplitude and low frequency by generating an inverse phase in the portion below the ischial tuberosities with the femurs covered by muscle being the fulcrum using a dynamic spring constant, which is an evaluation index for an individual portion with respect to vibration by a weight with a diameter of 98 mm, and on a characteristic of damping high frequency vibration by a damping characteristic such that the spring constant of an outer layer member (corresponding to a shallow-layer spring member among spring members constituting the seat cushion) with elastic compliance matching with the muscle of a femur is exhibited by a characteristic with a constant substantially close to zero (zero spring characteristic), it is considered that when predetermined conditions are satisfied in this evaluation, a structure able to improve both the vibration absorption characteristic in a low frequency oscillation region and the vibration absorption characteristic in a high frequency damping region can be provided. Specifically, with respect to support of a posture, high frequency/small amplitude/high acceleration input, and impacting low frequency/large amplitude/high acceleration input, it is needed to allow a plurality of spring members set in the seat cushion to function in different conditions and combinations respectively rather than to function always in the same way. As a result, it is possible to provide a seat capable of improving two contradicting characteristics, the improvement in vibration absorption characteristics for both the oscillation region and the damping region and the attainment of the aforementioned statically stable feeling of seating.

Further, for improving pressing against femurs and operability of pedals, it is considered to use one having high surface rigidity and spring constant as a cushion member (pad member such as urethane) arranged in the vicinity of the backs of knees, so that it is not deformed easily in the pressing direction by a small applied load. However, in this state, it also becomes a characteristic to hinder motion of a leg for operating a pedal. Thus, regarding a urethane with high rigidity and a high spring constant, it is considered to give a start of pivoting to this urethane arranged on a front edge of the seat cushion by component force in a forward/backward direction from the force generated by motion of a leg, and to allow pivoting by component force in the barycentric direction, thereby making the urethane move to the place where it does not disturb the motion of the leg by operating a pedal. Thus, by integrating the aforementioned points, a seat that causes less fatigue can be made.

Specifically, the present invention provides a vehicle seat including a plurality of spring members and a seat cushion supporting a human body by operation of the spring members, the vehicle seat having a structure such that when a first human body support portion having a center at a position corresponding to a substantially center between the pair of ischial tuberosities of a human body in the seat cushion, and a second human body support portion having a center at a position located forward at a horizontal distance of 100 millimeters along a longitudinally center line of the seat cushion from the first human body support portion are regarded respectively as spring elements made by operation of the plurality of spring members, a dynamic spring constant $kd1$ of the first human body support portion and a dynamic spring constant $kd2$ of the second human body support portion have a relationship of $kd1<kd2$ and are set so that the second human body support portion becomes a fulcrum of motion during vibration damping operation, and when excitation force of input vibration changes, a spring member that functions dominantly thereby switches in the plurality of spring members, and the dynamic spring constants $kd1$, $kd2$ change.

According to another feature of the present invention, a human body support portion with a center at a position located forward at a horizontal distance of 200 millimeters along the longitudinal center line of the seat cushion from the first human body support portion is a third human body support portion, and a dynamic spring constant thereof is $kd3$, wherein the dynamic spring constants satisfy a relationship of $kd1<kd2<kd3$, and are also set to values which satisfy conditional expressions:

$$1 \leq kd2/kd1 \leq 6,$$

$$1 \leq kd3/kd2 \leq 3, \text{ and}$$

$$1 \leq kd3/kd1 \leq 7.$$

The present invention further provides a vehicle seat, in which the dynamic spring constants are values each obtained by matching a center of a weight with a diameter of 98 millimeters with a center of each of the human body support portions and applying vibration at a predetermined frequency with a state that the weight is stable.

The present invention further provides a vehicle seat in which static spring constants, obtained from a load-displacement characteristic when a center of a pressure board with a diameter of 200 millimeters is matched with the center of each of the human body support portions and pressure is applied, are $ks1>ks2$, where $ks1$ is a static spring constant of the first human body support portion, and $ks2$ is a static spring constant of the second human body support portion.

The present invention further provides a vehicle seat in which the center of the first human body support portion is set forward at a horizontal distance in a range of 50 millimeters to 150 millimeters from a border between a seat back and the seat cushion along the longitudinally center line of the seat cushion.

The present invention further provides a vehicle seat in which the center of the first human body support portion is set to a position located forward at a horizontal distance of 100 millimeters from a border between a seat back and the seat cushion along the longitudinally center line of the seat cushion.

The present invention further provides a vehicle seat in which the seat cushion is structured including a flat support member stretched elastically in a forward/backward direction and in a leftward/rightward direction.

The present invention further provides a vehicle seat in which the seat cushion is structured having a flat support member stretched elastically in a forward/backward direction, and an auxiliary flat support member stacked on the flat support member and provided to be stretched in a leftward/rightward direction so that a substantially center portion of a rear end edge is located at a position between 50 millimeters and less than 100 millimeters along the longitudinally center line of the seat cushion from the center of the first human body support portion, in which the center of the first human body support portion is located on the flat support member and the center of the second human body support portion is located in a range where the flat support member and the auxiliary flat support member are stacked.

The present invention further provides a vehicle seat in which a rear edge portion of the flat support member is coupled to a rear spring member disposed on a rear portion of the seat cushion.

The present invention further provides a vehicle seat in which the rear spring member is a torsion bar arranged along a width direction of the seat cushion, and a rear edge portion of the flat support member is coupled to a support frame coupled to an arm member attached to the torsion bar.

The present invention further provides a vehicle seat in which the rear spring member is a coil spring engaged with a rear end frame arranged on a rear end of the seat cushion.

The present invention further provides a vehicle seat further including a front spring member provided in a front portion of the seat cushion by engaging with a front edge portion of the flat support member so as to support elastically the flat support member together with the rear spring member.

The present invention further provides a vehicle seat in which the front spring member is a torsion bar arranged along a width direction of the seat cushion, and a front edge portion of the flat support member is coupled to a support frame coupled to an arm member attached to the torsion bar.

The present invention further provides a vehicle seat in which on each of side edge portions of the flat support member, side spring members are disposed, which are hooked across each of the side edge portions and each of side frames of the seat cushion, and a combined spring constant of all the side spring members is higher than a combined spring constant of the rear spring member.

The present invention further provides a vehicle seat according to any one of claims 8 to 14, in which on each of side edge portions of the auxiliary flat support member, side spring members are disposed, which are hooked across each of the side edge portions and each of side frames of the seat cushion, and a combined spring constant of all the side spring members is higher than a combined spring constant of the rear spring member.

The present invention further provides a vehicle seat in which among the side spring members, at least a side spring member disposed closest to a rear end of the seat cushion is disposed at a position corresponding to a region between the center of the first human body support portion and the center of the second human body support portion.

The present invention further provides a vehicle seat, further including a urethane member disposed on an upper portion of the flat support member on a front edge portion of the seat cushion, in which the center of the third human body support portion is located in a range where the urethane member is disposed.

The present invention further provides a vehicle seat in which the urethane member is provided rotatably forward.

The present invention further provides a vehicle seat in which a three-dimensional knitted fabric covering the urethane member disposed on the flat support member and the front edge portion of the seat cushion is supported on a cushion frame constituting the seat cushion with an extension ratio of 5% or lower in an equilibrium state during seating.

The present invention further provides a vehicle seat according to any one of claims 1 to 6, in which the seat cushion is structured having a flat spring member and a urethane member disposed on an upper portion of the flat spring member, in which the urethane member has a slit carved with a predetermined depth with a width direction of the seat cushion being a longitudinal direction thereof, at a position between 50 millimeters and less than 100 millimeters along the longitudinally center line of the seat cushion from the center of the first human body support portion, and in which the center of the first human body support portion is located closer to a rear portion than the slit, and the center of the second human body support portion is located closer to a front portion than the slit.

The present invention further provides a vehicle seat according to claim 20, in which a rear edge portion of the flat spring member is coupled to a rear spring member disposed on a rear portion of the seat cushion.

The present invention further provides a vehicle seat in which the slit is formed with a length of 160 millimeters to 240 millimeters substantially perpendicularly to the longitudinally center line of the seat cushion, and a depth of the slit in a vicinity of a substantially center in a longitudinal direction is shallower than in vicinities of both ends thereof.

The present invention further provides a vehicle seat in which the depth of the slit in the vicinity of the substantially center in the longitudinal direction is in a range of 18 millimeters to 30 millimeters, and depths in the vicinities of the both ends thereof are in a range of 23 millimeters to 50 millimeters.

The present invention further provides a vehicle seat in which the slit has a width in a range of 2 millimeters to 20 millimeters.

The present invention further provides a vehicle seat according to claim 22, in which the slit has a width in a range of 3 millimeters to 10 millimeters.

The present invention further provides a vehicle seat in which a portion of the urethane member that includes a third human body support portion around a position located forward at a horizontal distance of 200 millimeters along the longitudinally center line of the seat cushion from the first human body support portion is provided rotatably forward.

The present invention further provides a vehicle seat in which a separation slit is formed on a border between a portion including a third human body support portion around a position located forward at a horizontal distance of 200 millimeters along the longitudinally center line of the seat cushion from the first human body support portion and a portion including the second human body support portion, and the portion including the third human body support portion is rotatable forward with the separation slit being a border.

The present invention further provides a vehicle seat in which a barycenter of the portion including the third human body support portion is set on a more front side than a center of forward rotation of the portion.

The present invention further provides a vehicle seat in which a seat angle of the seat cushion is set between a range of 20 degrees to 28 degrees.

Effects of the Invention

A vehicle seat according to the present invention includes a plurality of spring members and a seat cushion supporting a human body by operation of the spring members, and in the vehicle seat, when a first human body support portion having a center at a position corresponding to a substantially center between the pair of ischial tuberosities of a human body in the seat cushion, and a second human body support portion having a center at a position located forward at a horizontal distance of 100 millimeters along a longitudinally center line of the seat cushion from the first human body support portion are regarded respectively as spring elements made by operation of the plurality of spring members, a dynamic spring constant kd1 of the first human body support portion and a dynamic spring constant kd2 of the second human body support portion have a relationship of kd1<kd2 under the vibration condition such that excitation force thereof is substantially equal to excitation force working on each of the first human body support portion and the second human body support portion due to input vibration in a state that a person is seated and are set so that the second human body support portion becomes a fulcrum of motion during vibration damping operation. Accordingly, when excitation force of input vibration changes, a spring member that functions dominantly thereby switches in the plurality of spring members, and the dynamic spring constants kd1, kd2 change.

Concretely, the plurality of spring members are structured including a spring member, such as an outer layer member or a flat support member, which works when pressed in a thickness direction when coming into contact with a human body and has a quite soft, static spring constant, that is a so-called "zero spring characteristic", a characteristic such that there is almost no increase in load in a certain bending range and the static spring constant does not change substantially in the range (hereinafter called "shallow-layer spring member"), a spring member which has high linearity and functions mainly when making the dynamic spring constant of the second human body support portion (hereinafter called "middle-layer spring member"), and a spring member which exhibits, together with spring force, damping force by a phase difference in a gravitational direction and in an anti-gravitational direction and functions mainly when making the dynamic spring constant of the first human body support portion (hereinafter called "deep-layer spring member").

Specifically, when vibration is inputted, there is a difference in easiness of transmitting vibration between the portion where the pelvis including ischial tuberosities having bone projections is located and the portion where the femurs covered by muscle are located, depending on inherent vibration frequencies of respective portions of a human body. Specifically, input vibration at a low frequency with a large displacement amount becomes vibration shaking the entire trunk, and hence the first human body support portion as a spring element located below the ischial tuberosities just under the barycenter and having a low dynamic spring constant mainly operates to damp the low frequency vibration. That is, elasticity of the spring member determining the dynamic spring constant kd1 of the first human body support portion supporting a portion below the ischial tuberosities mainly operates to damp such low frequency vibration. On the other hand, when high frequency vibration with a small displacement amount is inputted, the human body support portion supporting from the femoral bases to substantially center portions of femurs (or the vicinities of the backs of knees) can easily be influenced by vibration. Further, since the load mass is smaller than the first human body support portion supporting the portion below the ischial tuberosities, the dynamic spring constant kd2 (and kd3) including viscous damping and Coulomb friction force is not influenced by the deep-layer spring member that dominantly functions when making the dynamic spring constant kd1 of the human body support portion supporting the portion below the ischial tuberosities, and with the middle-layer spring member operating dominantly, it becomes higher than the dynamic spring constant kd1. Then, in the human body support portion supporting from the vicinities of femurs to substantially middle portions of femurs (or the vicinities of the backs of knees), the middle layer spring member and the shallow layer spring member operate dominantly, and the vicinities of femurs are supported by the dynamic spring constants kd2, kd3. Therefore, as compared to a conventional structure in which the dynamic spring constant of the human body support portion under the femurs is smaller than the dynamic spring constant of the human body support portion for the ischial tuberosities, the ratio of a shared load supported by the human body support portion as the spring element under the femurs becomes large. On the other hand, due to presence of support for the vicinities of femurs, sinking in the gravitational direction is limited particularly to a narrow range below the ischial tuberosities, not to the entire buttocks, and thus the ratio of shared loads supported by side frames becomes small, thereby alleviating the influence of high frequency vibration inputted to the side portions of femurs and/or the side portions of buttocks. Therefore, according to the present invention, the vibration absorption characteristic in a wide region from low frequency to high frequency is improved.

Further, in the vehicle seat of the present invention, when vibration is inputted during traveling, the entire femurs from the vicinities of femoral bases to the vicinities of the backs of knees are supported by the human body support portion with the dynamic spring constants kd2, kd3, backward tilting of the pelvis can be prevented. Since the dynamic spring constants kd2, kd3 operating dominantly on the femurs with small load masses have strong linearity and large restoring force, displacement in a pressing direction by vertical movement of the pelvic plane due to the motion of the lower limb when operating a pedal is suppressed small. Since the pedal operating motion is performed accompanying pivoting in the forward/backward direction of a front edge portion of the seat cushion, partial pressing on the backs of knees by bending of the front edge portion of the seat cushion is suppressed, and the influence on the muscle of femurs by seating pressure is alleviated, that is, bending of the muscle of the backs of knees becomes smaller, thereby decreasing the displacement amount due to pressing of muscle. Accordingly, when applied to a driver's seat, legs or femurs are allowed to move like sliding on the surface of the seat cushion, and thus the operability of pedals improves, thereby contributing to alleviation of fatigue.

Further, the static spring constant when applying pressure by a pressure board with a diameter of 200 mm on the first human body support portion corresponding to the portion under the ischial tuberosities is set to be larger than that of the second human body support portion. The size of the pressure board being the diameter of 200 mm causes that, besides operation of the spring member determining the spring characteristic of the first human body support portion corresponding to the portion below the ischial tuberosities, the spring member of the second human body support portion operates at a position corresponding to the vicinities of femoral bases, and the spring characteristic in the first human body support portion and the spring characteristic in the second human body support portion operate in parallel. Thus, ks1 becomes higher than ks2, and the portion below the ischial tuberosities can be supported adequately. Therefore, the present invention can realize a stable seating posture also in a static seating state.

BRIEF DESCRIPTION OF DRAWINGS

FIG. 1 is a conceptual diagram showing a vehicle seat according to one embodiment of the present invention;

FIG. 14 is a graph showing dynamic spring constants of the seat cushions of the vehicle seats according to the example 1 and the example 2;

FIG. 18 is a graph showing a pressure vibration difference with respect to a vibration frequency measured for the seat of the example 2 (using thin leather with a thickness of 0.8 mm used as an outer layer member used in the test example 2-4) and the seat of the comparative example 2;

FIG. 27 is a Lissajous figure at 9 Hz when the weight is set to the first human body support portion and measurement is performed in the test example 2-6;

FIG. 35 is a Lissajous figure when the weight is set to the second human body support portion and vibration is applied with one-side amplitude of 1 mm (vertical peak-to-peak amplitude of 2 mm) at 7 Hz in the test example 2-7;

FIG. 37 is a Lissajous figure when the weight is set to the second human body support portion and vibration is applied with one-side amplitude of 1 mm (vertical peak-to-peak amplitude of 2 mm) at 9 Hz in the test example 2-7;

FIG. 42 is a Lissajous figure when the weight is set to the second human body support portion and vibration is applied with one-side amplitude of 2.5 mm (vertical peak-to-peak amplitude of 5 mm) at 4 Hz in the test example 2-7;

FIG. 50 is a graph showing ratios kd3/kd2 of the dynamic spring constants of FIG. 49;

FIG. 62A, FIG. 62B are views showing a schematic structure of a seat cushion of a vehicle seat according to example 3;

FIG. 69A to FIG. 69 C are diagrams for explaining a structure of a slit formed in the seat cushion of the vehicle seat according to the example 5 to the example 7;

FIG. 74A is a graph showing a body pressure distribution on the seat cushion of the example 8, FIG. 74B is a graph showing a body pressure distribution on the seat cushion of the example 3.

EXPLANATION OF NUMERALS AND SYMBOLS

Figure 2:
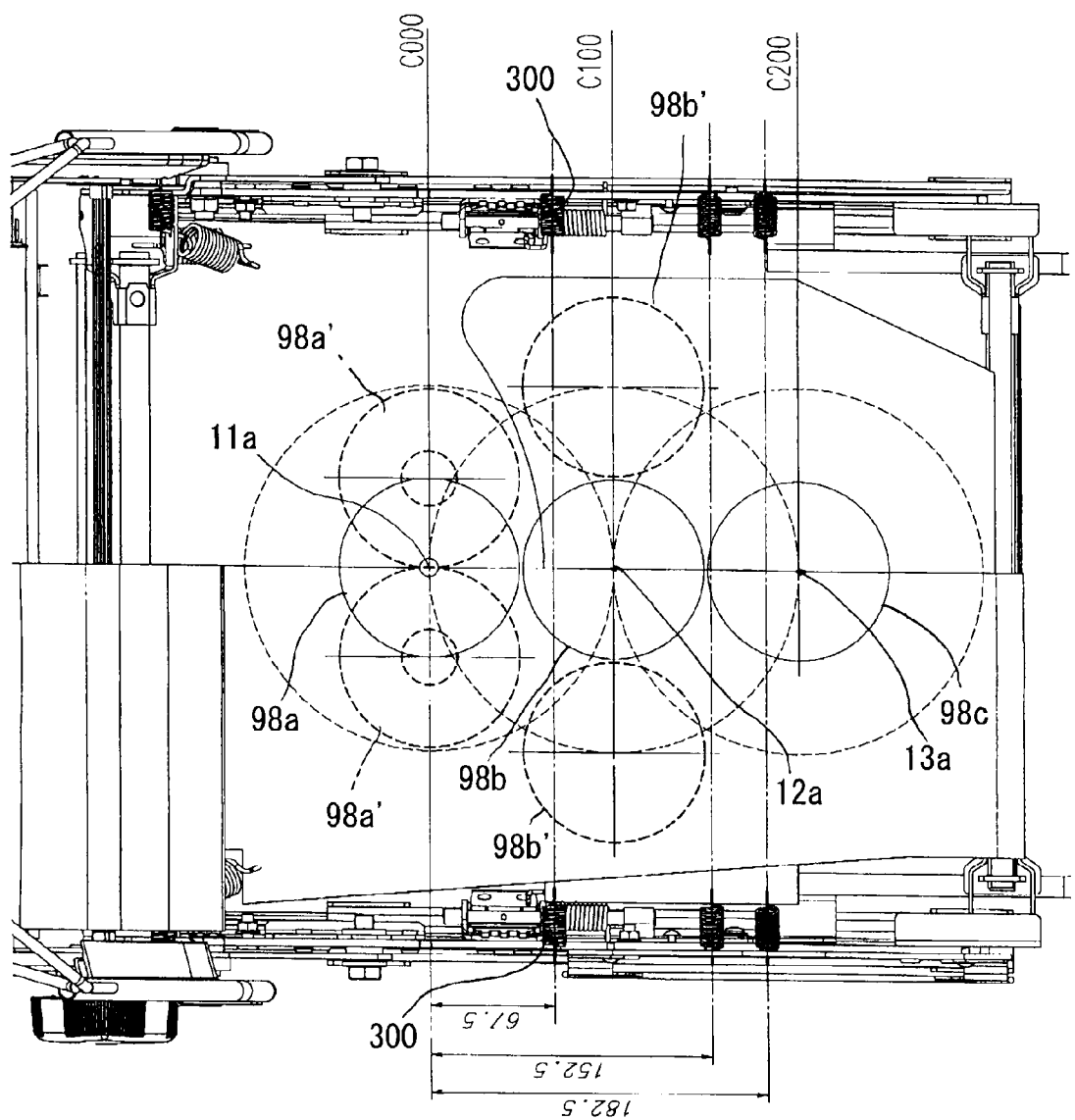
FIG. 2 is a plan view of a seat cushion for explaining a position of a first human body support portion, second human body support portion, third human body support portion.

1 vehicle seat
10 seat cushion 11 first human body support portion
12 second human body support portion
13 third human body support portion
20 flat support member
25 urethane member
30 coil spring (rear spring member)
31 coil spring (side spring member)
300 side spring member
40 auxiliary flat support member
50 flat spring member
60 urethane member
60a, 60b slit
61 rear pad
62 middle pad
63 front pad

BEST MODE FOR CARRYING OUT THE INVENTION

Hereinafter, the present invention will be explained in further detail based on the drawings. FIG. 1 is a diagram for explaining a structure of the present invention. As shown in this diagram, the present invention is significantly characterized in that, in a seat cushion 10 of a vehicle seat 1, a first human body support portion 11 having a center at a position corresponding to a substantially center between the pair of ischial tuberosities of a human body, and a second human body support portion 12 corresponding to the vicinities of femoral bases of a human body and having a center at a position located forward at a horizontal distance of 100 mm along a longitudinally center line of the seat cushion 10 from the first human body support portion 11 are regarded respectively as spring elements, and the spring characteristics thereof are set as follows.

Specifically, first, normal spring constants (called "static spring constants" for clarifying the difference from "dynamic spring constants" defined by the resultant force of damping force and spring force in this description) used when evaluating feeling of seating are set to ks1>ks2, where ks1 is the static spring constant of the first human body support portion 11, and ks2 is the static spring constant of the second human body support portion 12. The static spring constants ks1, ks2 are obtained from a load-displacement characteristic when the center of a circular pressure board with a diameter of 200 mm is matched with the center of each of the above-described human body support portions 11, 12 and pressure is applied. The first human body support portion 11 corresponds to a portion below the ischial tuberosities, which is the barycentric position of a human, and the feeling of support felt by a person in a static seating state changes depending also on whether or not the vicinities of the femoral bases are supported, not only the narrow range around the portion below the ischial tuberosities. Therefore, it is appropriate to perform evaluation with the pressure board having a diameter of 200 mm ranging from a buttock to the vicinity of a middle portion of a femur of a human, and determine with this evaluation whether the static spring constant below the ischial tuberosities is proper or not.

On the other hand, in view of pedal operability which largely influences vehicle operability as represented by braking performance and ability of holding a posture from front and back for assuring the stability to receive reaction force by operating a pedal, as well as in view of damping performance which largely influences the feeling of riding, the setting of the dynamic spring constants, particularly setting of the dynamic spring constant of the first human body support portion 11 supporting the buttocks (pelvis) is important. The vibration transmission characteristic for input vibration is different in vibration absorbency between the portion where the pelvis including ischial tuberosities is located and the portion where the femurs covered by muscle are located, due to the influence of the spring characteristic and damping characteristic of the muscle itself. Therefore, the setting should be such that the high frequency vibration, which is easily bone conducted, is difficult to be inputted to the pelvis, and meanwhile the low frequency vibration, which induces vertical movement of the trunk, is absorbed by a phase difference of 180 degrees with the femurs being the fulcrum. For this purpose, the dynamic spring constant below the ischial tuberosities needs to be set smaller than the dynamic spring constant for the femurs. Specifically, in view of the dynamic spring constants, the human body should be considered by dividing into, so to speak, the block where the pelvis is located and the block where the femurs are located. Accordingly, regarding evaluation of individual portions with a weight having a diameter of 98 mm as important, to realize a structure having characteristics capable of handling both the low frequency vibration vibrating the entire trunk about the pelvis and the high frequency vibration vibrating the muscle of femurs or the like, the dynamic spring constants, which are obtained by matching the center of a circular weight with a diameter of 98 mm with the center of each of the human body support portions 11, 12 and applying vibration with a state that the weight is stable by its own weight being an original point, are set to kd1<kd2, where kd1 is the dynamic spring constant of the first human body support portion 11, and kd2 is the dynamic spring constant of the second human body support portion 12. However, kd1<kd2 needs to be satisfied under the vibration condition such that the excitation force thereof is substantially equal to excitation force working on each of the first human body support portion 11 and the second human body support portion 12 due to input vibration in a state that a person is seated. To achieve the balance of excitation force similar to when a person is seated using the weight with a diameter of 98 mm, measurement is performed, as will be described later, while changing the vibration amplitude between the case where the weight is set to the first human body support portion 11 and the case where the weight is set to the second human body support portion. Further, whether an outer layer member with high rigidity is used or not also makes a difference. The experiment performed with the same vibration amplitude may result in an excitation force balance similar to the state that a person is seated. When a soft outer layer member is used for example, it may be necessary to perform the experiment with a large vibration amplitude when the weight is set to the first human body support portion 11. Detailed experimental results will be described later.

Further, when a human body support portion with a center at a position located forward at a horizontal distance of 200 mm along the longitudinally center line of the seat cushion 10 from the first human body support portion 11 is a third human body support portion 13, and the dynamic spring constant thereof is kd3, it is more preferable that the relationship of the dynamic spring constants satisfies a relationship of kd1<kd2<kd3, and is also set to values which satisfy conditional expressions:

$1 \leq kd2/kd1 \leq 6$, $1 \leq kd3/kd2 \leq 3$, and $1 \leq kd3/kd1 \leq 7$.

The first human body support portion 11 is set forward at a horizontal distance in the range of 50 mm to 150 mm from the border between a seat back and the seat cushion along the longitudinally center line of the seat cushion. Within such a range, a variety of physique sizes can be absorbed, and the range consequently corresponds to the portion below the ischial tuberosities of a human during seating. The first human body support portion 11 is preferred to be set to a position located forward at a horizontal distance of 100 mm from the border between the seat back and the seat cushion along the longitudinally center line of the seat cushion. This is because in most cases this position corresponds to the portion below the ischial tuberosities.

As described above, it is preferred that the second human body support portion 12 is located forward at a horizontal distance of 100 mm along the longitudinally center line of the seat cushion 10 from the first human body support portion 11, and the third human body support portion 13 is located forward at a horizontal distance of 200 mm along the longitudinally center line of the seat cushion 10 from the first human body support portion 11. This is because the vicinities of the femoral bases of a human as well as portions of a human from the vicinities of substantially middle portions of the femurs to the vicinities of the backs of knees are supported in these positions, respectively.

FIG. 2 is a plan view seeing the respective positions of the human body support portions 11 to 13, as well as positions where the pressure board with a diameter of 200 mm and the weight with a diameter of 98 mm are set. Symbols 11a, 12a, 13a are the centers of the respective human body support portions 11 to 13, and small circles 98a, 98b, 98c shown by solid lines having centers matching with the centers 11a, 12a, 13a of the respective support members are positions where the weight with a diameter of 98 mm is set when measuring the dynamic spring constants. Among these three small circles shown by solid lines, small circles 98a' with the same sizes and shown by dashed lines on both sides of the small circle 98a are positions corresponding to the portions right below the ischial tuberosities of a human, where the body pressure distributions in buttocks are highest. Further, small circles 98b' with the same sizes shown by solid lines on both sides of the small circle 98b of solid line are positions corresponding to the vicinities of femoral bases, where the body pressure distributions in femurs are highest. In practice, it is ideal that the dynamic spring constants are measured by setting the weight to the small circles 98a', 98b' of dashed lines, but for the convenience of measurement, the corresponding positional relationship between the small circles 98a' and 98b' of dashed lines on one side or the other side is considered to correspond to the corresponding positional relationship between the small circles 98a and 98b of solid lines along the longitudinally center line of the seat cushion 10. Note that in FIG. 2, large circles of dashed lines shown with centers matched with the respective centers 11a to 13a of the human body support portions 11 to 13 are positions for setting the pressure board with a diameter of 200 mm for measuring the static spring constants, and details of which will be described later.

On the other hand, the dynamic spring constants kd1, kd2, kd3 are spring constants measured in a vibration state, and are obtained by applying vibration in a state that, as described above, the center of a measurement weight is matched with each of the centers of the first human body support portion 11, the second human body support portion 12, and the third human body support portion 13 to be mounted thereon. In this embodiment, they are values obtained by applying vibration using a circular weight with a diameter of 98 mm and a mass of 6.7 kg as the measurement weight at vibration frequencies 4 Hz to 10 Hz.

By the static spring constants being set such that ks1, ks2 become ks1>ks2, the high spring constants can support under the buttocks in a static state, and hence stable feeling of seating can be obtained. On the other hand, by the dynamic spring constants kd1, kd2, kd3 having the relationship of kd1<kd2<kd3, load shares of a human body weight while vibrating (travelling) become larger in the second and third human body support portions 12, 13 with the dynamic spring constants kd2, kd3 to thereby assure a stable seating posture even while traveling, and by falling within the range of the above conditional expressions, the vibration absorption characteristic improves. In addition, to increase the stability during static seating, to stabilize the positional relationship of the trunk and the steering wheel as well as the pelvis and the pedals in a forward/backward direction so that the driving posture while traveling is always in a constant position, and further, to increase the vibration absorption characteristic, it is desirable that the angle of the seat cushion 10 is set to 20 degrees to 28 degrees, preferably 22 degrees to 26 degrees, more preferably 25 degrees.

Regardless of the vibration frequency, when kd2/kd1 is smaller than 1 and when kd3/kd1 is smaller than 1, the body weight of a person is supported by the first human body support portion 11 while traveling. Thus, when excitation force with large amplitude and low frequency operates, the reaction force is concentrated and inputted to the ischial tuberosity portion, thereby inducing a bottom touch around the ischial tuberosity portion. By this bottom touch, muscle is deformed and blood vessels of the peripheral circulation system and the nervous system are pressed. Further, since the influence of high frequency vibration is inputted to the pelvis directly, mainly the damping performance up to the head is poor, which is unfavorable. On the other hand, when kd2/kd1 is equal to or larger than 1 and when kd3/kd1 is equal to or larger than 1, the second human body support portion 12 with which the femurs come in contact becomes a fulcrum, and unwanted sinking of the pelvis is reduced by forward and downward rotary motion of the buttocks with the femurs being the fulcrum, thereby suppressing deformation of muscle by small reaction force in a weight releasing direction. Further, when the kd3/kd2 is smaller than 1, supportability in the vicinities of the backs of knees becomes low and makes them to be pressed easily. When all of kd2/kd1, kd3/kd2, and kd3/kd1 are much larger than 1 and gets close to 10, particularly, when kd2/kd1 surpasses 6, kd3/kd2 surpasses 3, and when kd3/kd1 surpasses 7, there is a concern for causing a state that no support can be felt (loose feeling) as the final feeling of seating.

Next, specific examples of the vehicle seat including the above-described static spring constants ks1, ks2 and dynamic spring constants kd1, kd2, kd3 will be explained.

EXAMPLE 1

Figure 3:
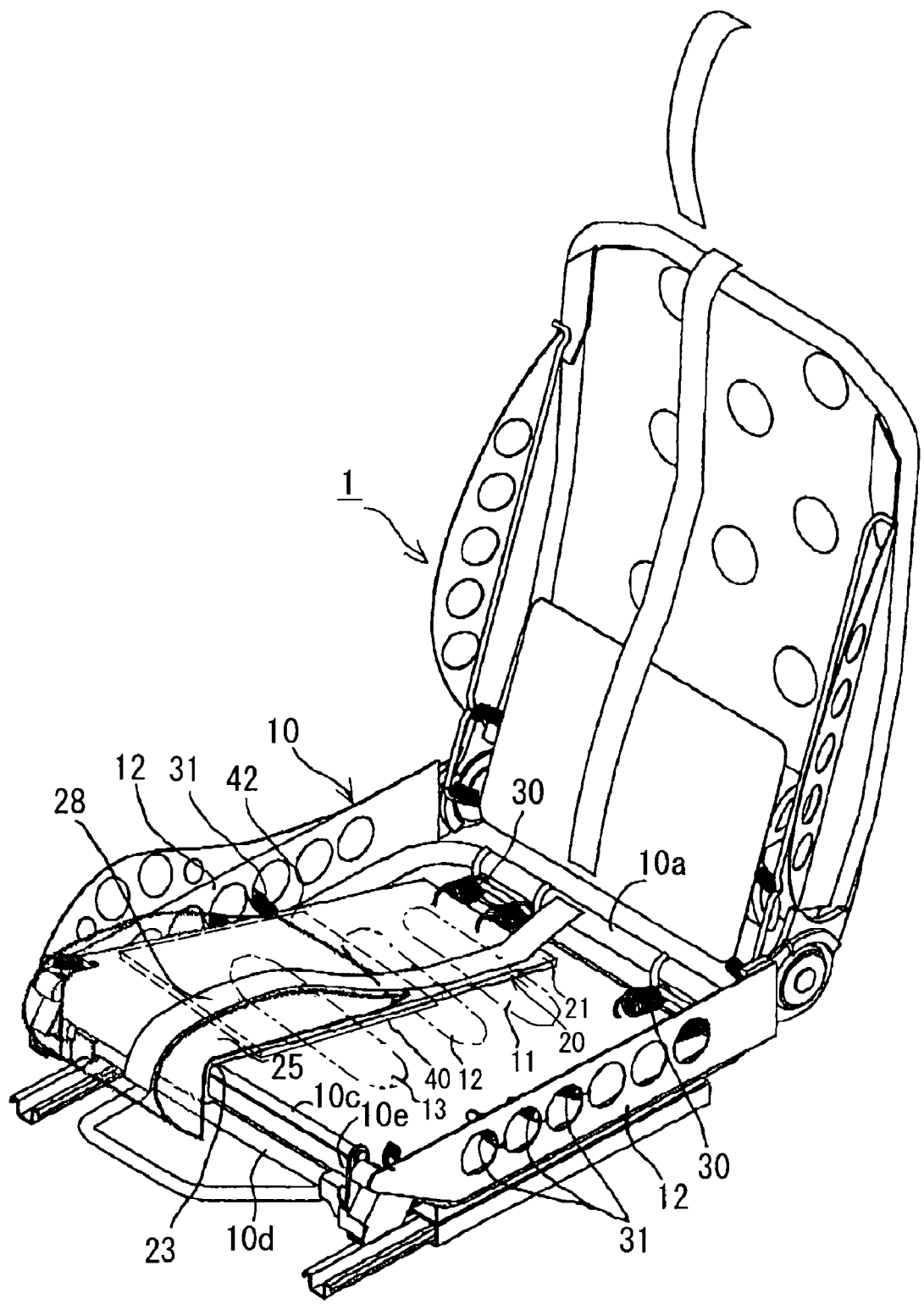
FIG. 3 is a diagram showing a vehicle seat according to example 1.

As shown in FIG. 3, example 1 is constituted including a flat support member 20 strained in the forward/backward direction as the seat cushion 10. The flat support member 20 is disposed at the lowest layer in the cushion material constituting the seat cushion 10, and a three-dimensional knitted fabric, a two-dimensional woven fabric, or the like can be used. In this embodiment, a three-dimensional knitted fabric is used. A rear edge portion 21 of the flat support member 20 is supported by a plurality of coil springs 30 as rear spring members engaging with a rear end frame 10a of the seat cushion 10. The coil springs 30 are arranged at substantially equal intervals and substantially in parallel with each other. In this embodiment, four extension coil springs with a spring constant (static spring constant 0.4 kg/mm are used. Note that the three-dimensional knitted fabric (three-dimensional net member) is knitted by reciprocating a connecting thread between a pair of ground knitted fabrics located at a predetermined interval and is formed in a predetermined shape using a double raschel machine or the like. For example, a product made by Asahi Chemical Industry Co., Ltd, product number: T24004A, a product made by Suminoe Textile Co., Ltd, product number: 49076D, 49013D, or the like can be used. In this embodiment, the product made by Asahi Chemical Industry Co., Ltd, product number: T24004A is used.

Further, in this example, an auxiliary flat support member 40 is disposed under the flat support member 20, and to a part of a side edge portion 42 of the auxiliary flat support member 40 that is located beside a position corresponding to the second human body support portion 12, a plurality of coil springs 31 as side spring members are engaged, which are each engaged at one end with a substantially center portion of a side frame 12 of the seat cushion 10. The coil springs 31 are constituted of extension coil springs with a spring constant (static spring constant) 0.35 kg/mm, which are disposed substantially in parallel, three of which being disposed between one side frame 12 of the seat cushion 10 and one side edge portion 42 and three of which being disposed between the other side frame 12 and the other side edge portion 42, thereby straining the auxiliary flat support member 40 in a leftward/rightward direction.

Therefore, in this embodiment, a combined spring constant of the coil springs 31 as the side spring members is 2.1 kg/mm, and a combined spring constant of the coil springs 30 as the rear spring members is larger than 1.6 kg/mm.

Further, among the side spring members, at least a side spring member 300 disposed closest to a rear end of the seat cushion 10 is preferred to be provided at a position corresponding to a region between the center 11a of the first human body support portion 11 and the center 12a of the second human body support portion 12, namely a position between 50 mm and less than 100 mm along the longitudinally center line of the seat cushion 10 from the center 11a of the first human body support portion 11. Accordingly, upon evaluation of a static seating state, when the center of the pressure board with a diameter of 200 mm is matched with the center 11a of the first human body support portion 11 and is pressed, elasticity of the side spring members other than the rear spring members operates on the vicinities of the femoral bases, and thereby the buttocks can be supported securely. Moreover, when large acceleration, like in collision, is inputted in a downward direction and in an obliquely forward direction, the side spring members move forward and the spring constants decrease in an antigravity direction.

A front edge portion 23 of the flat support member 20 is supported by a front edge support frame 10c of the seat cushion 10. In this example, this front edge support frame 10c is coupled to arm members 10e supported elastically in a torsional direction by a torsion bar 10d, and by swinging in the forward/backward direction of the seat cushion 10, elasticity by torsional torque of the torsion bar 10d is made to function.

A urethane member 25 with a predetermined thickness is stacked on the flat support member 20 from the vicinity of a substantially middle portion to the vicinity of a front end. This urethane member 25 supports portions from the vicinities of substantially middle portions of the femurs to the vicinities of the backs of knees.

On upper surfaces of the flat support member 20 and the urethane member 25 disposed as above, an outer layer member 28 is disposed. In this example, a three-dimensional knitted fabric is used as the outer layer member 28, and the three-dimensional knitted fabric has an elongation rate of 5% or lower in an equilibrium state during seating and is disposed to cover the entire cushion frame constituted including the side frames 12 forming the seat cushion 10. By disposing the outer layer member (three-dimensional knitted fabric) 28 with such a low elongation rate, mainly elongation of the flat support member 20 and elasticity of the torsion bar 10d and the coil springs 31 straining the auxiliary flat support member 40 in the leftward/rightward direction become dominant until reaching the equilibrium state when a person is seated, and the coil springs 30 do not operate largely in this stage. Specifically, elasticity functions of the coil springs 30 does not operate so much in the stage of making an equilibrium seating state. Thus, when external force is inputted, the side spring members pivots forward and downward, and the elasticity functions of the coil springs 30 operate largely.

The first human body support portion 11 of this example is set to the position located forward at the horizontal distance of 100 mm from the border between the seat back and the seat cushion along a seat cushion center line. This first human body support portion 11 functions as a spring element, which is mainly due to operation of the elasticity of the above-described coil springs 30 as the rear spring members. The second human body support portion 12 located forward at the horizontal distance of 100 mm from the first human body support portion 11 functions as a spring element mainly due to operation of the elasticity of the above-described coil springs 31 as the side spring members. The third human body support portion 13 located forward at the horizontal distance of 200 mm from the first human body support portion 11 functions as a spring element with elasticity of the urethane member 25 operating mainly.

The elasticity of the torsion bar 10d supporting the front edge support frame 10c also relates to all the human body support portions 11 to 13, but operates mainly as a serial spring (deep-layer spring member) causing a phase delay in the first human body support portion 11. Considering in detail, elasticity of the flat support member 20 or the three-dimensional knitted fabric itself used as the outer layer member 28 influences the static spring constants and the dynamic spring constants in the human body support portions 11 to 13 respectively. Further, for example, the elasticity of the coil springs 31 as the side spring members influence the static spring constant of the first human body support portion 11 in the static seating state. As such, the human body support portions 11 to 13 may receive synergistically the influence of the various types of spring members provided in the seat cushion 10. However, the spring members that mainly decide the static spring constants and the dynamic spring constants of the human body support portions 11 to 13 are as described above.

TEST EXAMPLE 1-1

Figure 4:
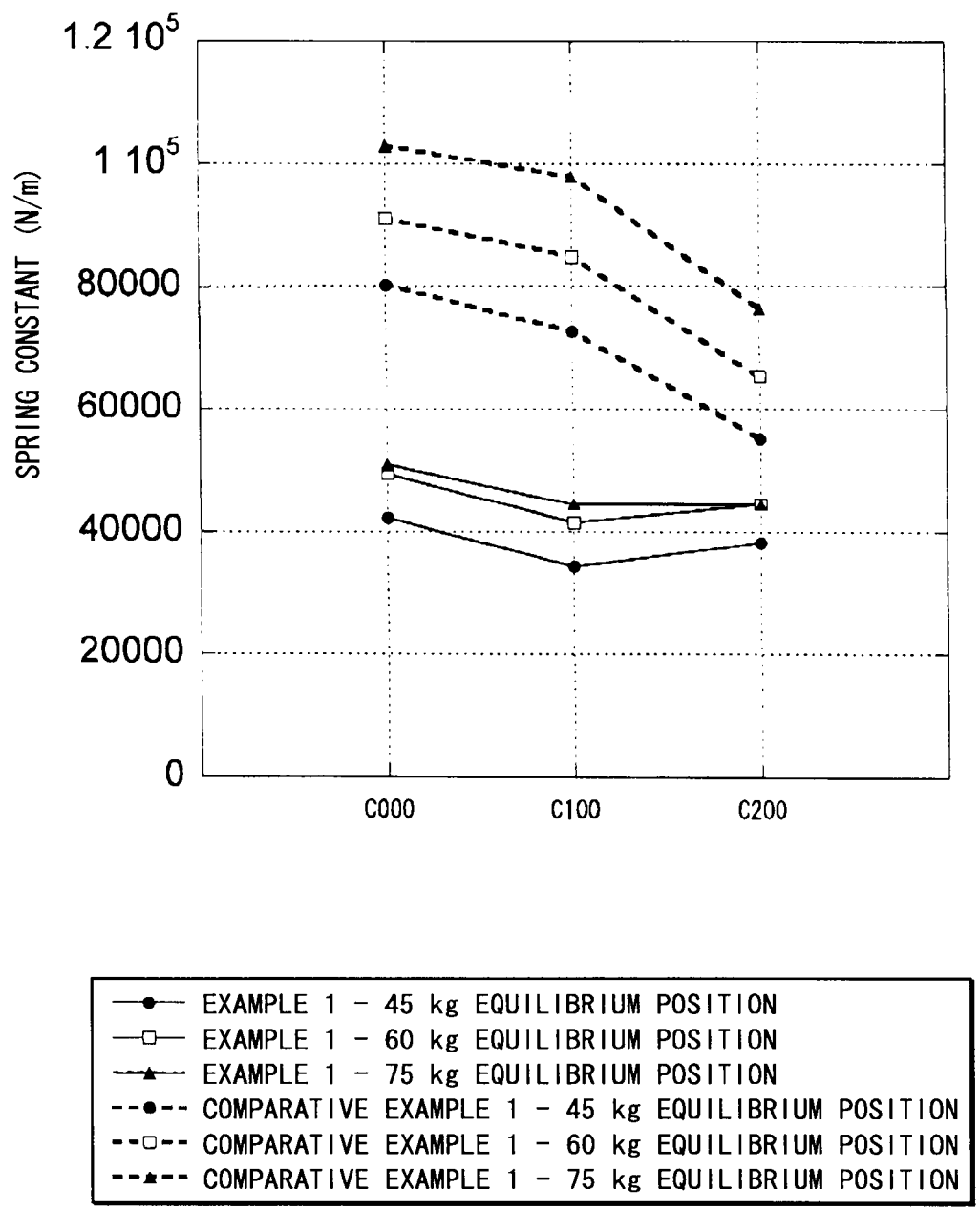
FIG. 4 is a graph showing static spring constants of the seat cushion of the vehicle seat according to the example 1, and showing static spring constant values obtained with positions of 45 kg, 60 kg, 75 kg being equilibrium positions each having a displacement amount of 0 mm, when applying pressure up to 1000 N at 50 mm/min by a pressure board with a diameter of 200 mm.

According to the vehicle seat of the example 1, by including the above-described various types of members, it becomes a structure in which the static spring constants $ks1$, $ks2$ and the dynamic spring constants $kd1$, $kd2$, $kd3$ of the first human body support portion 11, the second human body support portion 12 and the third human body support portion 13 have a predetermined relationship. FIG. 4 is a graph showing static spring constant values obtained with respective positions of 45 kg, 60 kg, 75 kg being equilibrium positions each having a displacement amount of 0 mm, when applying pressure up to 1000 N at 50 mm/min by the pressure board with a diameter of 200 mm. Symbol C000 means a value measured when it is centered on the first human body support portion 11, symbol C100 means a value measured when it is centered on the second human body support portion 12, and symbol C200 means a value measured when it is centered on the third human body support portion. Note that for comparison, static spring constants are measured similarly in a seat having a full-foam structure constituted of a cold-cured urethane foam with a thickness of 75 mm under the buttocks, and are shown similarly in FIG. 4.

From these results, in this example, the static spring constant ks1 of C000 as the first human body support portion 11 is a value larger than both of the static spring constant ks2 of C100 as the second human body support portion 12 and further the static spring constant ks3 of C200 as the third human body support portion 13. This point is similar in the seat of the comparative example 1, and the both are excellent in supportability under the buttocks during static seating, but are different in dynamic characteristics as will be described later.

TEST EXAMPLE 1-2

Figure 5:
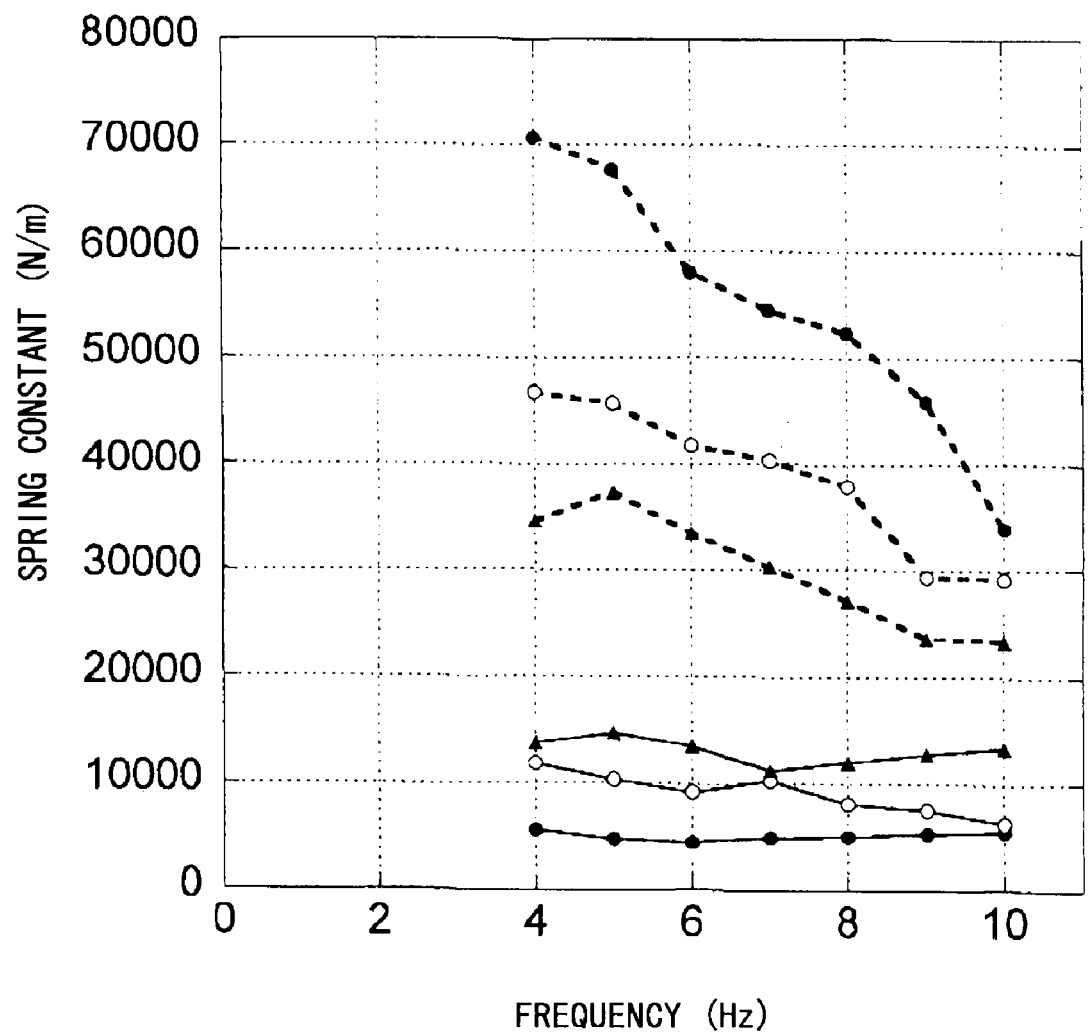
FIG. 5 is a graph showing dynamic spring constants of the seat cushion of the vehicle seat according to the example 1.
Figure 6:
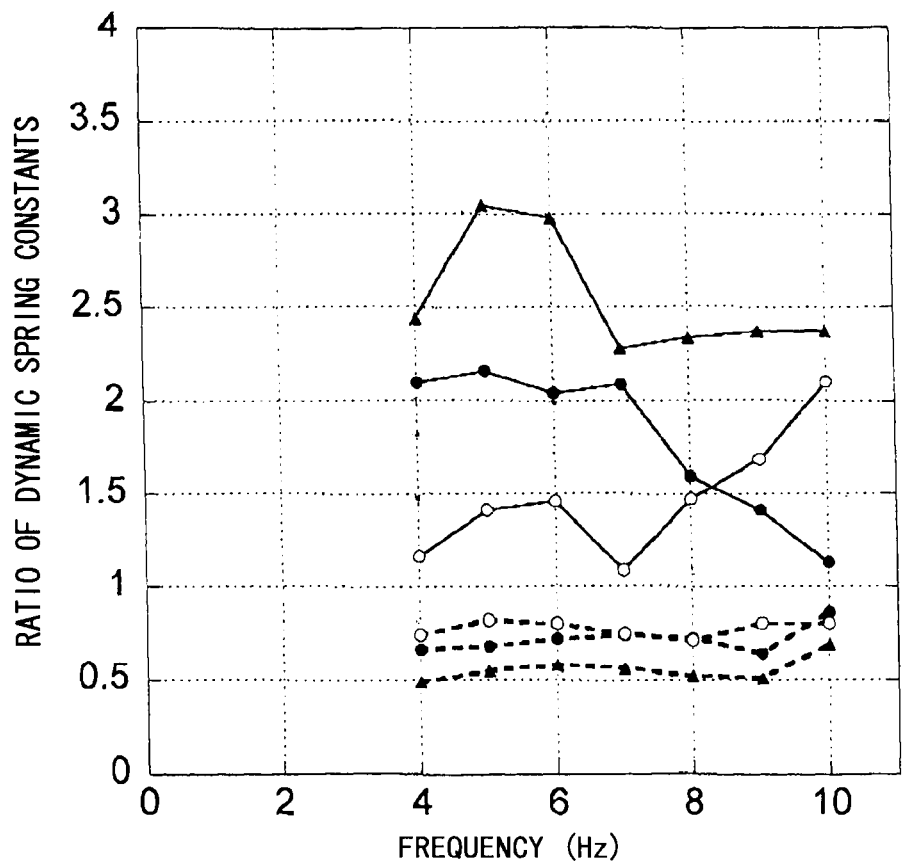
FIG. 6 is a graph showing ratios of dynamic spring constants of the seat cushion of the vehicle seat according to the example 1.

FIG. 5 shows dynamic spring constants measured using the weight with a diameter of 98 mm and a mass of 6.7 kg at vibration frequencies of 4 Hz to 10 Hz. From FIG. 5, in the seat of this example, the dynamic spring constant kd1 of the first human body support portion 11 is the lowest, and then the dynamic spring constant kd2 of the second human body support portion 12 and the dynamic spring constant kd3 of the third human body support portion 13 are higher in this order. Specifically, the dynamic spring constants kd1, kd2, kd3 of this example are structured to satisfy the condition kd1<kd2<kd3. Further, when the ratios of kd2/kd1, kd3/kd2, kd3/kd1 are obtained, as shown in FIG. 6, they fall within the range of the above-described conditional expressions at all vibration frequencies. In contrast, in the comparative example 1, the dynamic spring constant kd1 of the first human body support portion 11 is the highest, and the values become lower toward the front side in order of kd2, kd3, and the ratio of either kd2 or kd3 to kd1 is less than 1. Further, the ratios do not vary so much when the vibration frequency varies.

Specifically, in the example 1, the static spring constant ks1 in the first human body support portion 11 is large due to the influence of the side spring members. When vibration is inputted, it is considered by dividing into the block of the trunk including the pelvis and the block including the femurs, and the block of the trunk including the pelvis is damped by the low dynamic spring constant with serial springs including the rear spring members and the front spring member (torsion bar). On the other hand in the comparative example 1, although the block of the trunk including the pelvis is vibration that vibrates the entire trunk, effective damping will not be performed since the dynamic spring constants are high.

Further in the example 1, the dynamic spring constant kd1 of the first human body support portion 11 is the lowest and falls within the range of the above conditional expressions. However, when the vibration frequency changes, the ratios between the respective dynamic spring constants change significantly within the range of the above conditional expressions. This means that the human body support portions 11, 12, 13 that operate dominantly change according to the vibration frequency. Specifically, this means that the power of influence of each of the spring members (coil springs 30, 31, torsion bar 10d, and so on), which cause the human body support portions 11, 12, 13 to function as the spring elements, changes according to the vibration frequency. Therefore, according to the example 1, high damping performance can be obtained according to the vibration frequency. Experimental results in this respect will be described later.

EXAMPLE 2

Figure 7:
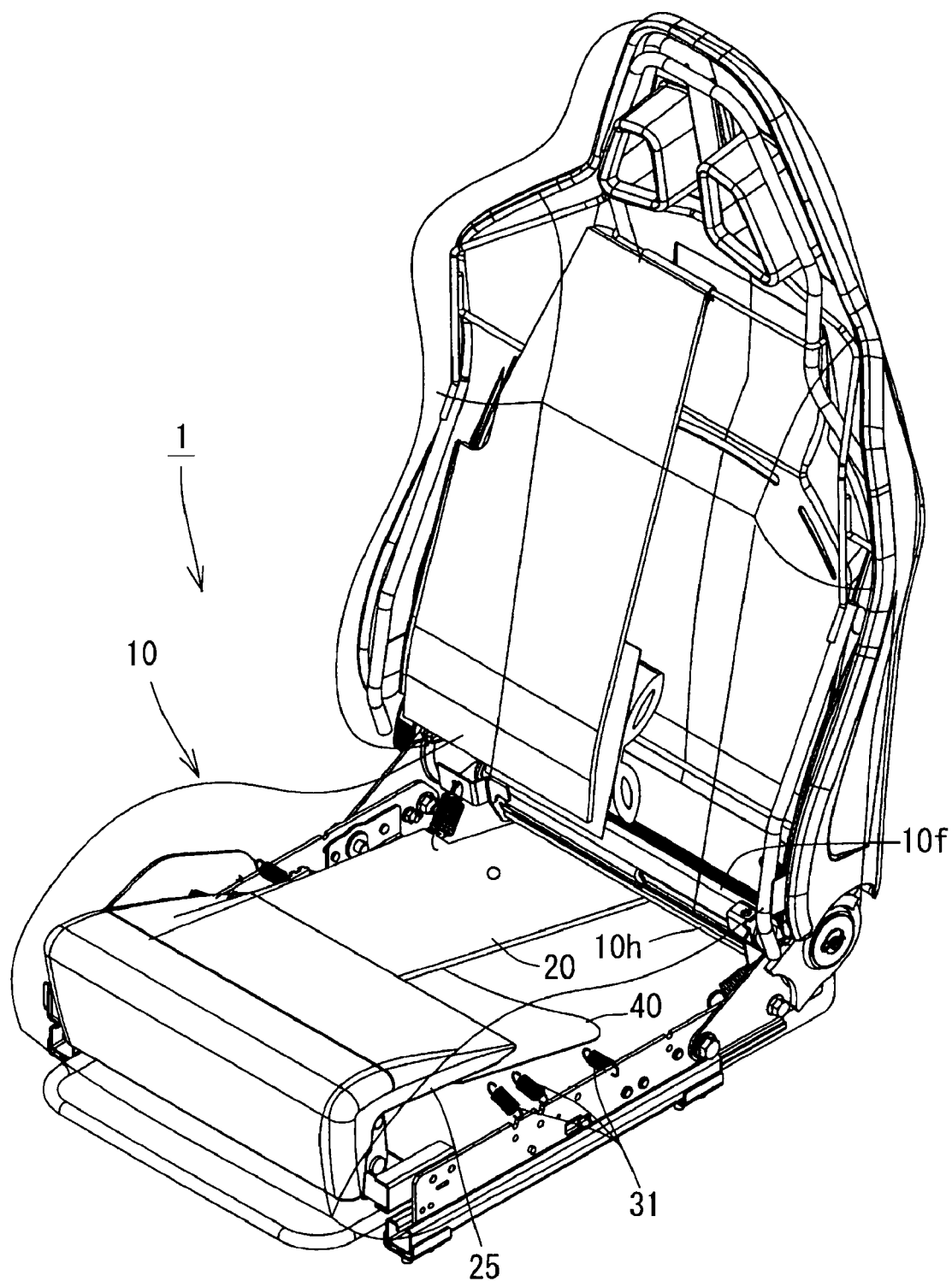
FIG. 7 is a perspective view showing a vehicle seat according to example 2.
Figure 8:
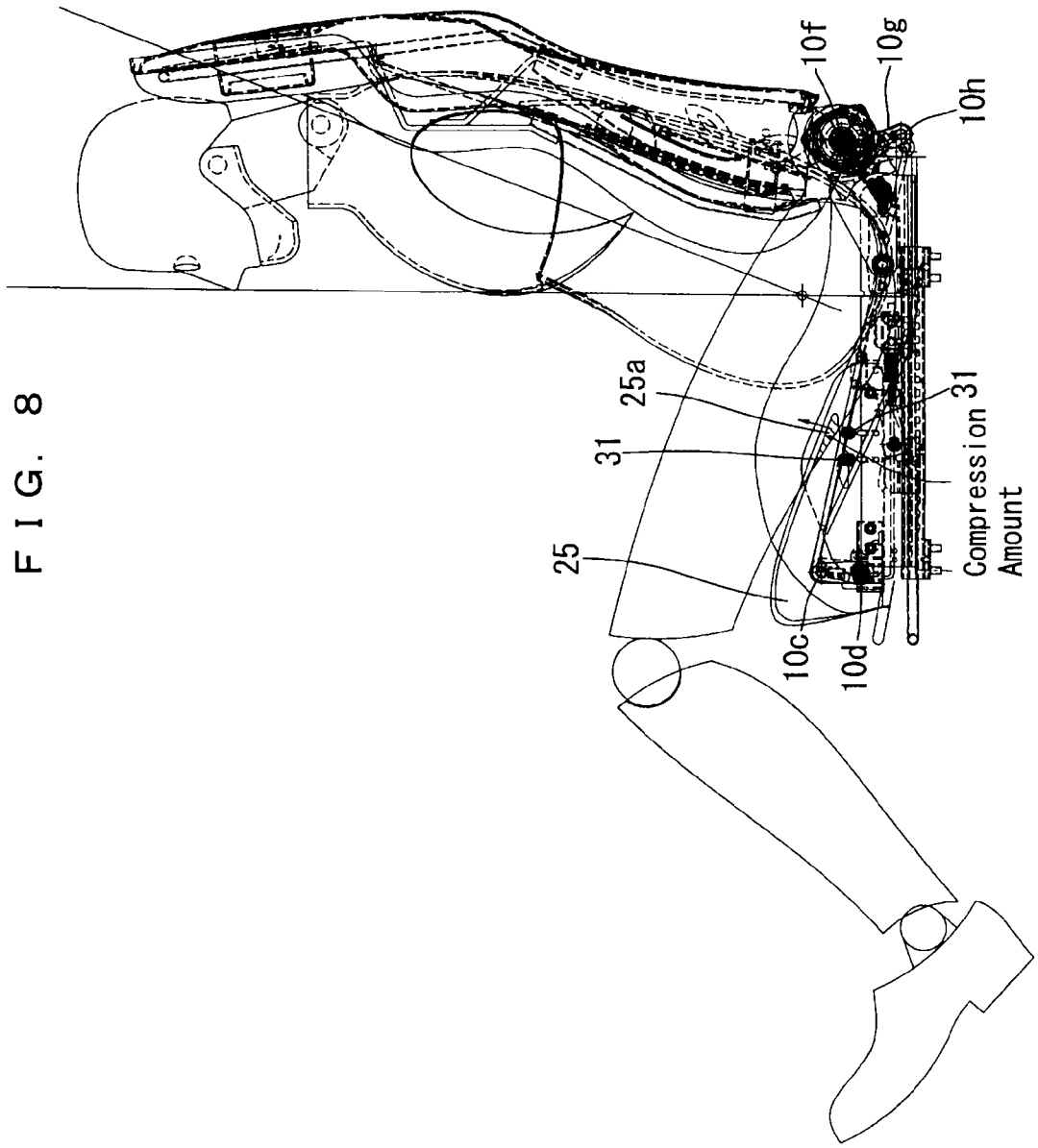
FIG. 8 is a side view showing the vehicle seat according to the example 2.

As shown in FIG. 7 and FIG. 8, example 2 is structured having, similarly to the example 1, the auxiliary flat support member 40 at a lower layer of the flat support member 20 and in the range corresponding to the second human body support portion 12 and the third human body support portion 13. Further, in a rear portion of the seat cushion 10, there is disposed a torsion bar 10f, which is arranged along a width direction of the seat cushion. An arm member 10g is coupled to this torsion bar 10f, and a rear edge support frame 10h is coupled to this arm member 10g. Accordingly, the rear edge support frame 10h is supported swingably in the forward/backward direction by elasticity of the torsion bar 10f. Therefore, in this example, the torsion bar 10f functions as a rear spring member and constitutes a deep-layer spring member giving spring force and damping force.

More specifically, the auxiliary flat support member 40 is provided so that a substantially middle portion of a rear end edge thereof is at a position between 50 mm and less than 100 mm from the center 11a of the first human body support portion 11 along the longitudinally center line of the seat cushion 10. The auxiliary flat support member 40 shown in FIG. 2 is formed in an arc-shape so that the substantially middle portion is located on the front side. The auxiliary flat support member 40 used in the example 2 is also preferred to be formed as such, which increases supportability under the buttocks in a static seating state, and the coil springs can easily escape forward and downward when impacting vibration is inputted.

Further, the same coil springs 31 as in the example 1 are used as the side spring members, and these coil springs 31 are coupled to the side edge portions of the auxiliary flat support member 40. However, among the side spring members, at least a side spring member (side spring members shown by symbol 300 in FIG. 2) disposed closest to the rear end of the seat cushion is preferred to be provided corresponding to a region between the center 11a of the first human body support portion 11 and the center 12a of the second human body support portion 12. Accordingly, elasticity of such side spring members operates during static seating, and thereby the supportability under the buttocks increases further. Note that the auxiliary flat support member 40 is constituted of a three-dimensional knitted fabric, two-dimensional elastic woven fabric, or the like, and thereby has functions to complement the elasticity of the flat support member 20 and increase surface rigidity of the second human body support portion 12 and the third human body support portion 13. In addition, this auxiliary flat support member 40 is disposed at the lower layer of the flat support member 20 closely to the extent that adjacent surfaces thereof come in contact slightly while nobody is seating. The other structure of the seat cushion 10 is substantially the same as the example 1, in which the urethane member is disposed from the vicinities of substantially middle portions of the femurs to the vicinities of the backs of knees, and the front edge portion of the flat support member 20 is coupled to the front edge support frame 10c supported by the torsion bar 10d.

Figure 9:
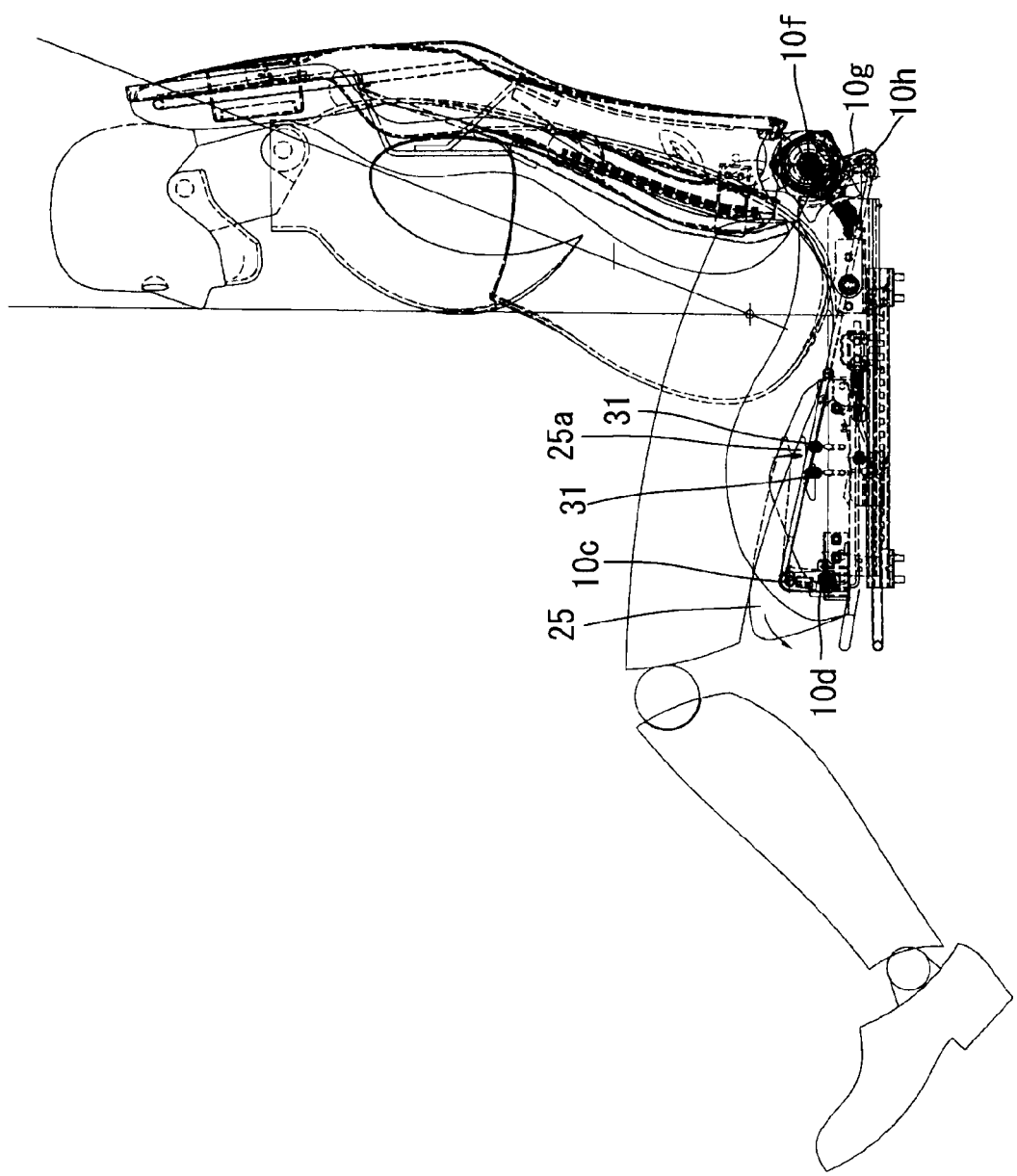
FIG. 9 is a side view for explaining operation when operating a pedal of the vehicle seat according to the example 2.

Note that in the urethane member 25 provided at a position corresponding to the third human body support portion 13, as shown in FIG. 8, a rear edge portion 25a of the urethane member 25 approximately located in the vicinity of the second human body support portion 12 is deformed during normal seating like being compressed by the vicinities of substantially middle portions of the femurs. A portion shown by oblique hatching in FIG. 8 is this compression amount, and reaction force by this compression amount operates in a direction to increase the spring constant of the second human body support portion 12. However, when a knee tries to stretch when operating a pedal, as shown in FIG. 9, the front edge portion of the urethane member 25 pivots forward following the body motion. As a result, the rear edge portion 25a of the urethane member 25 tries to displace as shown by dashed lines in FIG. 9, but due to the load of the femur, it does not displace as shown by the dashed lines, but is bent in the downward arrow direction. Specifically, the rear edge portion 25a is made to bend while the urethane member 25 moves forward pivotally, and thus the reaction force by compression of the rear edge portion 25a becomes small, thereby supporting the femur fittingly. Accordingly, while operating a pedal, it does not happen that the femur becomes like somewhat floating, or that conversely strong reaction force is generated against the femur. Thus, smooth pedal operation can be realized.

TEST EXAMPLE 2-1

Figure 10:
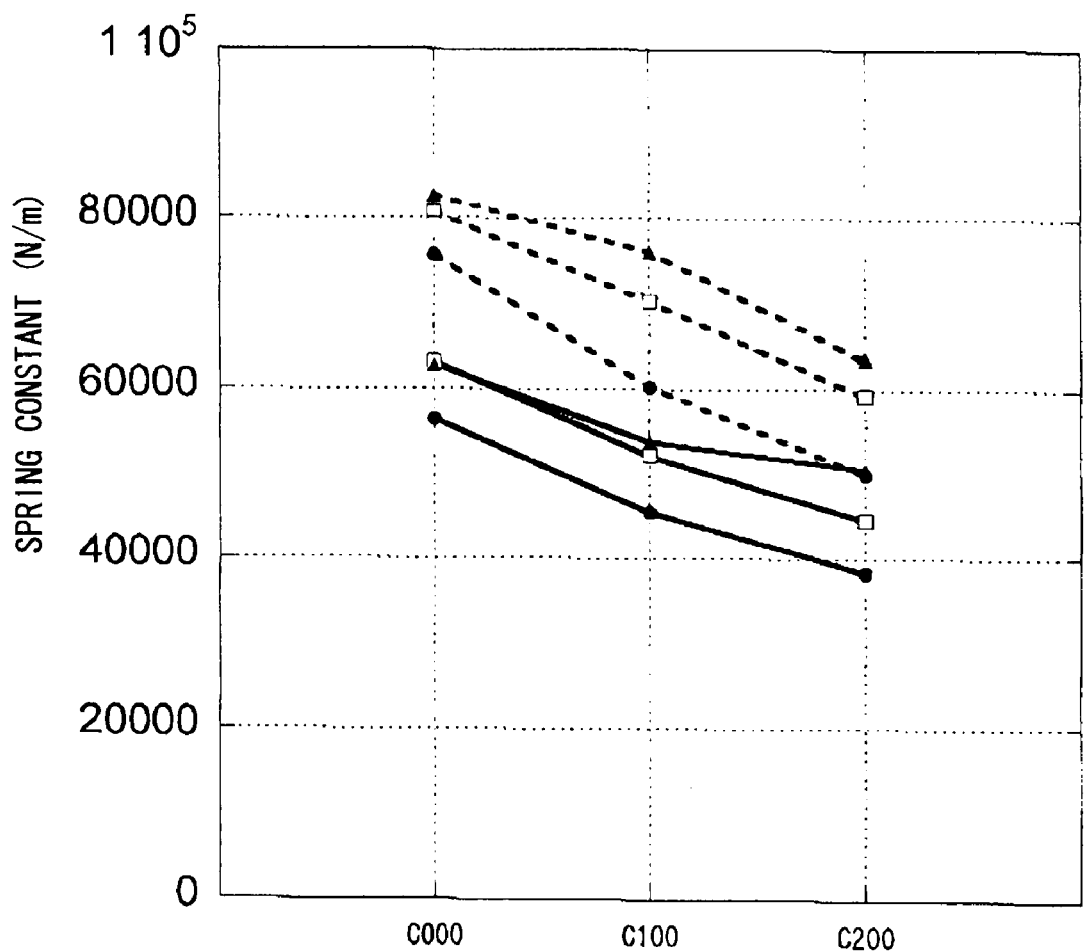
FIG. 10 is a graph showing static spring constants of a seat cushion of the vehicle seat according to the example 2, and showing static spring constant values obtained with positions of 45 kg, 60 kg, 75 kg being equilibrium positions each having a displacement amount of 0 mm, when applying pressure up to 1000 N at 50 mm/min by the pressure board with a diameter of 200 mm.

FIG. 10 is a graph showing, regarding the seat cushion 10 of the example 2, static spring constant values obtained with respective positions of 45 kg, 60 kg, 75 kg being equilibrium positions each having a displacement amount of 0 mm, when applying pressure up to 1000 N at 50 mm/min by the pressure board with a diameter of 200 mm. In addition, in the seat cushion 10, leather with a thickness of 1.6 mm is provided as an outer layer member with an extension ratio of 5% or lower in an equilibrium state during seating. The leather with a thickness of 1.6 mm has, due to its high surface rigidity, a characteristic to cause the various springs such as the above-described torsion bars and coil springs to operate in an organized, cooperative manner. Also in FIG. 10, the static spring constant ks1 of C000 as the first human body support portion 11 is a value larger than both of the static spring constant ks2 of C100 as the second human body support portion 12 and further the static spring constant ks3 of C200 as the third human body support portion 13. This point is similar in the seat of the comparative example 2, and the both are excellent in the supportability under the buttocks during static seating, but are different in dynamic characteristics as will be described later. Note that the comparative example 2 is a seat having a full-foam structure constituted of a cold-cured urethane foam with a thickness of 60 mm under the buttocks.

TEST EXAMPLE 2-2

Figure 11:
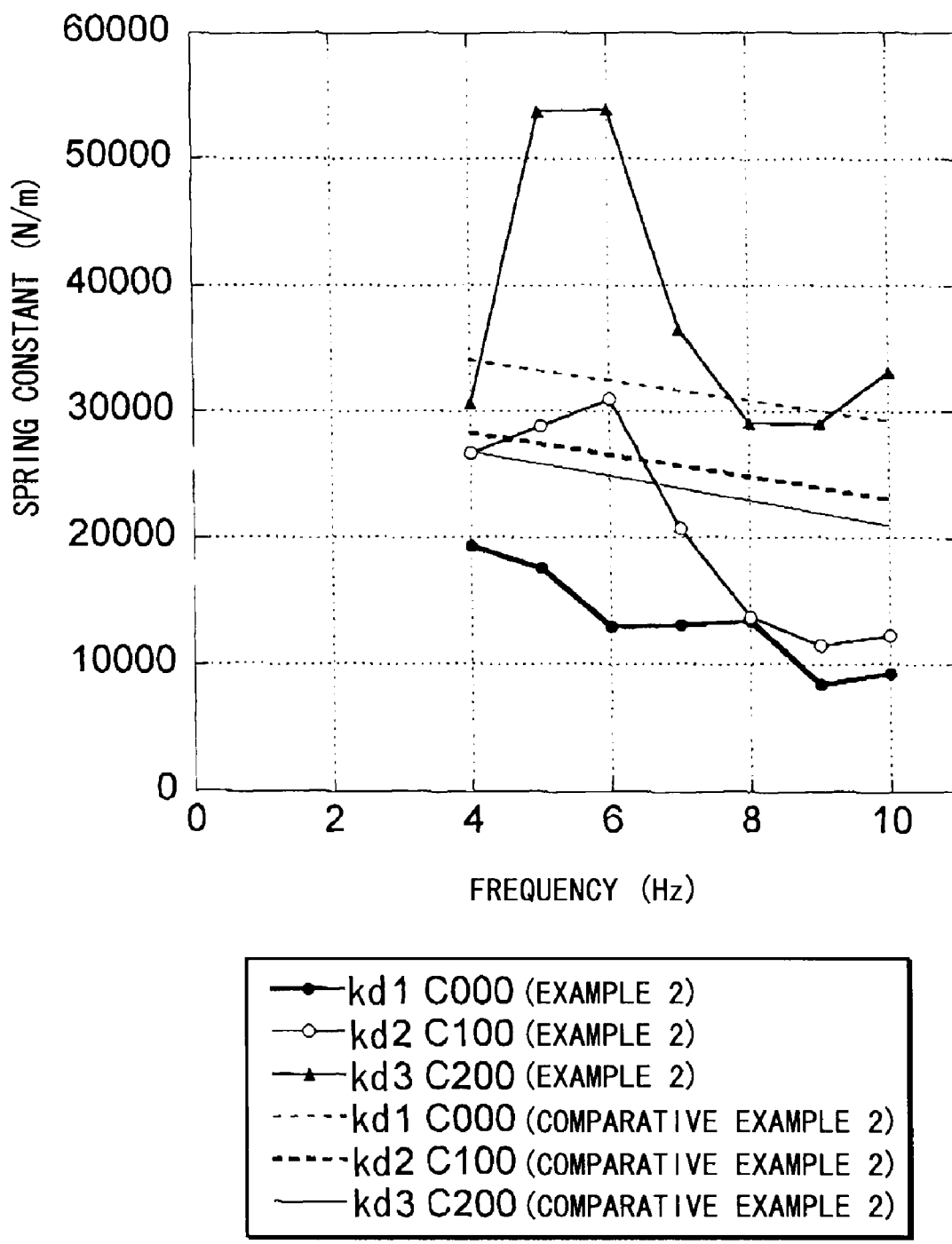
FIG. 11 is a graph showing dynamic spring constants of the seat cushion of the vehicle seat according to the example 2.
Figure 12:
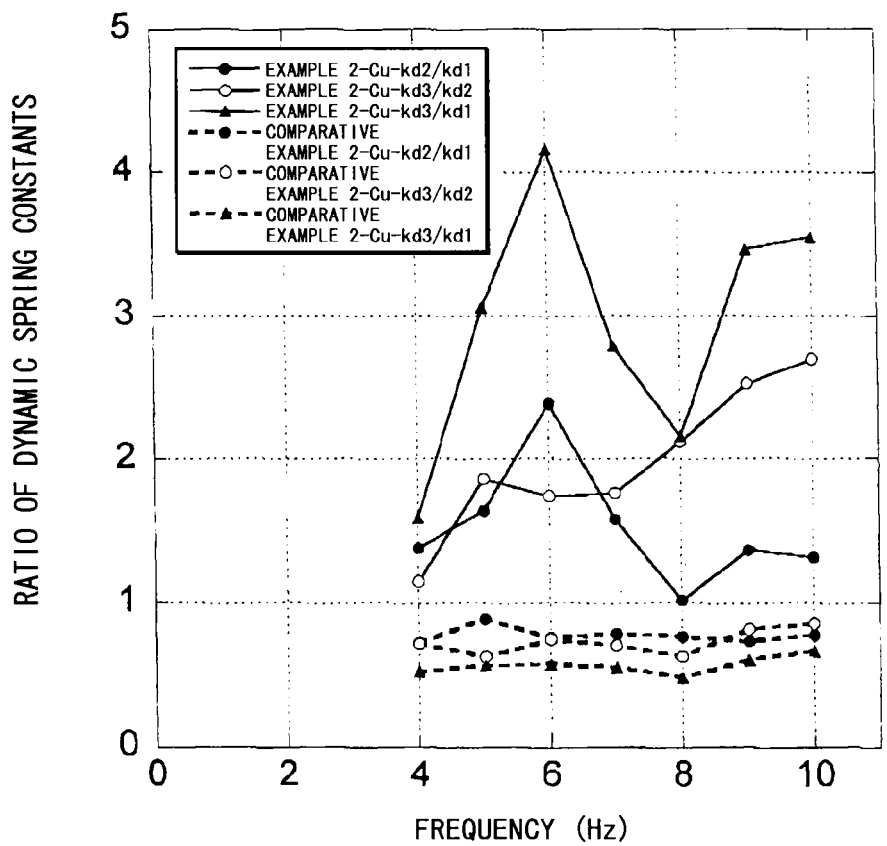
FIG. 12 is a graph showing ratios of dynamic spring constants of the seat cushion of the vehicle seat according to the example 2.

FIG. 11 shows dynamic spring constants measured using the weight with a diameter of 98 mm and a mass of 6.7 kg at vibration frequencies of 4 Hz to 10 Hz, with respect to the same seat as used in the test example 2-1. From FIG. 11, in the seat of this example, similarly to the example 1, the dynamic spring constant kd1 of the first human body support portion 11 is the lowest, and then the dynamic spring constant of the second human body support portion 12 and the dynamic spring constant of the third human body support portion 13 are higher in this order. Specifically, the dynamic spring constants kd1, kd2, kd3 of this example are structured to satisfy the condition kd1<kd2<kd3. Further, when the ratios of kd2/kd1, kd3/kd2, kd3/kd1 are obtained, as shown in FIG. 12, they fall within the range of the above-described conditional expressions at all vibration frequencies. However, in the case of this example from FIG. 11, being different from the example 1, the non-linearity in the dynamic spring constants of the human body support portions gets stronger toward the front side in order of kd1, kd2, kd3. This is influenced by that, by disposing a torsion bar not only on the front side but also on the rear side, the damping ratio in a vertical direction of the flat support member 20 is higher than in the example 1, and the serial spring constant thereof changes depending on the frequency.

Referring to FIG. 11 and FIG. 12, in the comparative example 2, since the dynamic spring constant kd1 of the first human body support portion 11 is the highest, the ratio of kd2 to kd3 is below 1, and the ratios do not change so largely when the vibration frequency changes. This point is almost the same as in the comparative example 1. On the other hand, in the example 2, the dynamic spring constant kd1 of the first human body support portion 11 is the lowest and falls within the range of the above-described conditional expressions. However, when the vibration frequency changes, the ratios between the dynamic spring constants change significantly in the range of the above-described conditional expressions, and the human body support portions 11, 12, 13 that operate dominantly change according to the vibration frequency. Thus, it can be seen that high vibration damping performance can be obtained according to the vibration frequency, similarly to the example 1.

Figure 13:
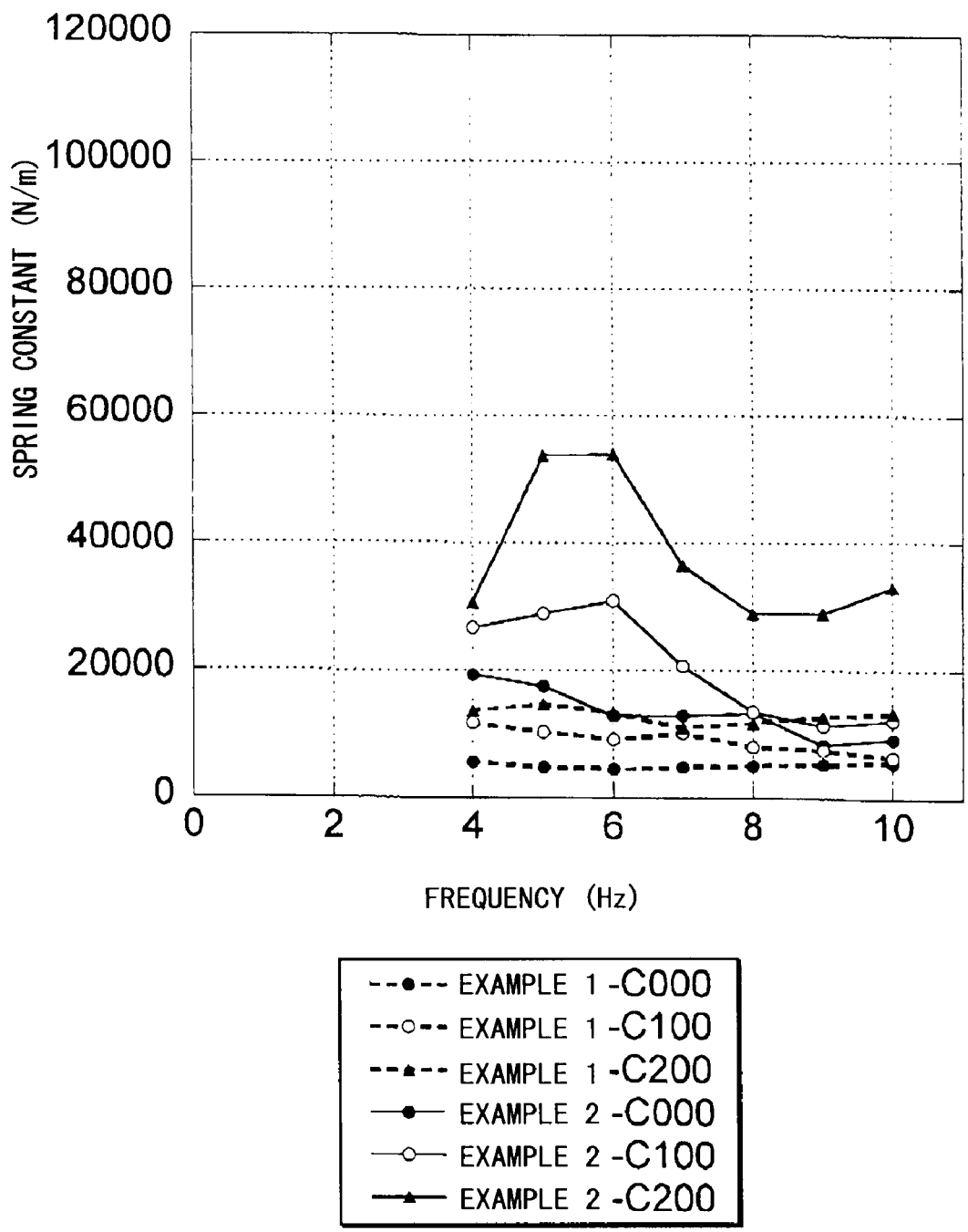
FIG. 13 is a graph showing dynamic spring constants of the seat cushions of the vehicle seats according to the example 1 and the example 2.

FIG. 13 shows together data of the dynamic spring constants of the example 1 and the example 2 shown in FIG. 5 and FIG. 11, and FIG. 14 shows together data of the example 1 and the example 2 shown in FIG. 6 and FIG. 12. From FIG. 13 and FIG. 14, the dynamic spring constants are larger and the non-linearity is stronger in the example 2 as a whole, and thus it can be seen that the damping ratio thereof is higher than in the example 1 as described above.

TEST EXAMPLE 2-3

Figure 15:
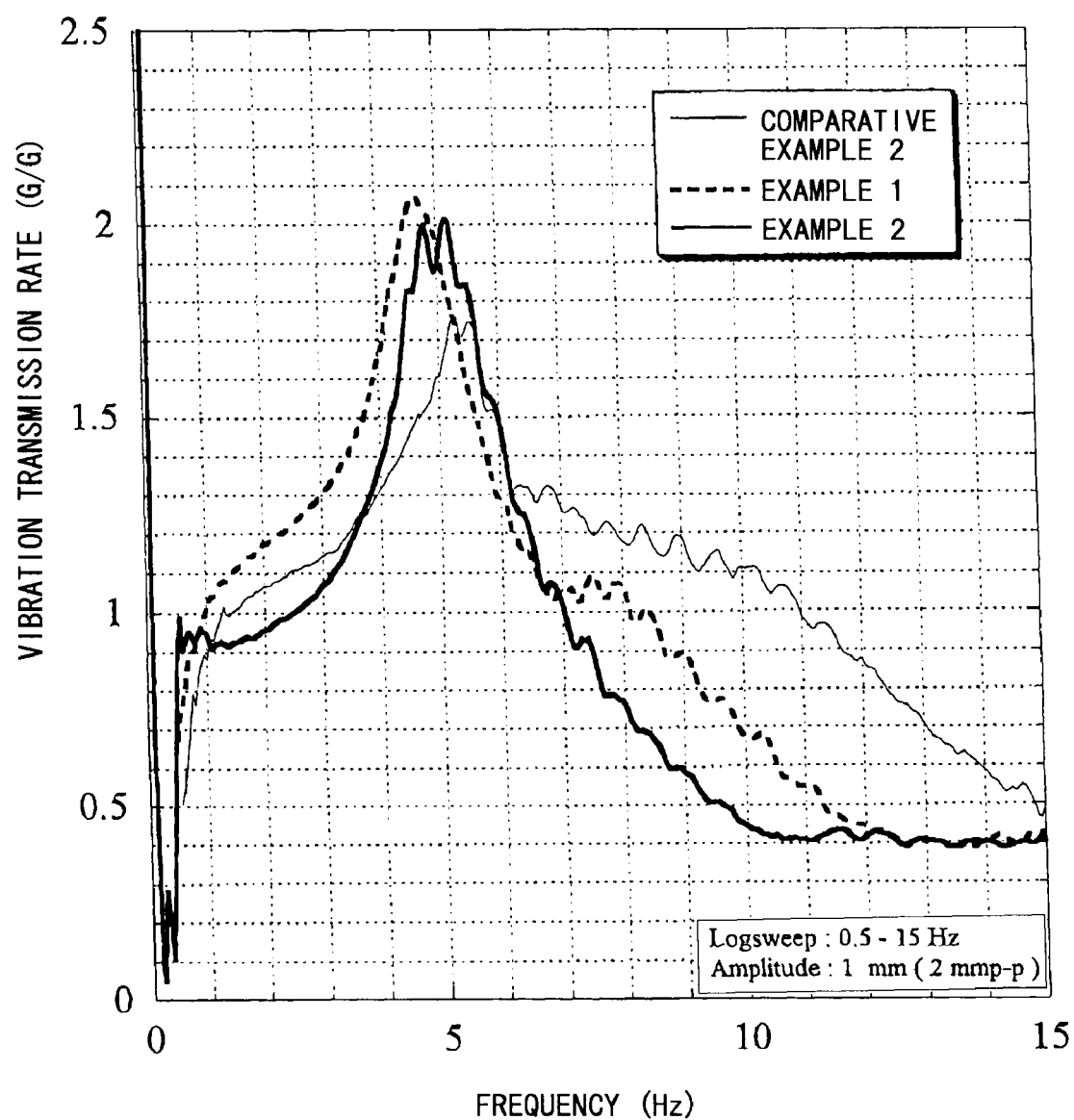
FIG. 15 is a graph showing a vibration transmission rate of the seat cushions of the vehicle seats according to the example 1, the example 2 and comparative example 2.

Next, vibration transmission rates were measured regarding the seat of the example 1 used in the test examples 1-1 and 1-2, the seat of the example 2 used in the test example 2-1 to test example 2-3, and the seat of the comparative example 2. The vibration transmission rates were measured such that the above-described vehicle seats are each mounted on a platform of a vibration machine, an acceleration sensor is attached to the seat cushion 10 in the vicinity corresponding to the portion below the ischial tuberosities, namely, the first human body support portion 11, a Japanese male weighing 58 kg is seated on each of the vehicle seats, and vibration is applied while changing the vibration frequency from 0.5 Hz to 15 Hz with a sine wave having one-side amplitude of 1 mm (vertical peak-to-peak amplitude of 2 mm) for 180 seconds to perform measurement. Results thereof are shown in FIG. 15.

First, in the comparative example 2, the oscillation point surpasses 5 Hz, and the vibration transmission rate for the oscillation point is as low as 1.7. Thus, the value of the vibration absorption characteristic in a high frequency band of 7 Hz or higher is poor. On the other hand, in the example 1, the oscillation point is 5 Hz or lower, and it can be seen that the vibration absorption characteristic in the high frequency band of 7 Hz or higher is improved more largely than in the comparative example 2. Further, the oscillation point in the example 2 is slightly higher than in the example 1 but is lower than in the comparative example 2, and it can be seen that the vibration absorption characteristic in the high frequency band of 7 Hz or higher is improved more than in the example 1.

TEST EXAMPLE 2-4

Figure 16:
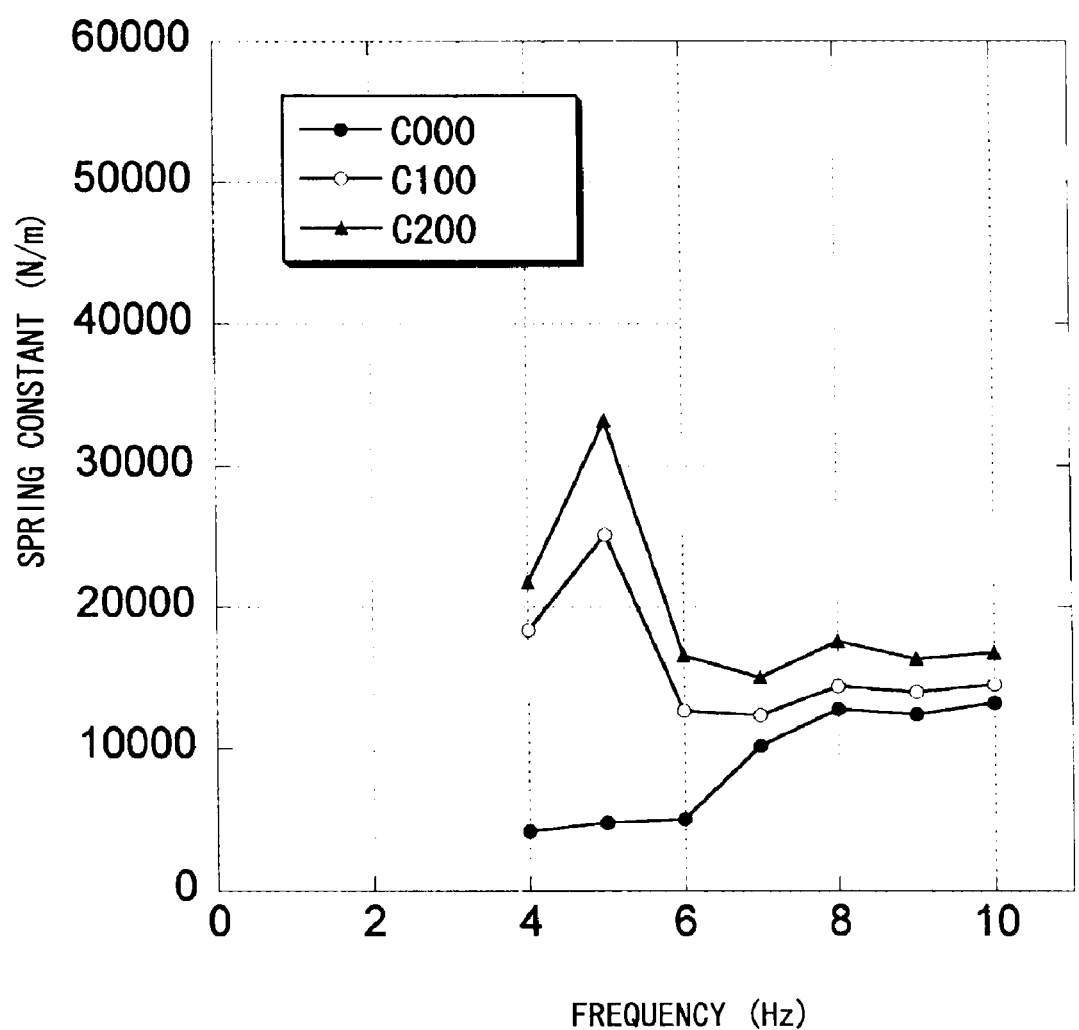
FIG. 16 is a graph showing dynamic spring constants of the seat cushion of the vehicle seat of the example 2 used in test example 2-4.

FIG. 16 shows data indicating dynamic spring constants of a seat having the same structure as the seats of the test examples 2-1 to 2-3, but leather having a thickness as thin as 0.8 mm is used as the outer layer member in this test example 2-4, whereas it is 1.6 mm in the test examples 2-1 to 2-3. In this test example 2-4, the tension of the leather on the outer layer is small as compared to the case of using the aforementioned leather of 1.6 mm with high surface rigidity, thereby providing soft feeling of seating. Thus, independency of each of the various spring members such as the torsion bars, the coil springs, and the flat support members when operating becomes higher compared to the seats of the test examples 2-1 to 2-3 using the leather with a thickness of 1.6 mm having high rigidity. Specifically, in this test example 2-4, as compared to the case of using the leather with a thickness of 1.6 mm, a property such that the various spring members work differently corresponding to the magnitude of excitation force appears easily. For example, when the excitation force is small, the flat support members function mainly, and when the excitation force is large, the coil springs on the side portions as middle-layer spring members move forward and downward, do not operate largely in a tensile direction, and function as an elastic pendulum which rotary moves while expanding/contracting (hereinafter referred to as "elastic pendulum motion"). Further, movement of the buttocks forward and downward with the femurs being the fulcrum increases the operation of the torsion bar (deep-layer spring member) arranged in the deep layer, and thus vibration can be absorbed. Therefore, it is preferable to use such a thin member as the outer layer member by which stable feeling of seating without loose feeling can be achieved, and by the high vibration damping performance capable of corresponding from minute vibration to impacting vibration, comfortable feeling of riding can be achieved.

Since the seat using thin leather (outer layer member) has such characteristics, the leather sinks deeply when the load mass with 6.7 kg weight is mounted on the first human body support portion 11 under exactly the same condition as in the test example 2-2, and since the rear-side torsion bar is already operating at the equilibrium position thereof, the rear torsion bar do not operate due to minute displacement. Accordingly, in this test example 2-4, the vibration condition is made larger such that the one-side amplitude is 2.5 mm (vertical peak-to-peak amplitude of 5 mm), excitation force by which the rear-side torsion bar can operate by vibration from the equilibrium position is given, and thereby the dynamic spring constant $kd1$ in the first human body support portion 11 is obtained.

On the other hand, the dynamic spring constants $kd2$, $kd3$ in the second and third human body support portions 12, 13 are obtained with the one-side amplitude of 1 mm (vertical peak-to-peak amplitude of 2 mm), similarly to the above test example 2-2. The seat of the present invention is characterized in that the dynamic spring constants are $kd1<kd2$, and the second human body support portion 12 supporting the femurs becomes the fulcrum of motion. Therefore, when obtained with the same condition as the above dynamic spring constant $kd1$, the load mass 6.7 kg is relatively too heavy and large acceleration is generated, thus resulting in a different pressure distribution from that when a person is actually seated. Specifically, in this test example 2-4, considering the difference in influence on the input vibration due to that the body pressure distribution when a person is actually seated is different depending on a portion, the dynamic spring constants $kd1$, $kd2$, $kd3$ are obtained according to actual seating conditions.

Figure 17:
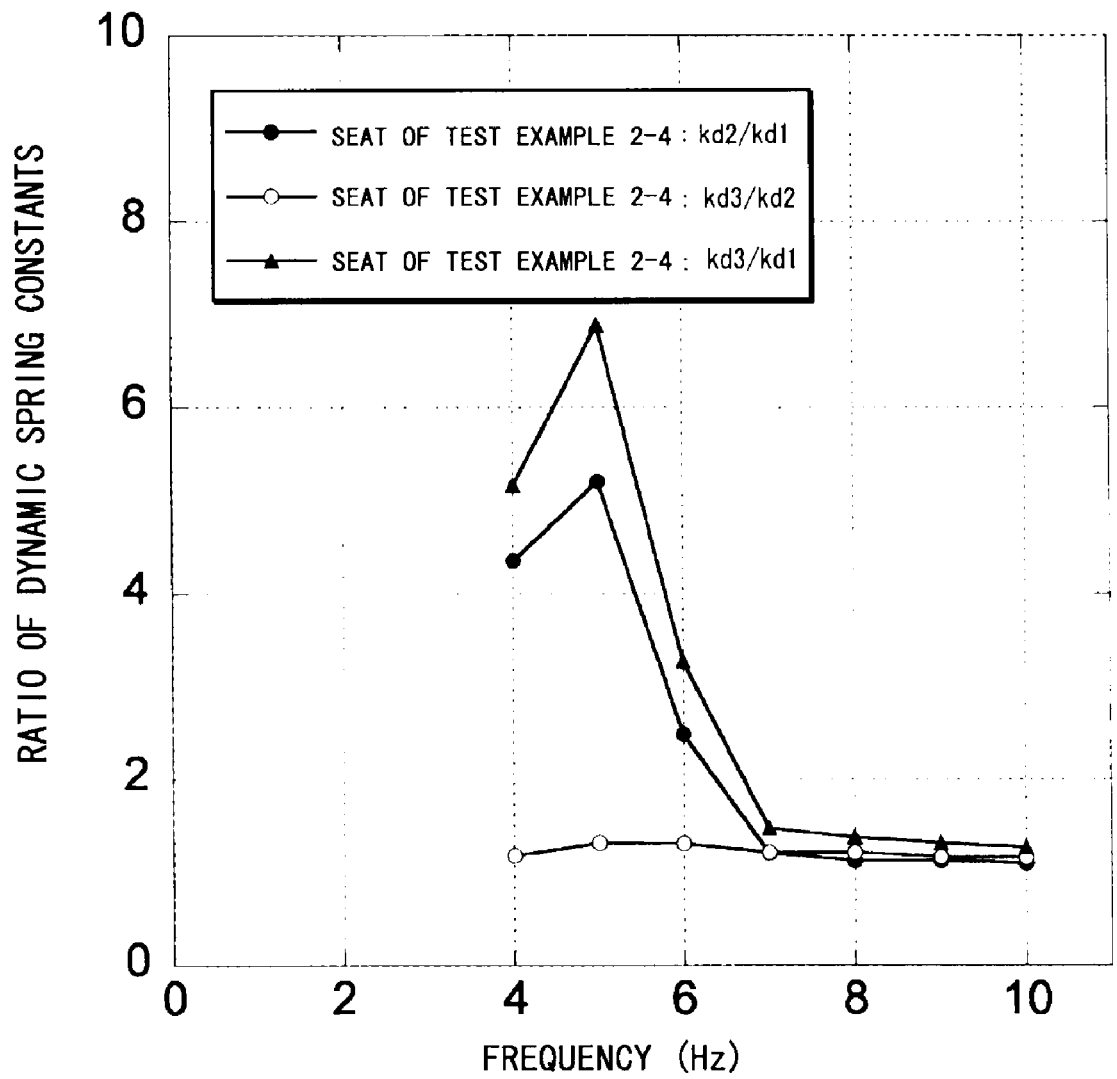
FIG. 17 is a graph showing ratios of dynamic spring constants of the seat cushion of the vehicle seat of the example 2 used in the test example 2-4.

From FIG. 16, the seat of this test example 2-4 has a structure satisfying the condition $kd1<kd2<kd3$, similarly to the test example 2-2. Further, when ratios of $kd2/kd1$, $kd3/kd2$, $kd3/kd1$ are obtained, as shown in FIG. 17, they fall within the range of the above-described conditional expressions at all vibration frequencies.

In addition, the dynamic spring constant $kd2$, when obtained by applying vibration with large excitation force (one-side amplitude of 2.5 mm (vertical peak-to-peak amplitude of 5 mm)) similarly to the dynamic spring constant $kd1$ in the first human body support portion 11, is approximately equal to the dynamic spring constant $kd1$. As a result, the relationship between the dynamic spring constant $kd2$ in the second human body support portion 12 and the dynamic spring constant $kd3$ in the third human body support portion 13 becomes similar to the aforementioned relationship between $kd1$ and $kd2$. This indicates an excitation characteristic when impacting vibration is inputted, such as a fat person with large buttocks, collision, or the like. This is because by the coil springs on the side portions move forward and downward, the position of the second human body support portion 12 corresponds to the portion below the ischial tuberosities of a person with large buttocks, and also corresponds to the portion below the ischial tuberosities when impacting vibration is inputted and the buttocks move forward. Therefore, in this meaning, the seat of the present invention absorbs a difference in physique sizes and a difference in seating postures, and in which the distribution of the dynamic spring constants can be changed arbitrarily according to load mass dependency. Note that this point will be described again later using FIG. 39 to FIG. 50.

TEST EXAMPLE 2-5

Next, for the seat of the example 2 (using the thin leather with a thickness of 0.8 mm as the outer layer member used in the test example 2-4) and the seat of the comparative example 2, pressure-amplitude differences with respect to the vibration frequency to be the index for how much the boundary surface between the outer layer member and the muscle moves are obtained in a state that a test subject weighing 58 kg is seated. Results thereof are shown in FIG. 18.

As shown in FIG. 18, the difference is obtained for the ischial tuberosity portion corresponding to the first human body support portion 11 as well as the position corresponding to a front portion of the pelvis, but for the both cases, they are lower in the test example 2-4 than in the comparative example 2. This is largely influenced by that when the dynamic spring constant $kd1$ of the ischial tuberosity portion (C000) of the comparative example 2 shown in FIG. 11 is compared with the dynamic spring constant $kd1$ at C000 of this test example 2-5 shown in FIG. 16, it is much lower in this test example 2-5. In the seat used in this test example 2-5, not only the reduction of medium values of pressure but also a pressure-amplitude reduction effect is high, as shown by the vibration transmission rate.

TEST EXAMPLE 2-6

Here, in the above explanation, it is explained that the human body support portion that operates dominantly changes according to the vibration frequency by setting the dynamic spring constants to satisfy the above-described conditional expressions. To prove this, the weight with a diameter of 98 mm and a mass of 6.7 kg is set to the first human body support portion 11, vibration is applied at ten stages of vibration frequencies from 1 Hz to 10 Hz with a sine wave having one-side amplitude of 2.5 mm (vertical peak-to-peak amplitude of 5 mm), and the relationship between a relative displacement amount of the weight and a load operating on the weight is represented by Lissajous figures. Results are shown in FIG. 19 to FIG. 28. From the Lissajous figures, it is also possible to read the static spring constants considering only the spring characteristics, where the static spring constant in the gravitational direction in which the weight displaces downward is shown by s-1, and a static spring constant in the weight releasing direction in which the weight displaces upward is shown by s-2. Note that in the test example 2-6, there is used a seat identical to that in the test examples 2-4 and 2-5, specifically, the seat having the structure of the example 2 and using the thin leather with a thickness of 0.8 mm as the outer layer member.

Figure 19:
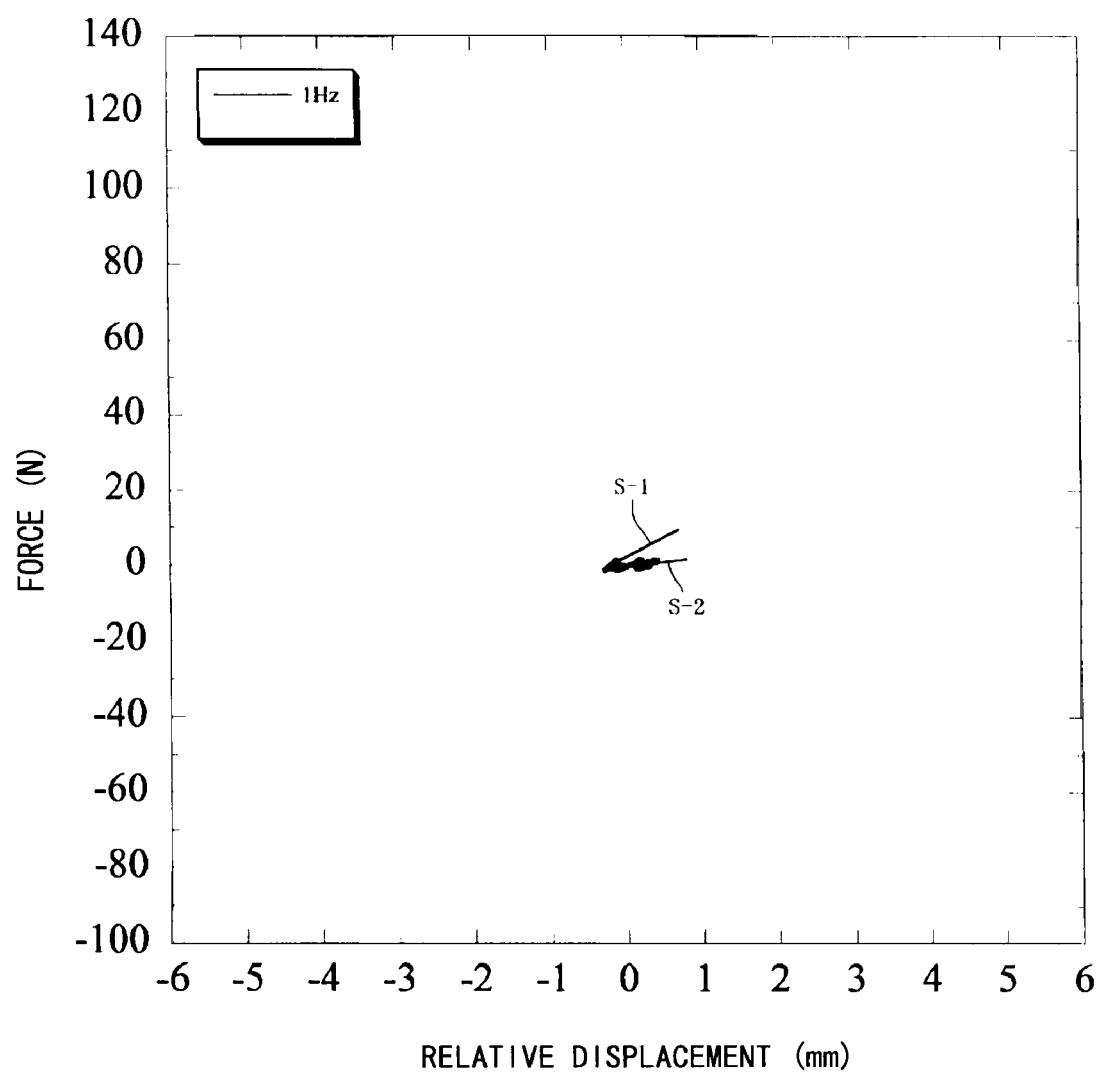
FIG. 19 is a Lissajous figure at 1 Hz when a weight is set to the first human body support portion and measurement is performed in a test example 2-6.
Figure 20:
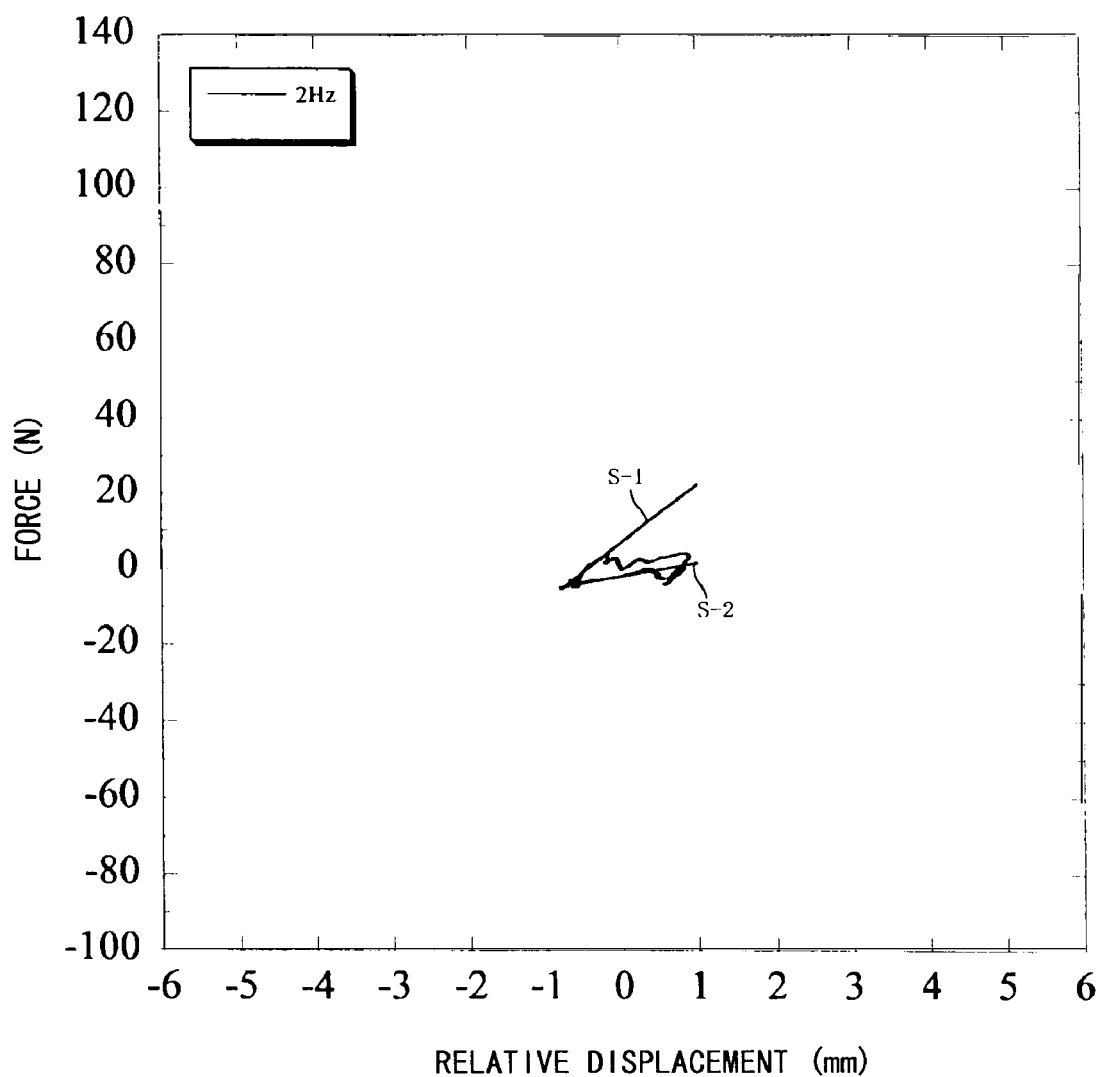
FIG. 20 is a Lissajous figure at 2 Hz when the weight is set to the first human body support portion and measurement is performed in the test example 2-6.
Figure 21:
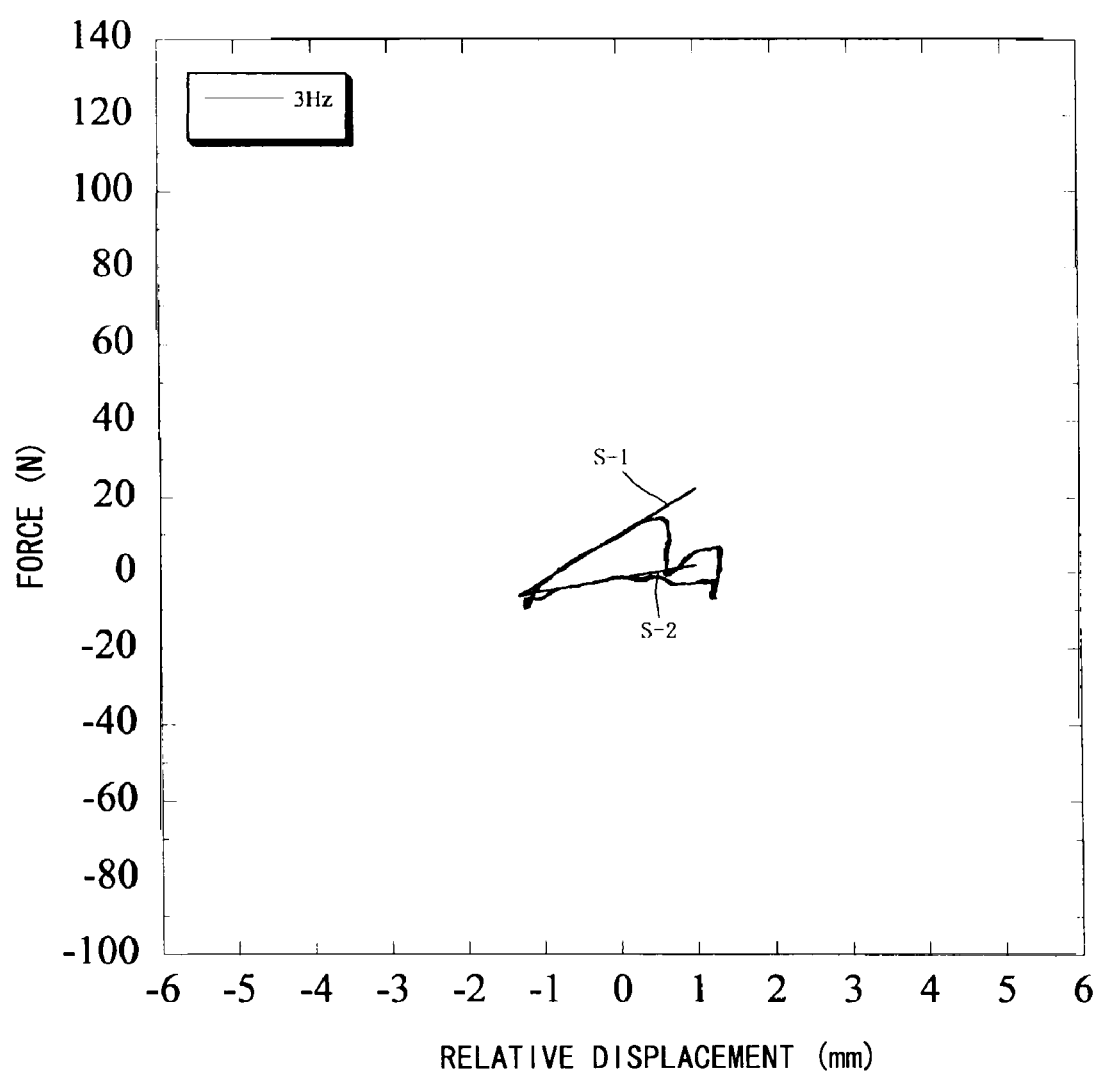
FIG. 21 is a Lissajous figure at 3 Hz when the weight is set to the first human body support portion and measurement is performed in the test example 2-6.
Figure 22:
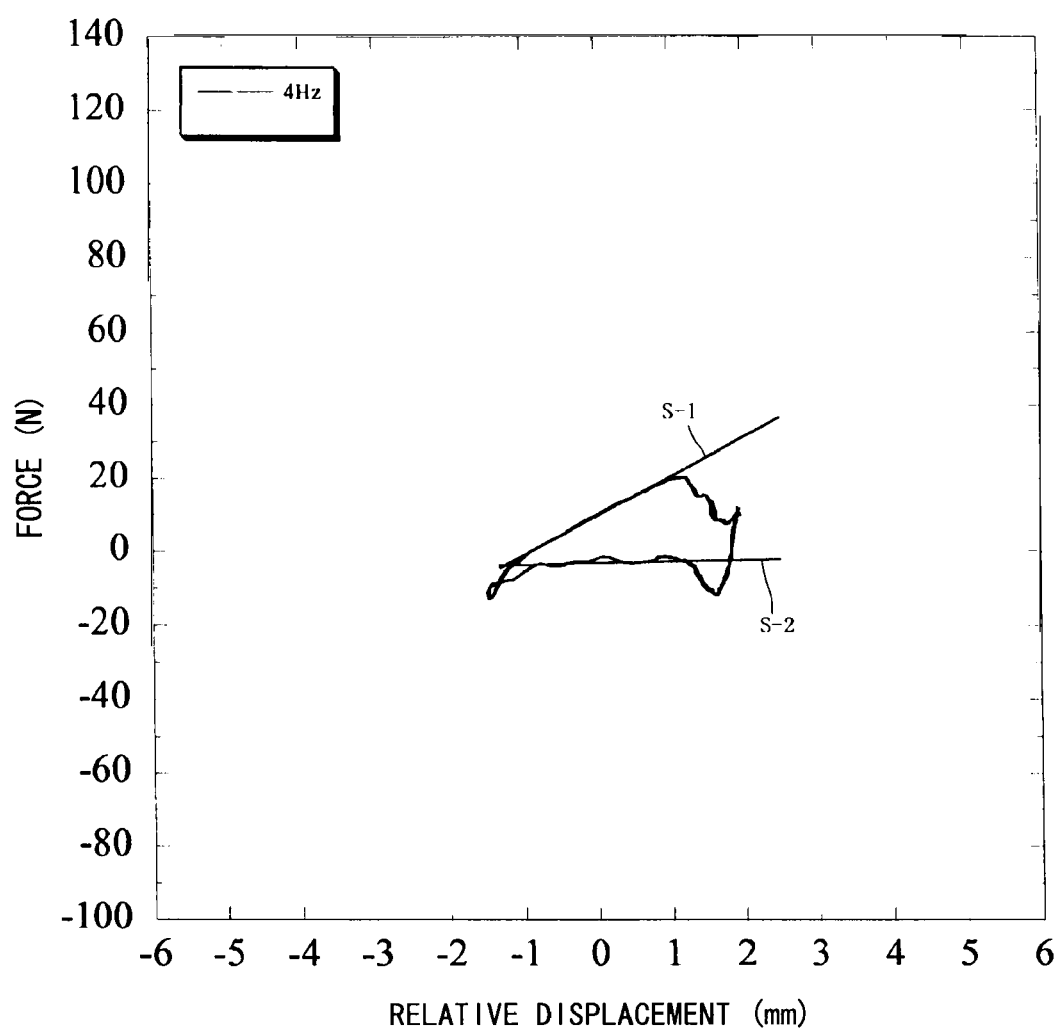
FIG. 22 is a Lissajous figure at 4 Hz when the weight is set to the first human body support portion and measurement is performed in the test example 2-6.
Figure 23:
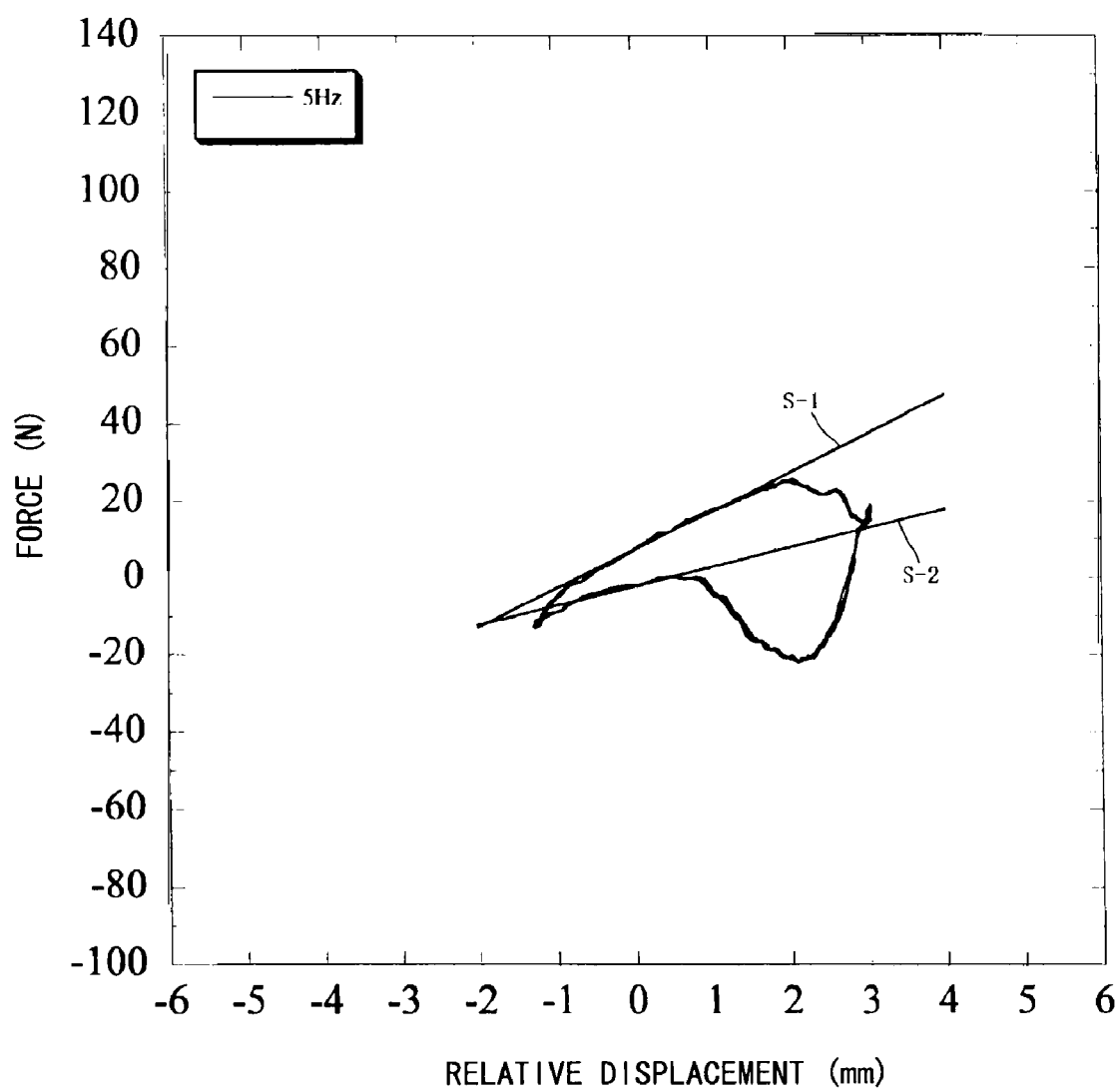
FIG. 23 is a Lissajous figure at 5 Hz when the weight is set to the first human body support portion and measurement is performed in the test example 2-6.
Figure 24:
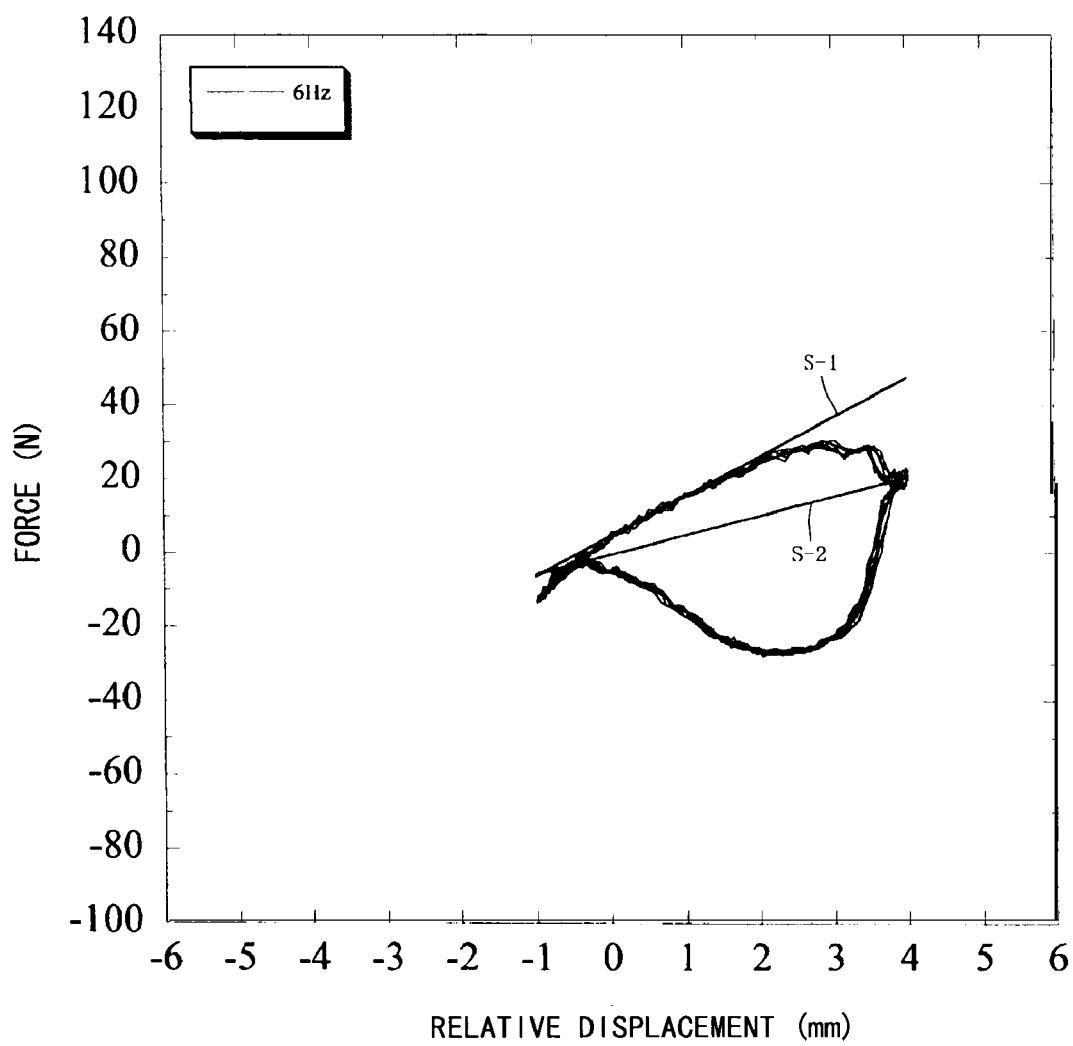
FIG. 24 is a Lissajous figure at 6 Hz when the weight is set to the first human body support portion and measurement is performed in the test example 2-6.
Figure 25:
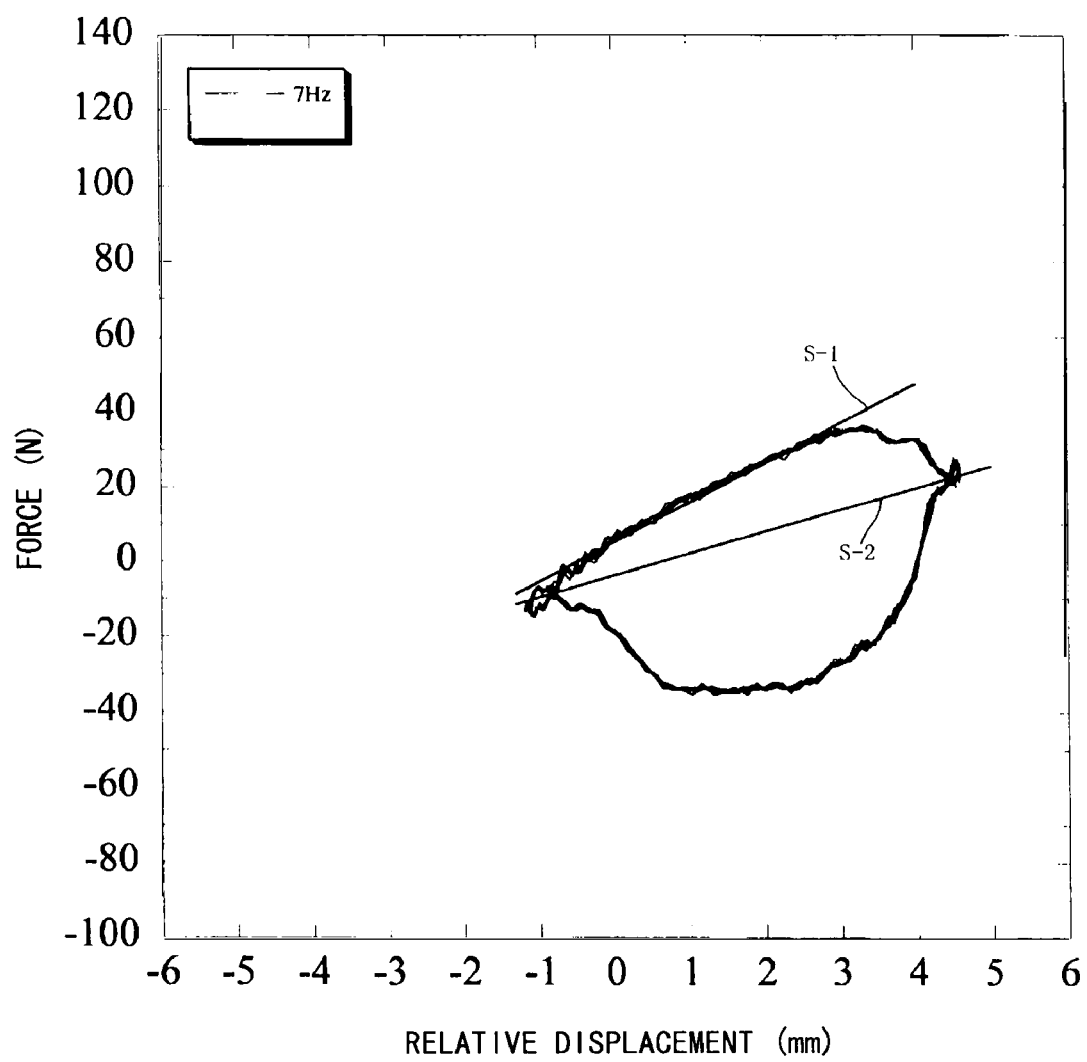
FIG. 25 is a Lissajous figure at 7 Hz when the weight is set to the first human body support portion and measurement is performed in the test example 2-6.
Figure 26:
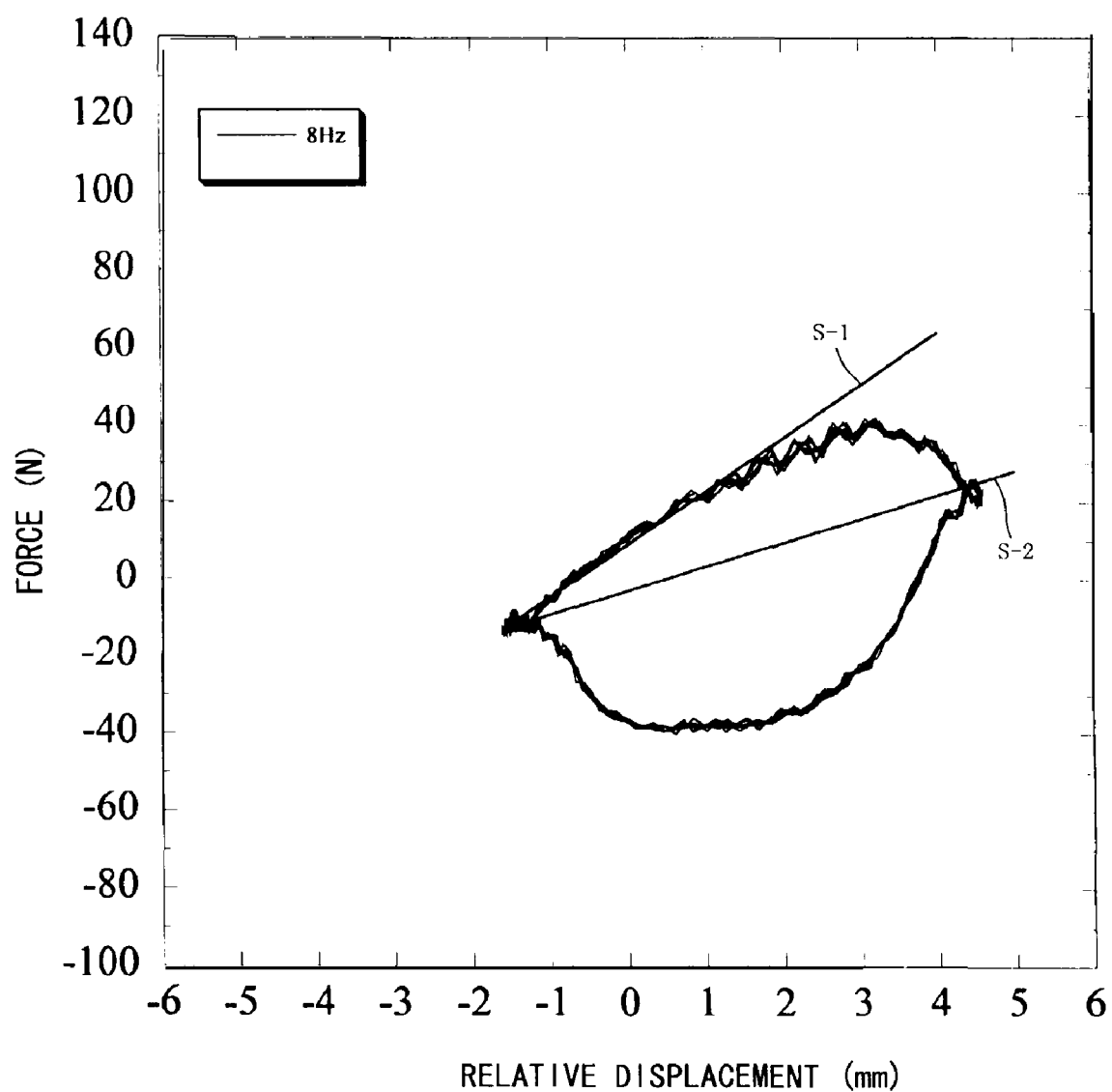
FIG. 26 is a Lissajous figure at 8 Hz when the weight is set to the first human body support portion and measurement is performed in the test example 2-6.
Figure 28:
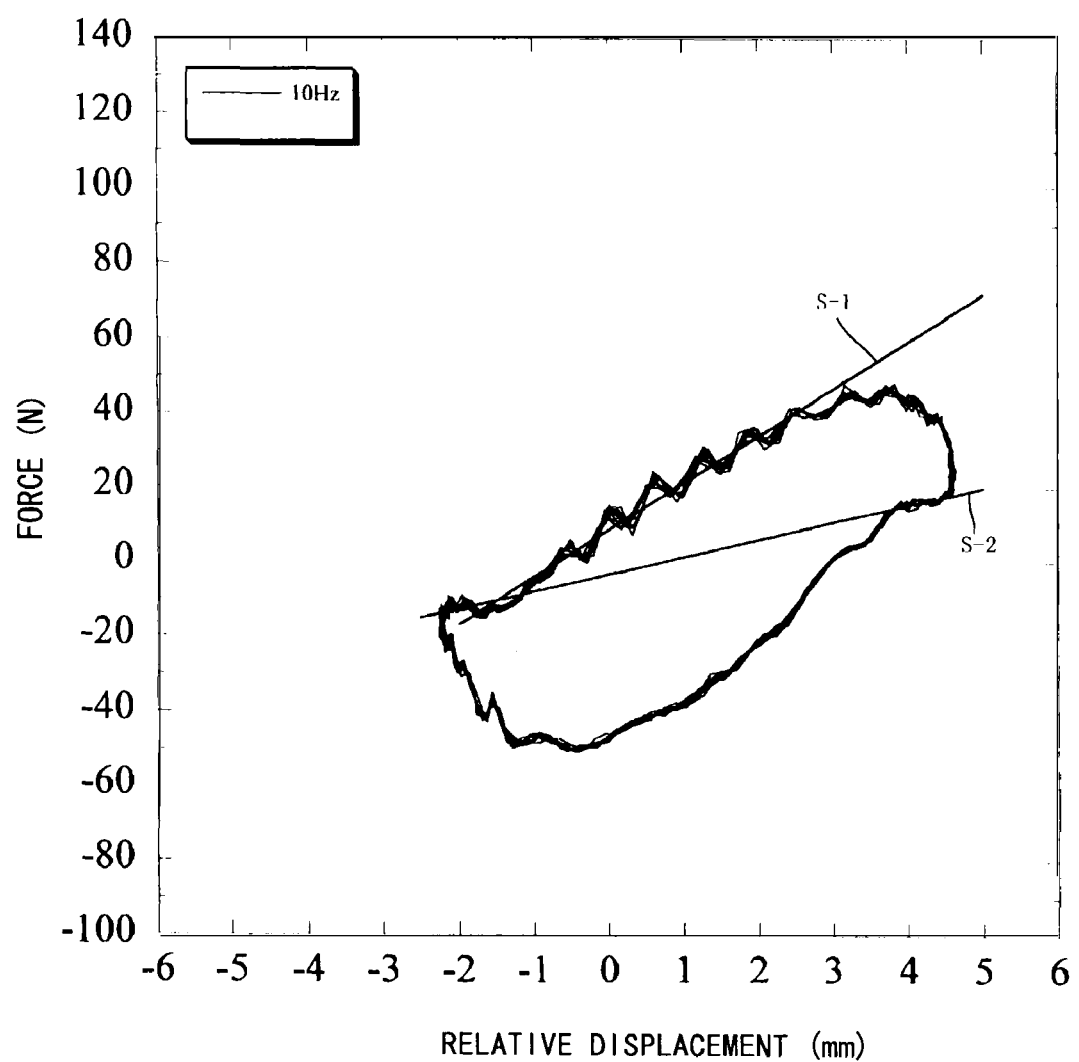
FIG. 28 is a Lissajous figure at 10 Hz when the weight is set to the first human body support portion and measurement is performed in the test example 2-6.
Figure 29:
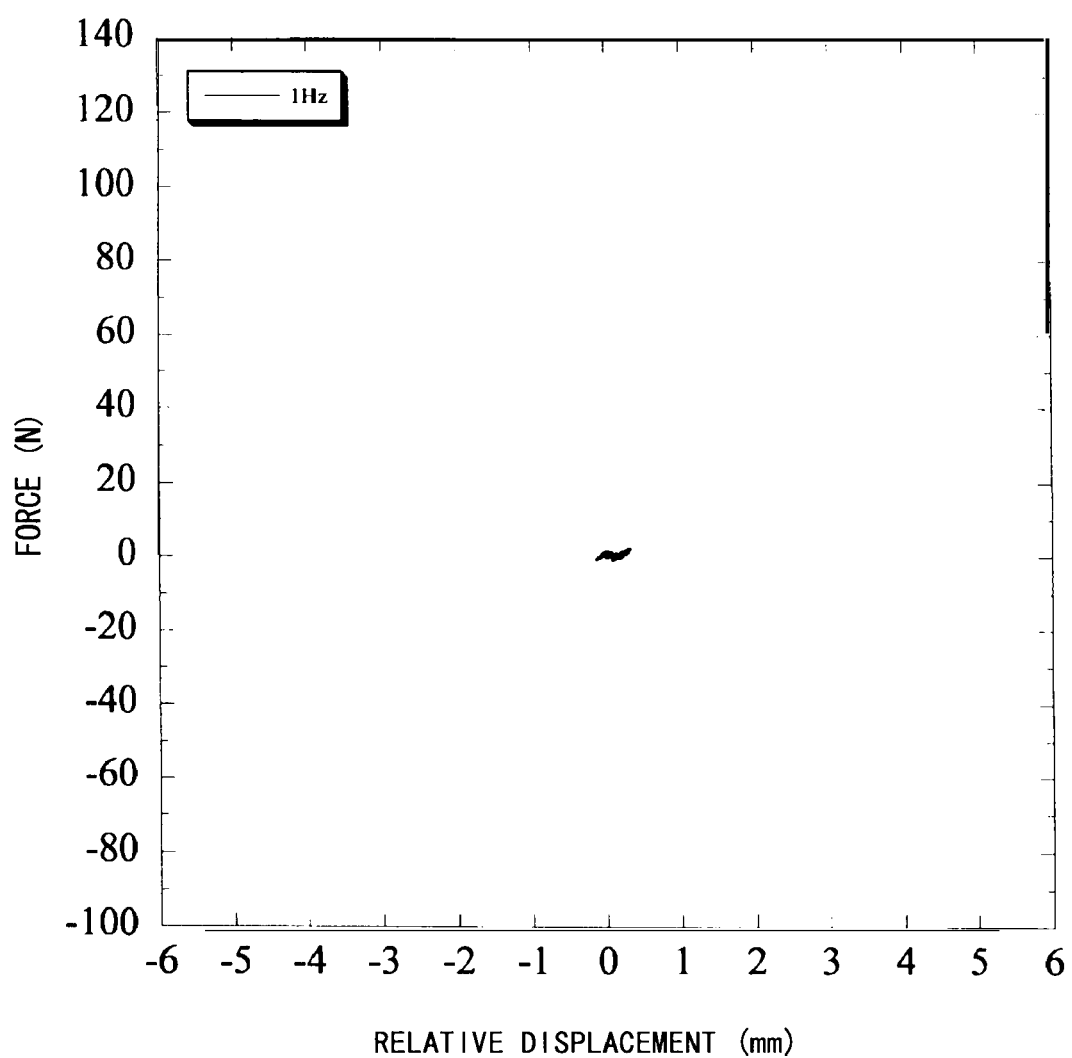
FIG. 29 is a Lissajous figure when the weight is set to the second human body support portion and vibration is applied with one-side amplitude of 1 mm (vertical peak-to-peak amplitude of 2 mm) at 1 Hz in test example 2-7.
Figure 30:
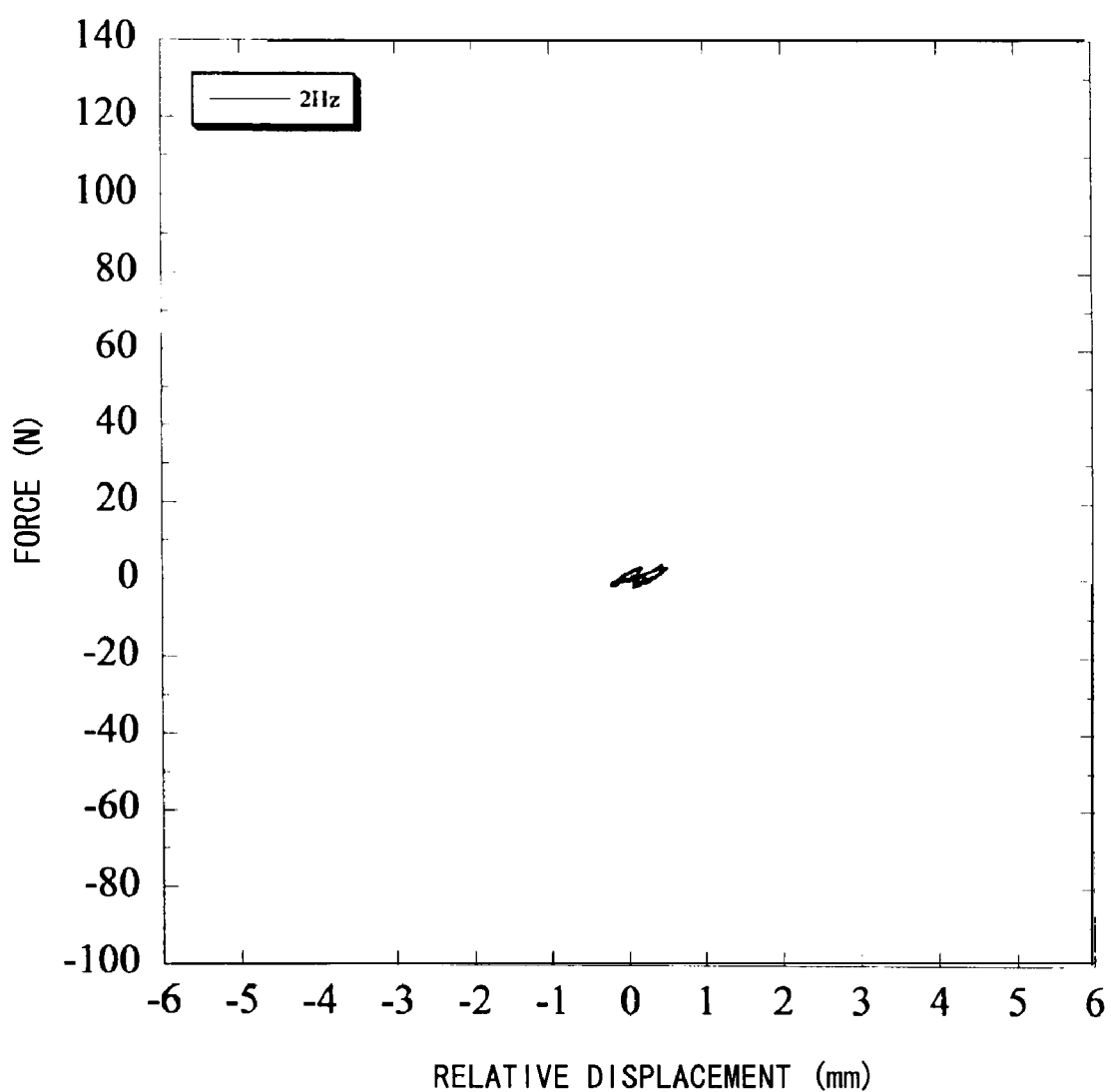
FIG. 30 is a Lissajous figure when the weight is set to the second human body support portion and vibration is applied with one-side amplitude of 1 mm (vertical peak-to-peak amplitude of 2 mm) at 2 Hz in the test example 2-7.
Figure 31:
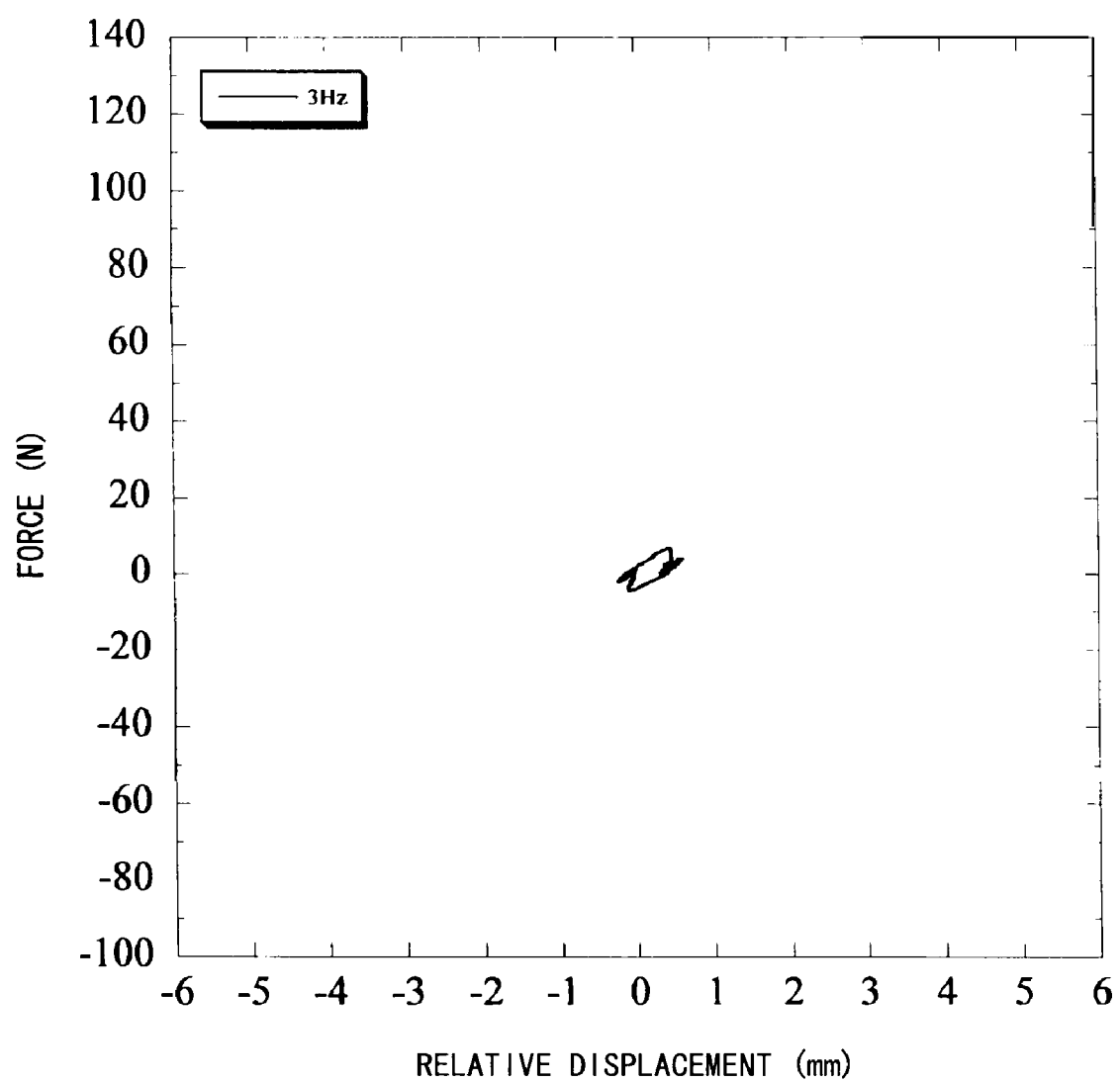
FIG. 31 is a Lissajous figure when the weight is set to the second human body support portion and vibration is applied with one-side amplitude of 1 mm (vertical peak-to-peak amplitude of 2 mm) at 3 Hz in the test example 2-7.
Figure 32:
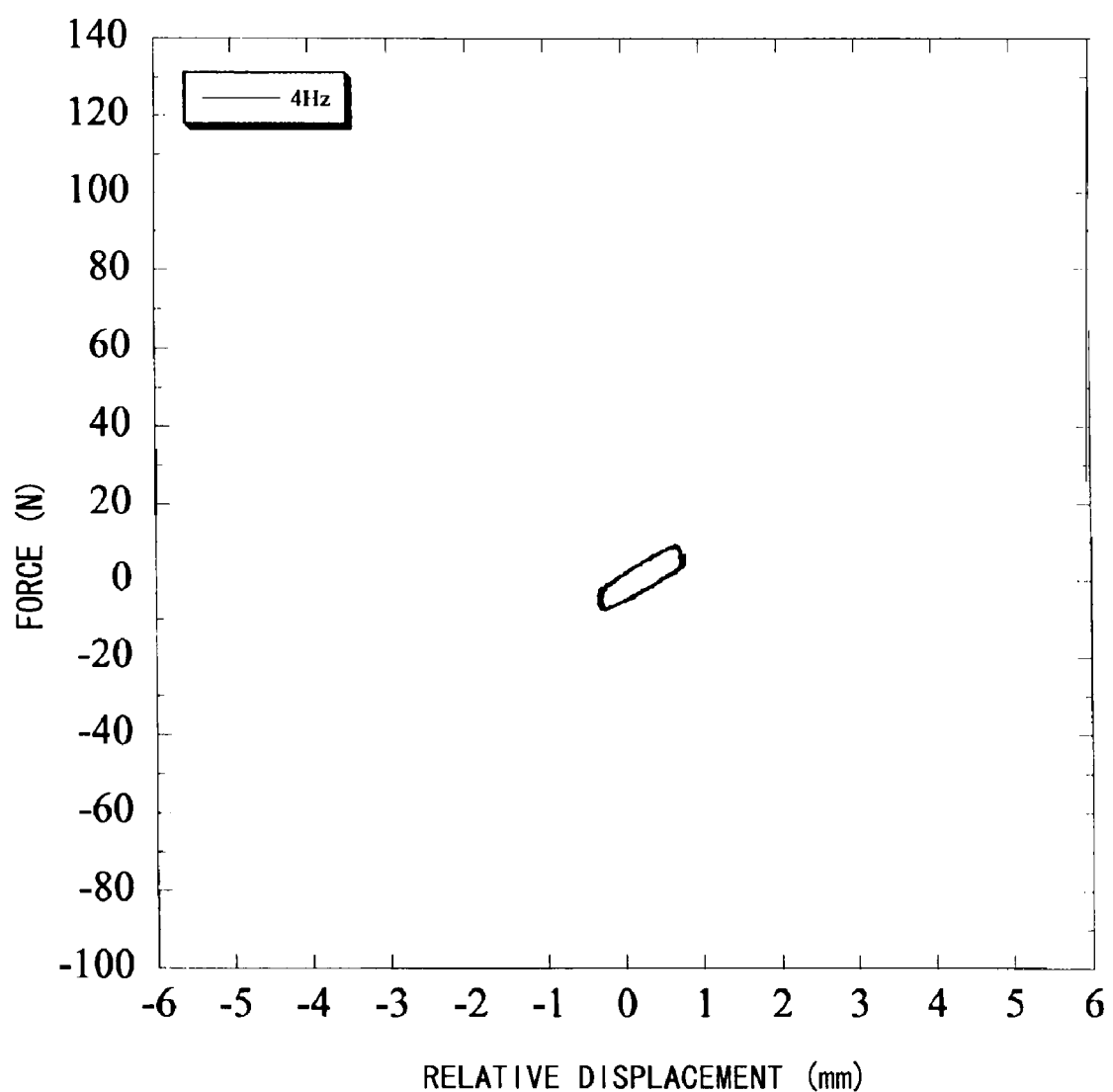
FIG. 32 is a Lissajous figure when the weight is set to the second human body support portion and vibration is applied with one-side amplitude of 1 mm (vertical peak-to-peak amplitude of 2 mm) at 4 Hz in the test example 2-7.
Figure 33:
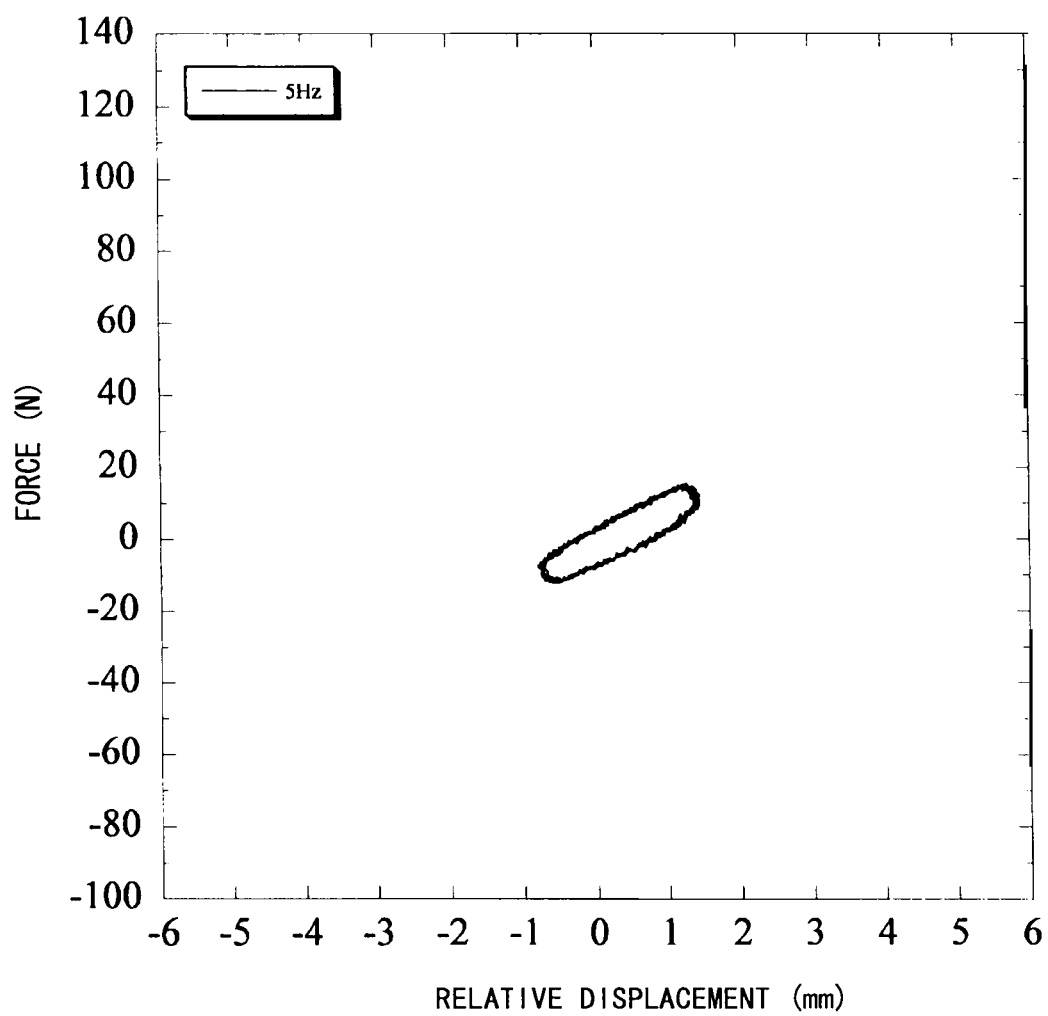
FIG. 33 is a Lissajous figure when the weight is set to the second human body support portion and vibration is applied with one-side amplitude of 1 mm (vertical peak-to-peak amplitude of 2 mm) at 5 Hz in the test example 2-7.
Figure 34:
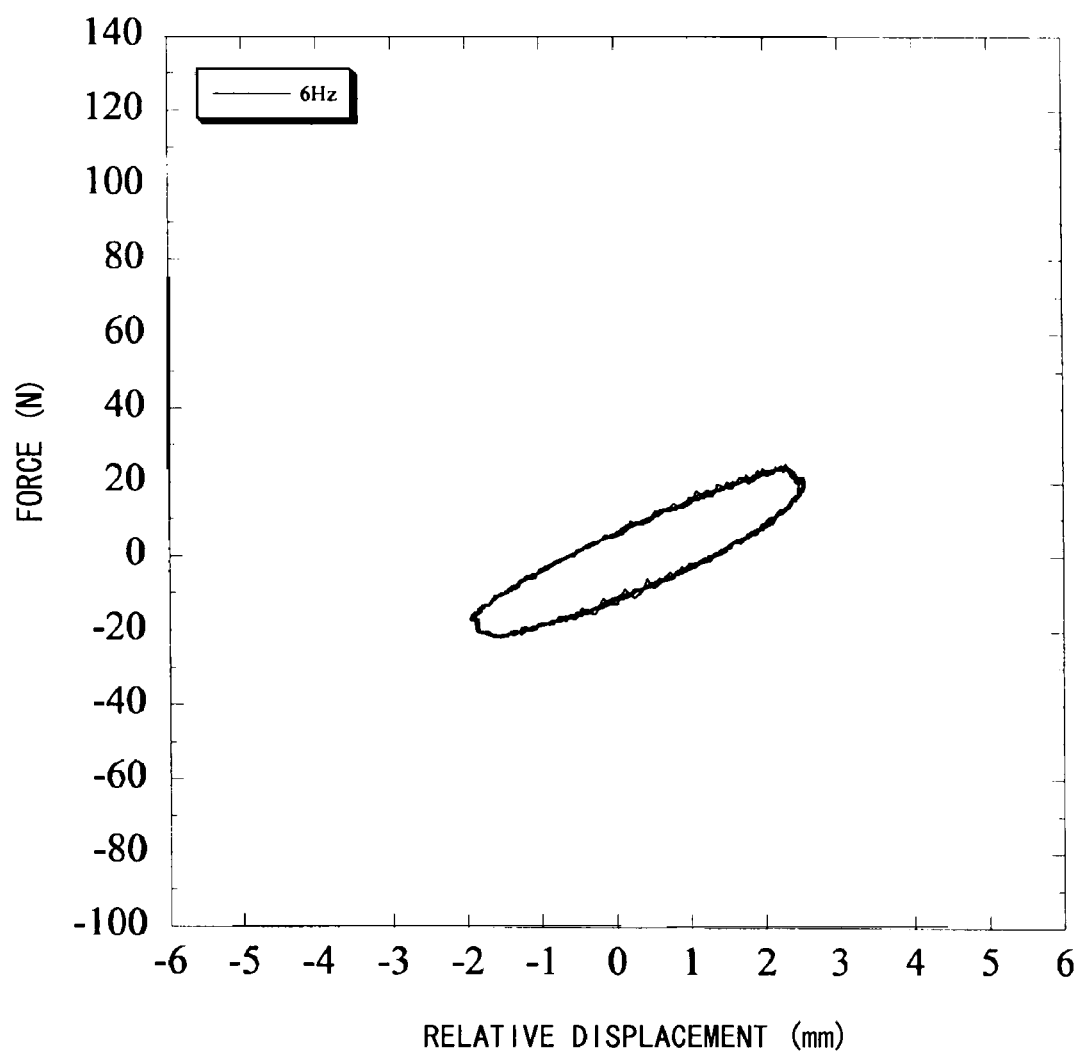
FIG. 34 is a Lissajous figure when the weight is set to the second human body support portion and vibration is applied with one-side amplitude of 1 mm (vertical peak-to-peak amplitude of 2 mm) at 6 Hz in the test example 2-7.
Figure 36:
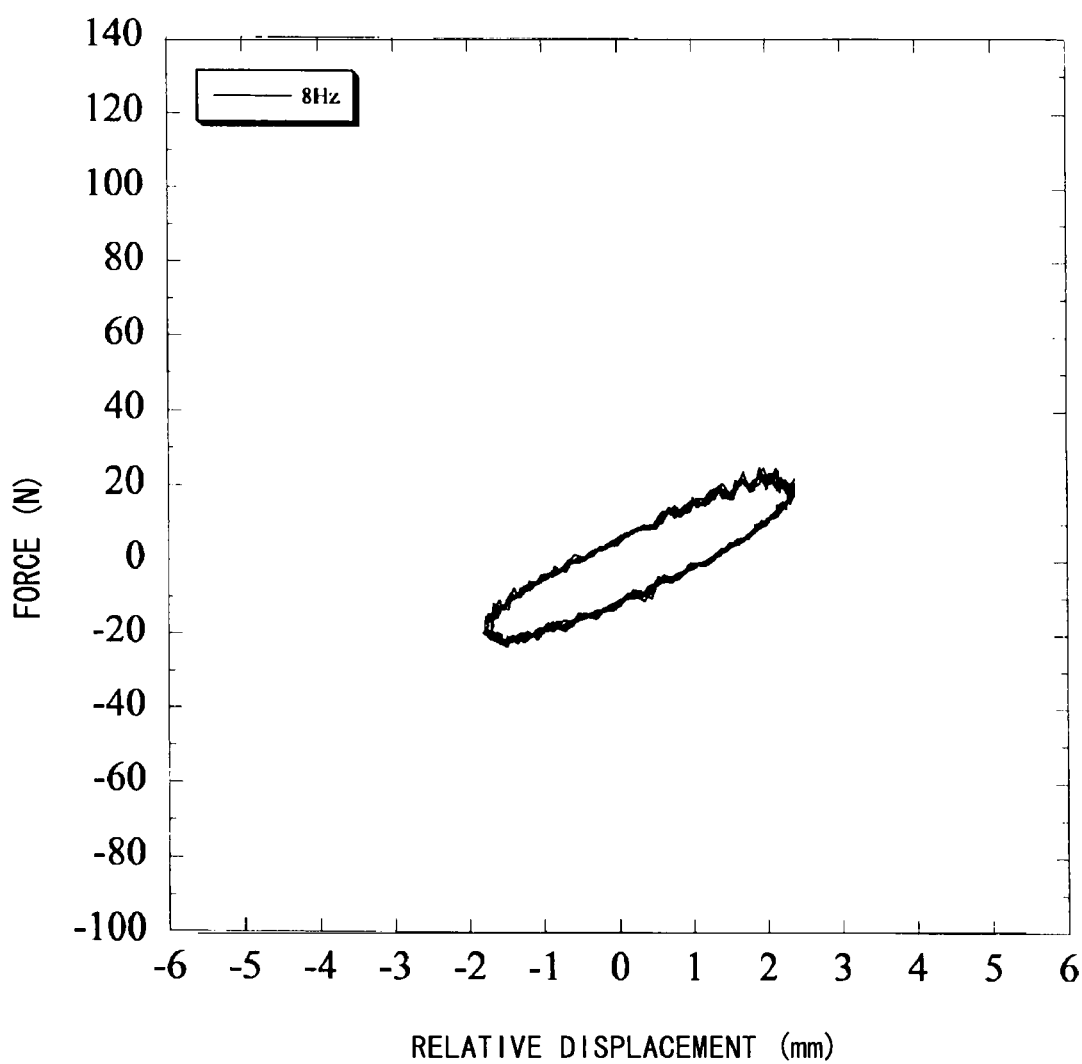
FIG. 36 is a Lissajous figure when the weight is set to the second human body support portion and vibration is applied with one-side amplitude of 1 mm (vertical peak-to-peak amplitude of 2 mm) at 8 Hz in the test example 2-7.
Figure 38:
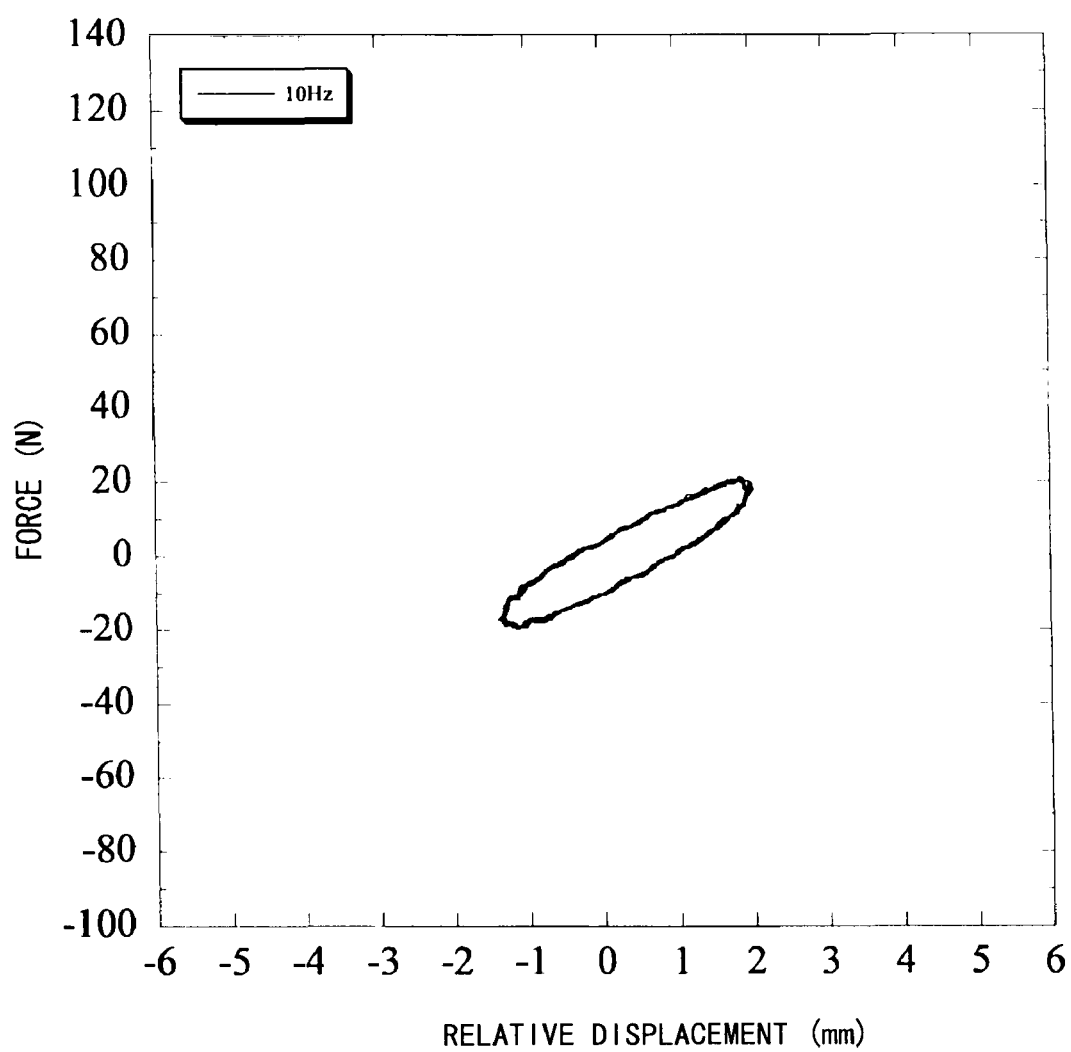
FIG. 38 is a Lissajous figure when the weight is set to the second human body support portion and vibration is applied with one-side amplitude of 1 mm (vertical peak-to-peak amplitude of 2 mm) at 10 Hz in the test example 2-7.
Figure 39:
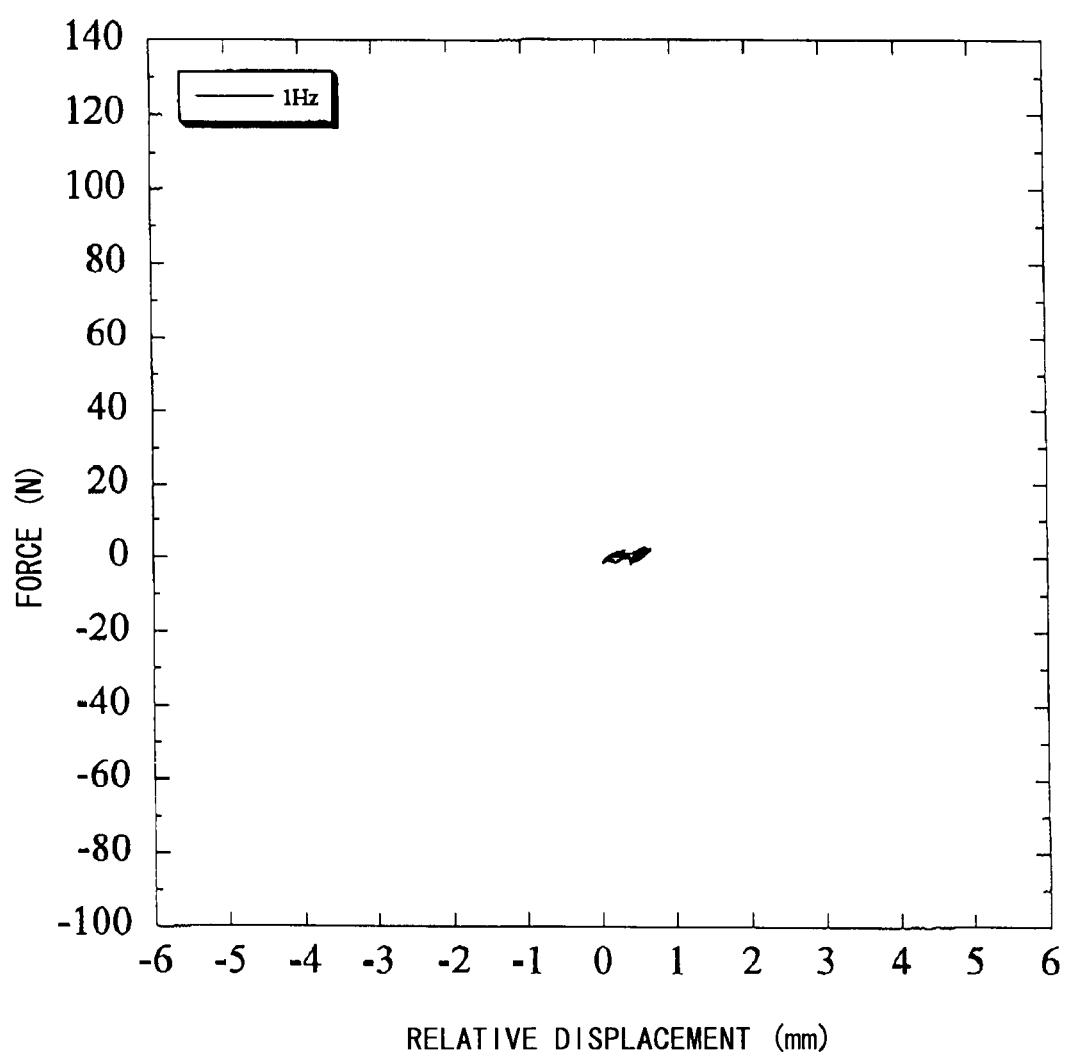
FIG. 39 is a Lissajous figure when the weight is set to the second human body support portion and vibration is applied with one-side amplitude of 2.5 mm (vertical peak-to-peak amplitude of 5 mm) at 1 Hz in the test example 2-7.
Figure 40:
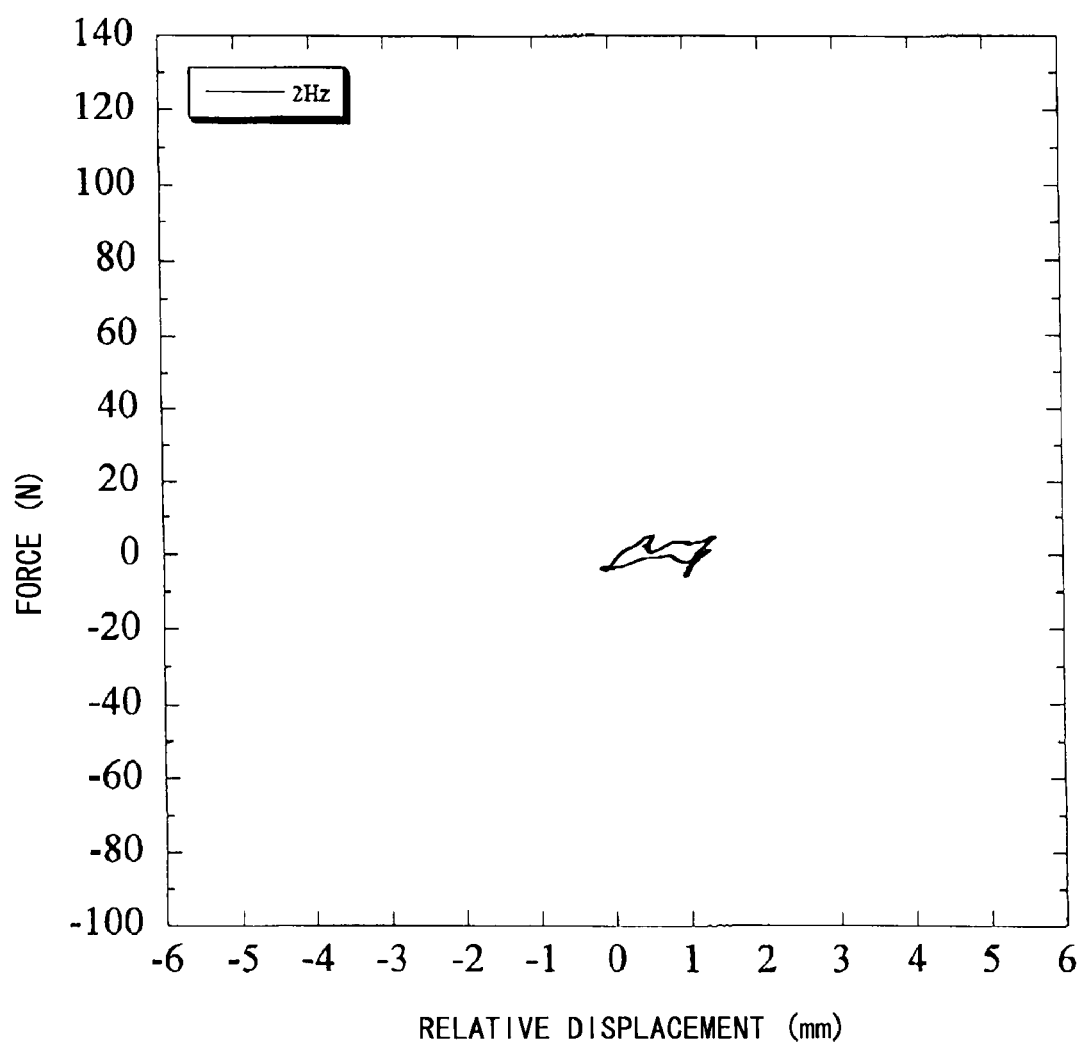
FIG. 40 is a Lissajous figure when the weight is set to the second human body support portion and vibration is applied with one-side amplitude of 2.5 mm (vertical peak-to-peak amplitude of 5 mm) at 2 Hz in the test example 2-7.
Figure 41:
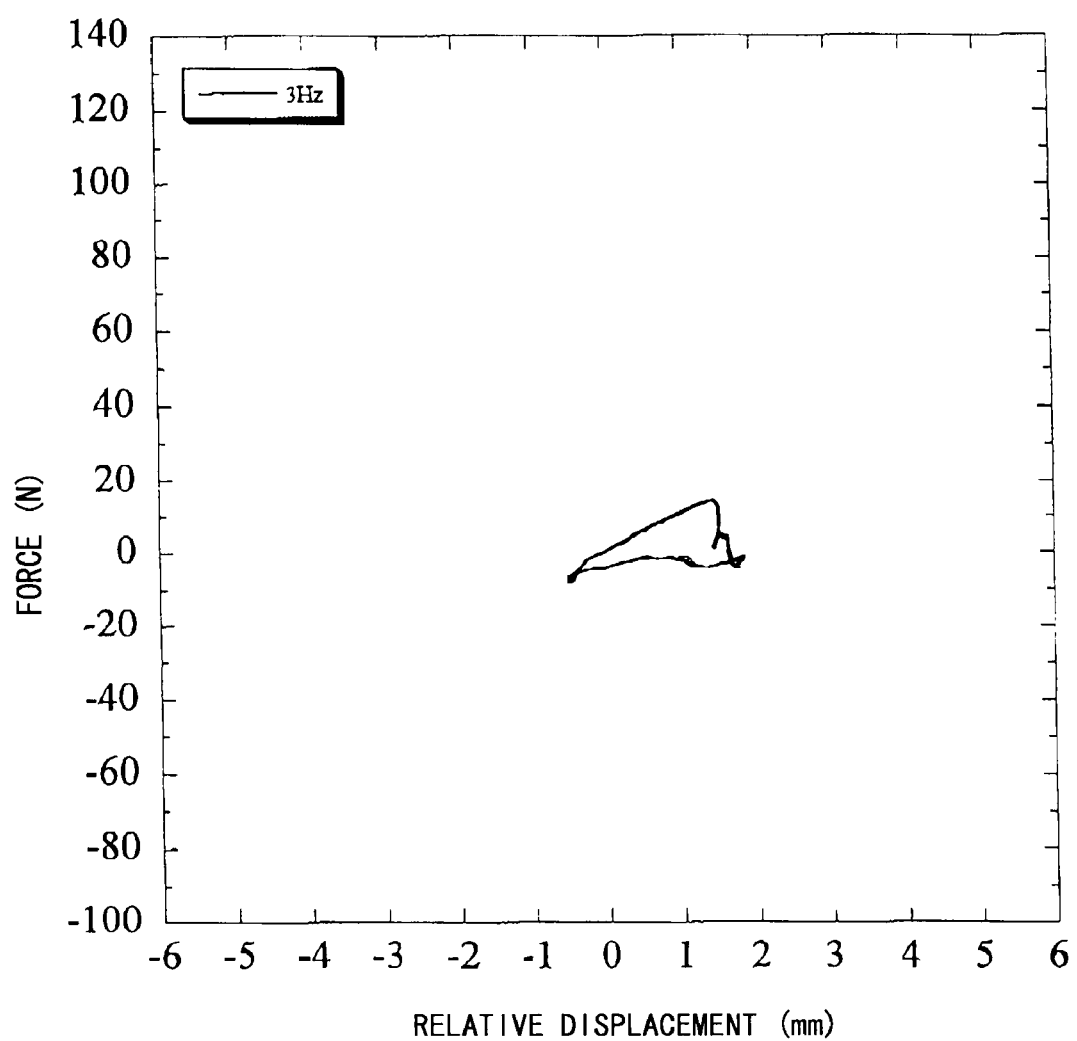
FIG. 41 is a Lissajous figure when the weight is set to the second human body support portion and vibration is applied with one-side amplitude of 2.5 mm (vertical peak-to-peak amplitude of 5 mm) at 3 Hz in the test example 2-7.
Figure 43:
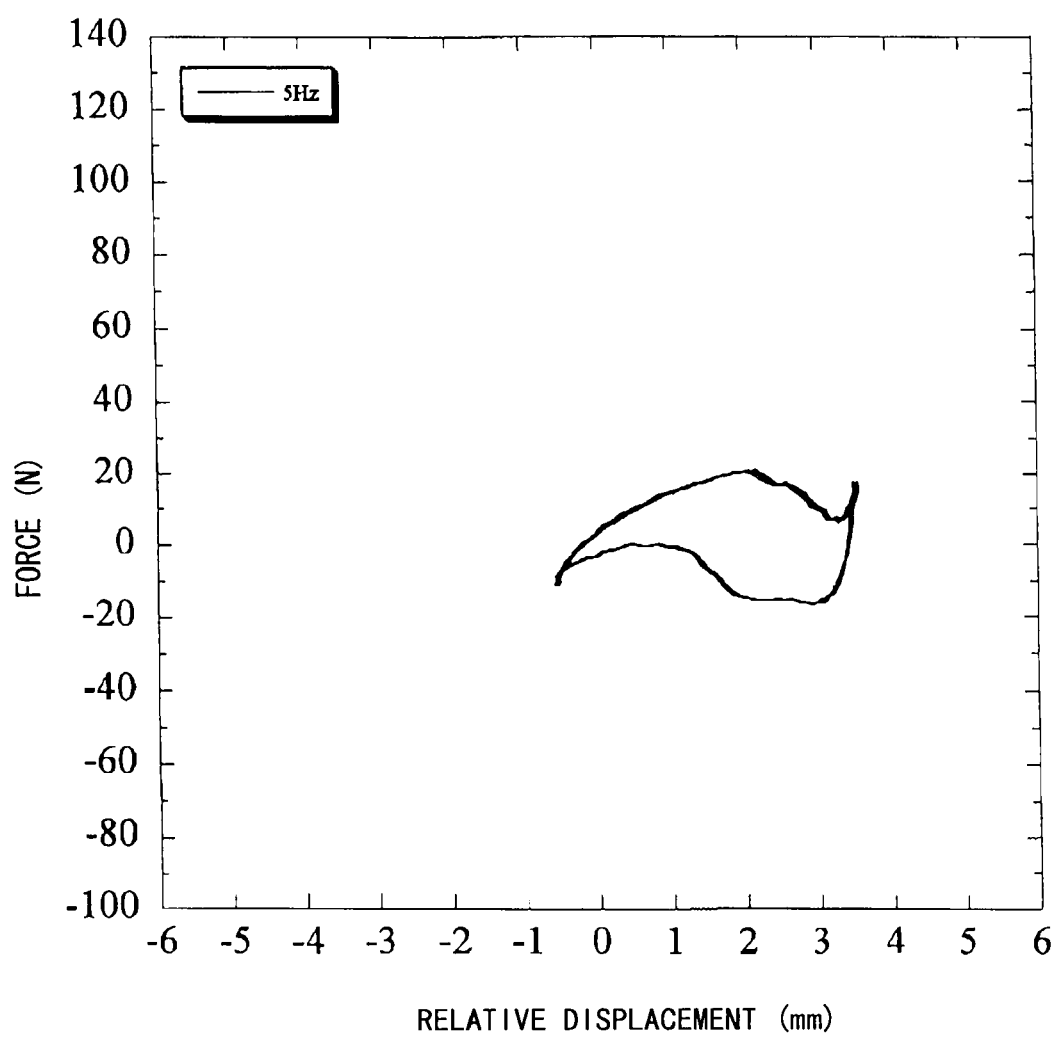
FIG. 43 is a Lissajous figure when the weight is set to the second human body support portion and vibration is applied with one-side amplitude of 2.5 mm (vertical peak-to-peak amplitude of 5 mm) at 5 Hz in the test example 2-7.
Figure 44:
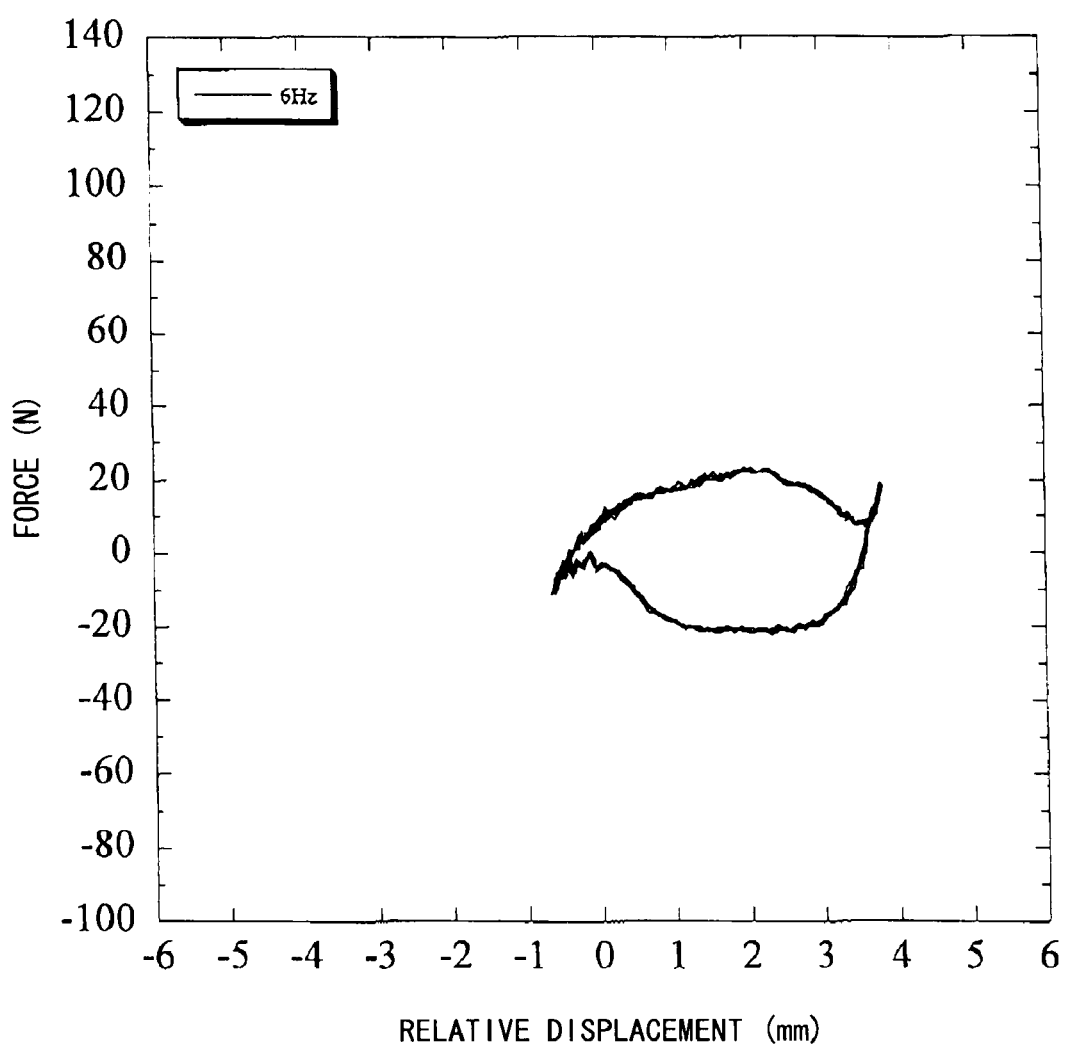
FIG. 44 is a Lissajous figure when the weight is set to the second human body support portion and vibration is applied with one-side amplitude of 2.5 mm (vertical peak-to-peak amplitude of 5 mm) at 6 Hz in the test example 2-7.
Figure 45:
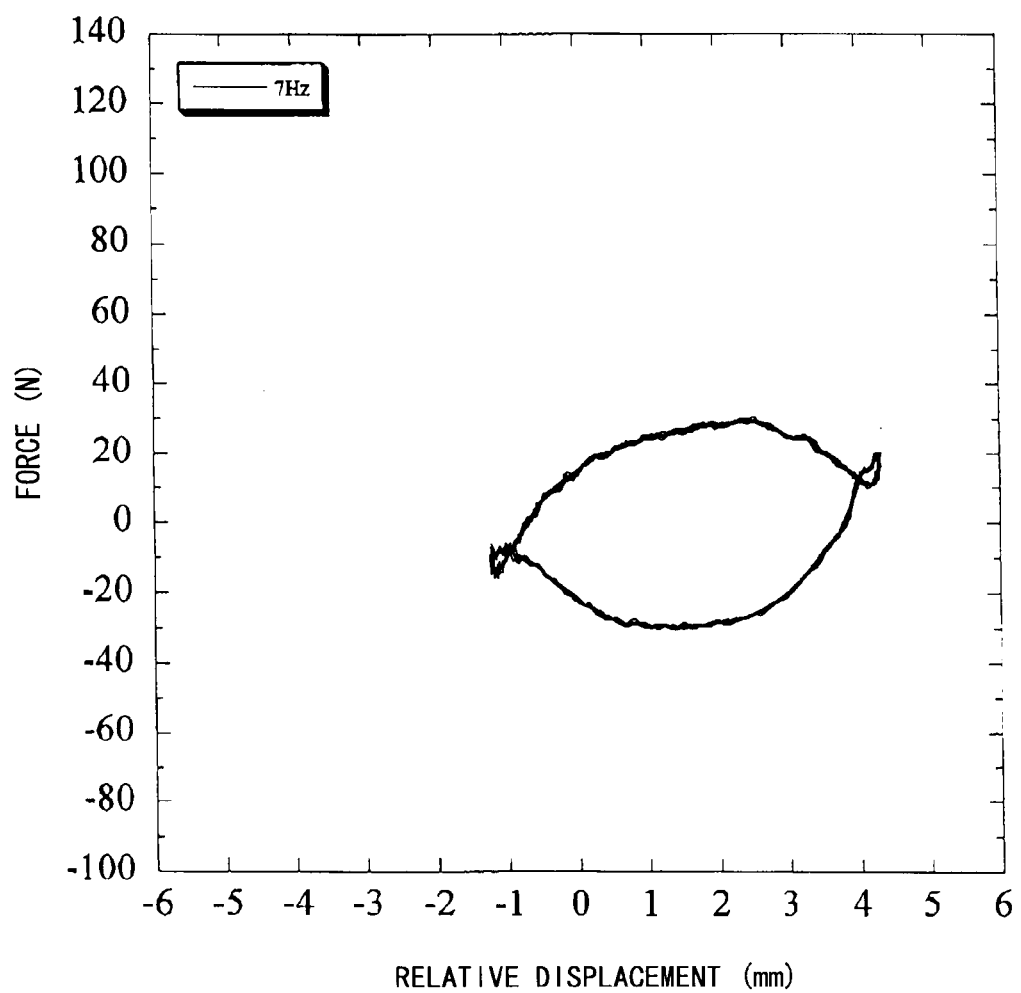
FIG. 45 is a Lissajous figure when the weight is set to the second human body support portion and vibration is applied with one-side amplitude of 2.5 mm (vertical peak-to-peak amplitude of 5 mm) at 7 Hz in the test example 2-7.
Figure 46:
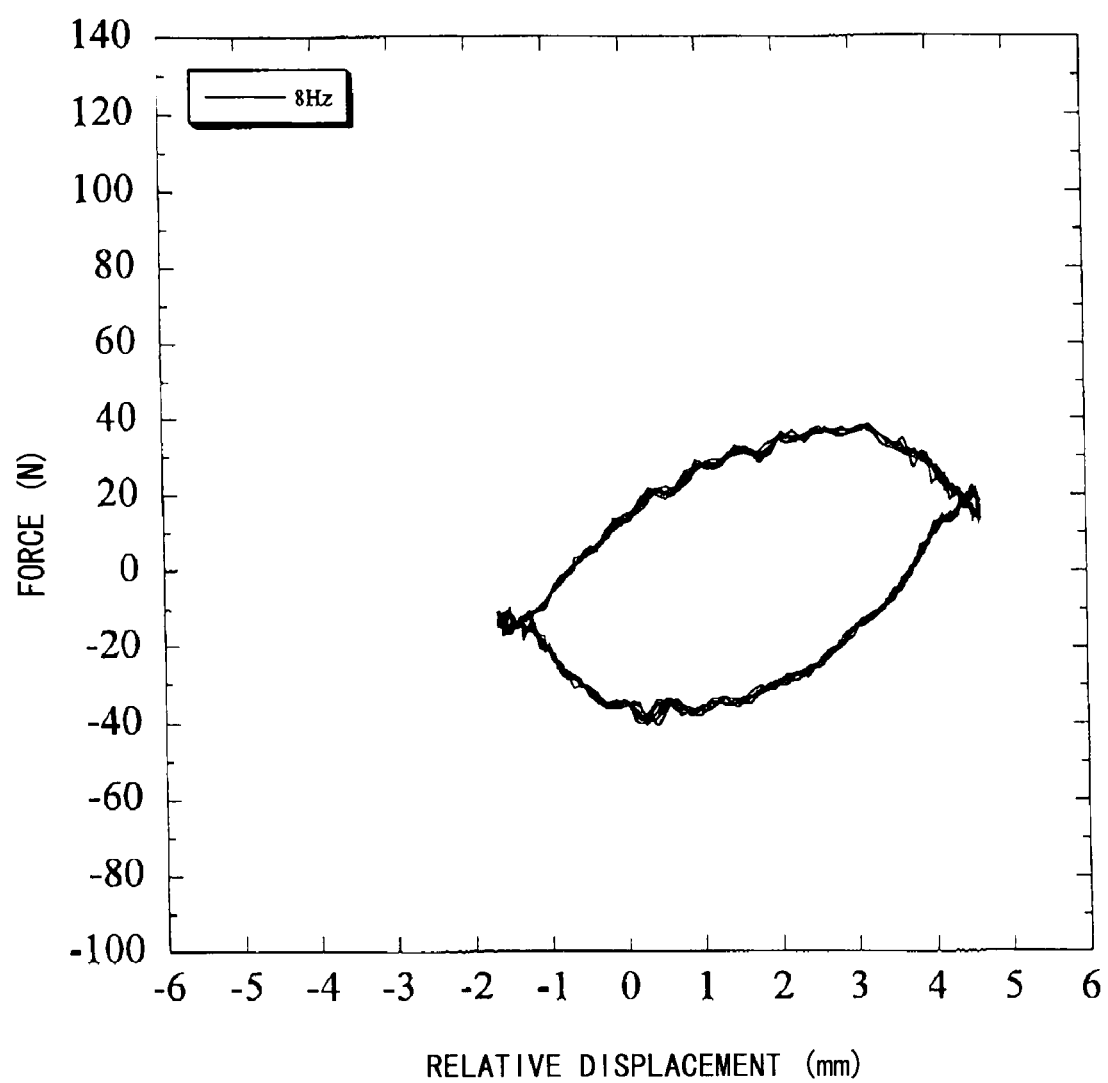
FIG. 46 is a Lissajous figure when the weight is set to the second human body support portion and vibration is applied with one-side amplitude of 2.5 mm (vertical peak-to-peak amplitude of 5 mm) at 8 Hz in the test example 2-7.
Figure 47:
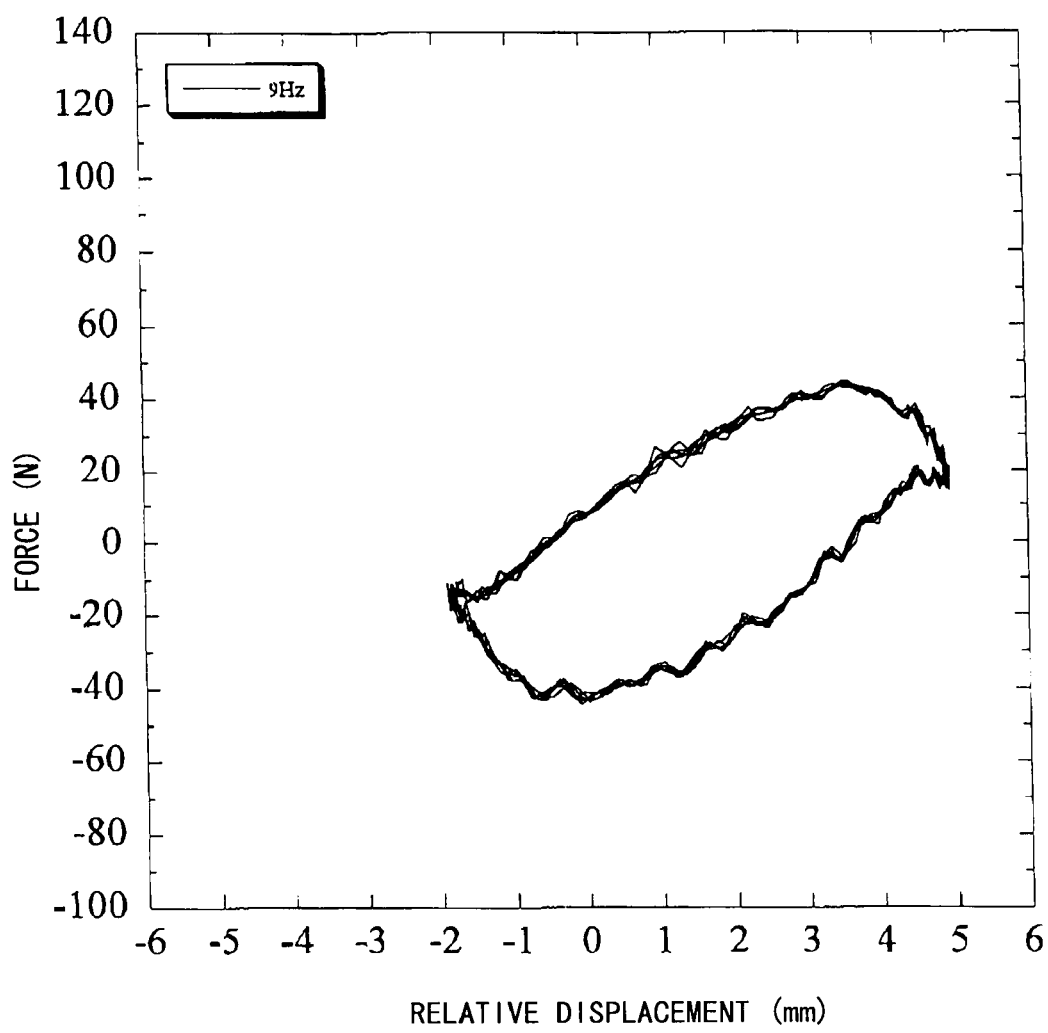
FIG. 47 is a Lissajous figure when the weight is set to the second human body support portion and vibration is applied with one-side amplitude of 2.5 mm (vertical peak-to-peak amplitude of 5 mm) at 9 Hz in the test example 2-7.
Figure 48:
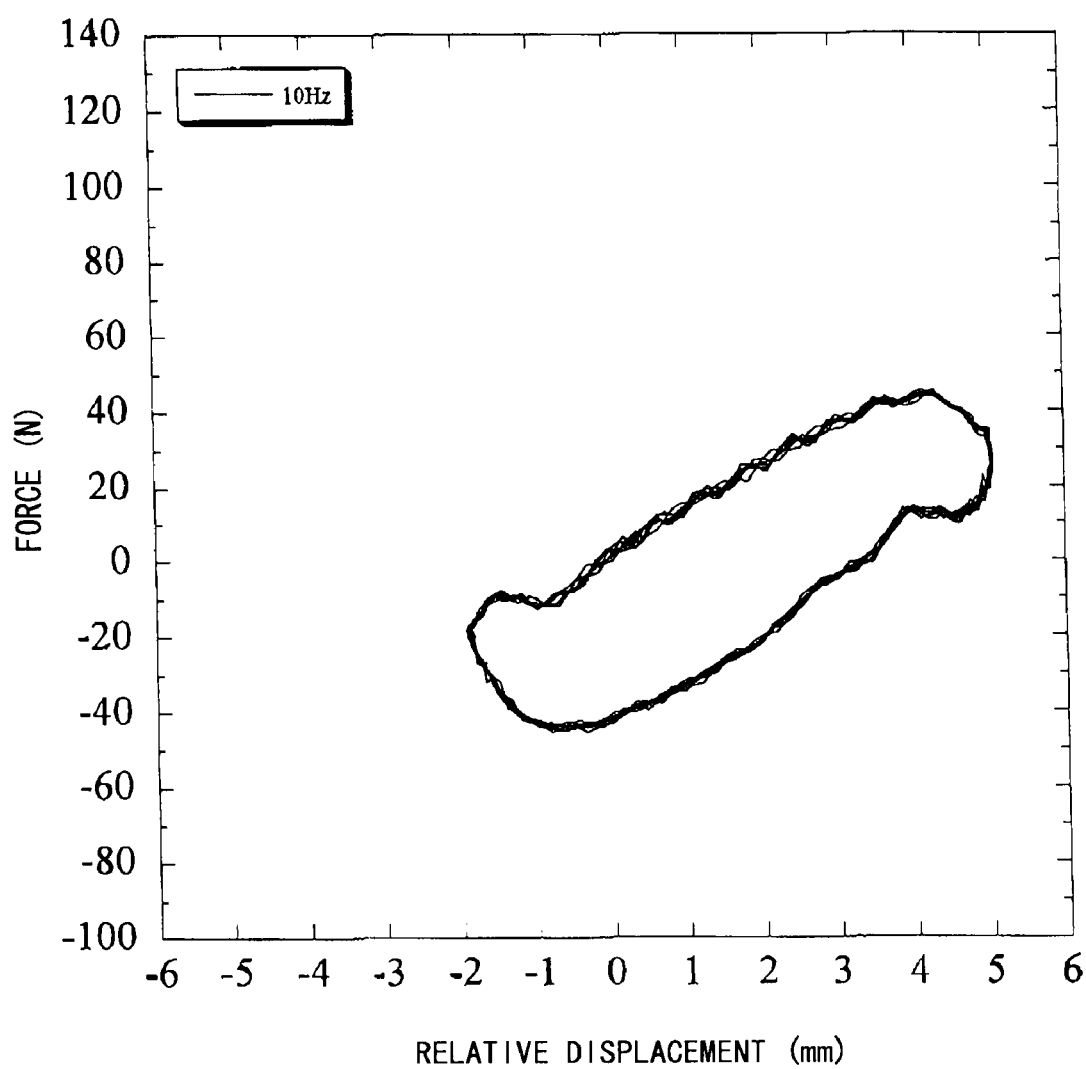
FIG. 48 is a Lissajous figure when the weight is set to the second human body support portion and vibration is applied with one-side amplitude of 2.5 mm (vertical peak-to-peak amplitude of 5 mm) at 10 Hz in the test example 2-7.

At the vibration frequency of 1 Hz shown in FIG. 19, it can be seen that the elasticity of the flat support member 20 operates mainly. The rear-side torsion bar 10f is not operating. At 2 Hz, 3 Hz, since the distance is separated from the first human body support portion 11 as shown in FIG. 20 and FIG. 21, for supporting the load in the gravitational direction, restoring force of the coil springs 31 operates in addition to load support in the compressing direction of the flat support member 20. Then the front-side and rear-side torsion bars 10d, 10f operate, the spring constant in the weight releasing direction becomes smaller, and also generation of viscous damping is started. Further at 4 Hz in FIG. 22, the influence of the rear-side torsion bar 10f by pivoting of the coil springs on the side portions in a forward and downward direction (elastic pendulum motion) appears largely, and the influence of the viscous damping increases gradually as shown by oblique hatching. As is clear from the Lissajous figures of 3 Hz, 4 Hz, the static spring constant s-2 in the weight releasing direction has a smaller gradient than the static spring constant s-1 in the gravitational direction. Specifically, when the vibration frequency increases and the relative displacement amount increases, that is, when the force operating on the first human body support portion 11 gets larger, motion in the forward and downward direction is added to the elasticity of the flat support member 20 and to the elasticity of the coil springs 31 giving restoring force in a lateral direction, operation of the front-side torsion bar 10d and the rear-side torsion bar 10f are added further thereto, and the front-side torsion bar 10d and the rear-side torsion bar 10f operate with a phase difference. Thus, the static spring constant s-2 becomes low.

In particular, from the Lissajous figure changing while drawing a step portion at symbol A part (vicinity of the change from the gravitational direction to the weight releasing direction) shown in FIG. 22 to FIG. 25, it can be seen that the front-side torsion bar 10d and the rear-side torsion bar 10f operate with a phase difference. Furthermore, from the areas of the Lissajous figures becoming larger so as to expand downward at 5 Hz to 9 Hz in FIG. 23 to FIG. 27, it can also be seen that viscous damping is generated gradually to increase the damping force, and also the dynamic spring constant changes according to the vibration frequency. Further, by turning to high frequency vibration, motion and operation of the various spring members constituting this seat become smooth, and the Lissajous figures are gradually becoming fine waveforms. On the other hand, at 10 Hz in FIG. 28, the tendency of the Lissajous figure to expand downward becomes small, and the damping is slightly smaller than the cases of 8 Hz and 9 Hz. This is because operation of the front-side torsion bar 10d separated from the first human body support portion 11 weakens due to shift of the vibration frequency to a harmonic, operation of the rear-side torsion bar 10f then becomes dominant, and thereby the vibration is absorbed by an opposite phase.

From these points, according to this example, operation of the front-side torsion bar 10d, the rear-side torsion bar 10f, the flat support member 20, or the like supporting the first human body support portion 11 is different according to the vibration frequency, and high vibration damping performance can be obtained according to the vibration frequency. Particularly, it can be said that characteristics of the deep-layer spring members of the seat of the present invention appeared well in the characteristic Lissajous figures of FIG. 21 to FIG. 27.

TEST EXAMPLE 2-7

Next, in FIG. 29 to FIG. 38, the weight with a diameter of 98 mm and a mass of 6.7 kg is set to the second human body support portion 12, vibration is applied at ten stages of vibration frequencies from 1 Hz to 10 Hz with a sine wave having one-side amplitude of 1 mm (vertical peak-to-peak amplitude 2 mm), and the relationship between a relative displacement amount of the weight and a load operating on the weight is represented by Lissajous figures.

As is clear from the Lissajous figures of FIG. 29 to FIG. 38, in the second human body support portion 12 (position of C100), the static spring constants have almost the same gradients in both the gravitational direction and the weight releasing direction at all vibration frequencies, and the Lissajous figures become close to an elliptic shape or a parallelogram. This indicates that operation of the elasticity of the coil springs 31, the urethane member 25 and the rear edge portion 25a influence largely on the second human body support portion 12, and the viscous damping as explained in the test example 2-6 is barely generated. From this fact, the dynamic spring constant calculated considering the damping ratio is larger in the second human body support portion 12 than in the first human body support portion 11, in other words, it is a structure satisfying the above-described conditional expression kd1<kd2. It is a seat in which the supportability by the second human body support portion 12 under the femurs is higher, rather than the first human body support portion 11 below the ischial tuberosities, when vibration is inputted while traveling. These are characteristics of the middle-layer spring members.

Figure 49:
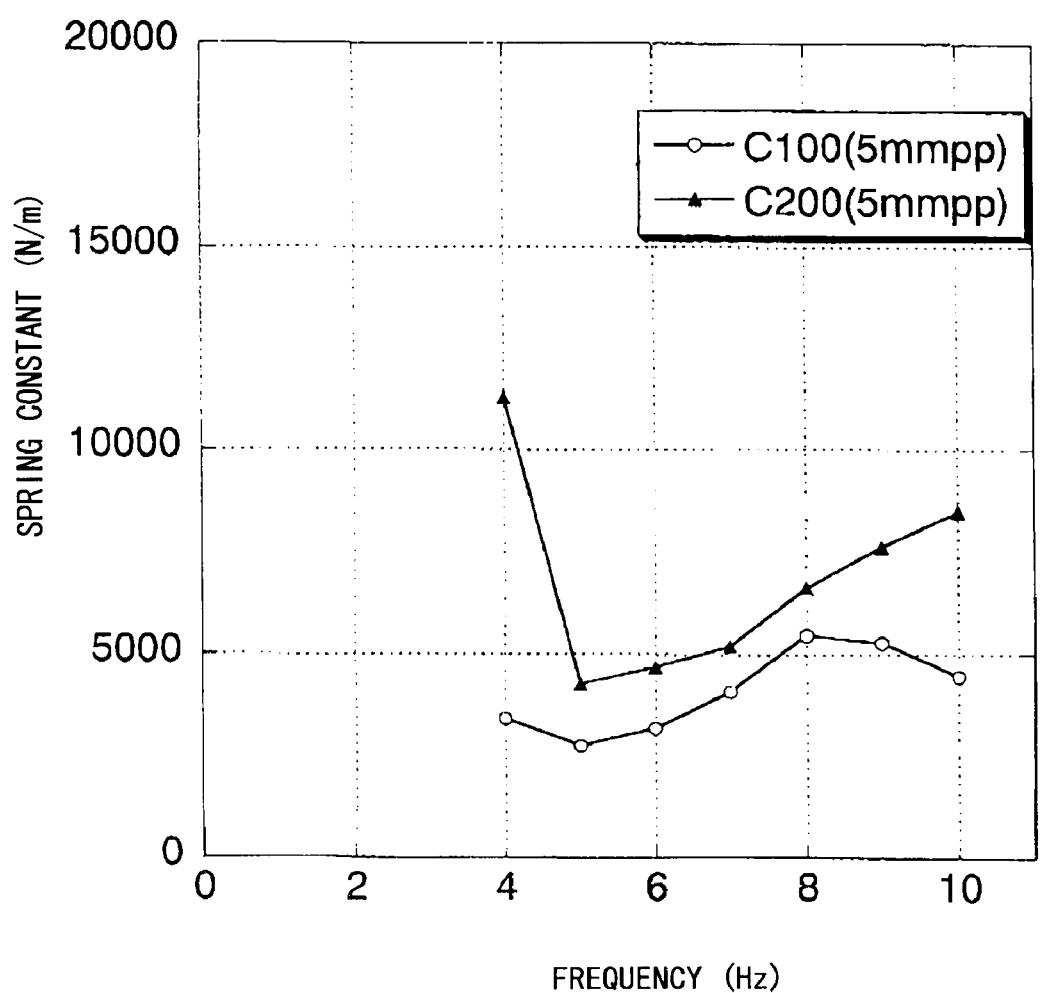
FIG. 49 is a graph showing dynamic spring constants in the second human body support portion 12 (C100) and the third human body support portion 13 (C200) when vibration is applied with the one-side amplitude of 2.5 mm (vertical peak-to-peak amplitude of 5 mm) in the test example 2-7.

Note that also in the second human body support portion 12, when the input load is large (when the weight with a diameter of 98 mm and a mass of 6.7 kg is set, and vibration is applied with the one-side amplitude of 2.5 mm (vertical peak-to-peak amplitude of 5 mm)), as shown in FIG. 39 to FIG. 48, characteristics of springs of the torsion bar and so on located in the deep layer appear further, and are changing from characteristics of the middle-layer spring members to characteristics of the deep-layer spring members. This indicates that the downward and forward elastic pendulum motion of the coil springs on the side portions became large due to pivoting of the buttocks with the femurs being the fulcrum. Accordingly, it can be seen that it is a seat useful for absorbing larger energy in collision. Therefore, due to the load mass or the magnitude of input, the Lissajous figure becomes a highly linear figure as in FIG. 29 to FIG. 38, or becomes a figure in which viscous damping appears largely as shown in FIG. 39 to FIG. 48, and this difference is a significant characteristic of the seat of the present invention. It can be said that in the seat of the present invention, so to speak, multiple characteristics are combined, and a different characteristic appears according to variation in magnitude of input or load mass. It is considered that the dynamic spring constant kd2 when impacting vibration is inputted to the second human body support portion 12 corresponds to kd1 of the first human body support portion 11 when vibration is inputted during normal travelling, and the dynamic spring constant kd3 of the third human body support portion 13 corresponds to kd2 of the second human body support portion 12 during normal travelling. In this case, it is considered whether the relationship between kd2 of the second human body support portion 12 and kd3 of the third human body support portion 13 fits in the above-described conditional expressions of kd1 and kd2 or not. FIG. 49 shows the dynamic spring constants in the second human body support portion 12 (C100) and the third human body support portion 13 (C200), and FIG. 50 shows the ratios of kd3/kd2 of the both. As is clear from these two graphs, this relationship of kd2, kd3 satisfies the above-described relation of kd1, kd2, and it can be seen that the seat of the present invention can also improve the vibration absorption characteristic for impacting vibration.

Note that the seat of the test example 2-7 is the same as the seat used in the test example 2-4 and so on, and is a seat having the structure of the example 2, and is also a seat in which thin leather with a thickness of 0.8 mm is used as the outer layer member.

TEST EXAMPLE 2-8

Figure 51:
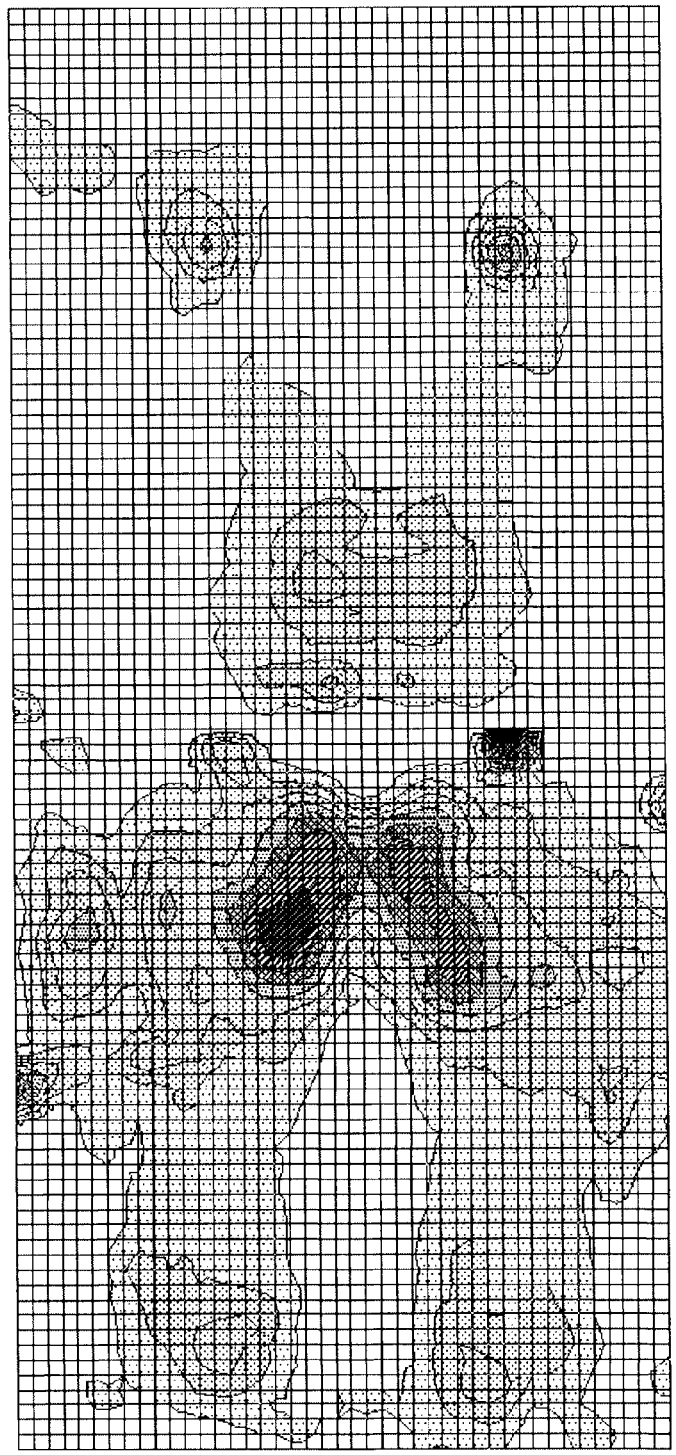
FIG. 51 is a diagram showing a body pressure distribution of the seat of the example 2 (seat used in the test example 2-4 and so on)
Figure 52:
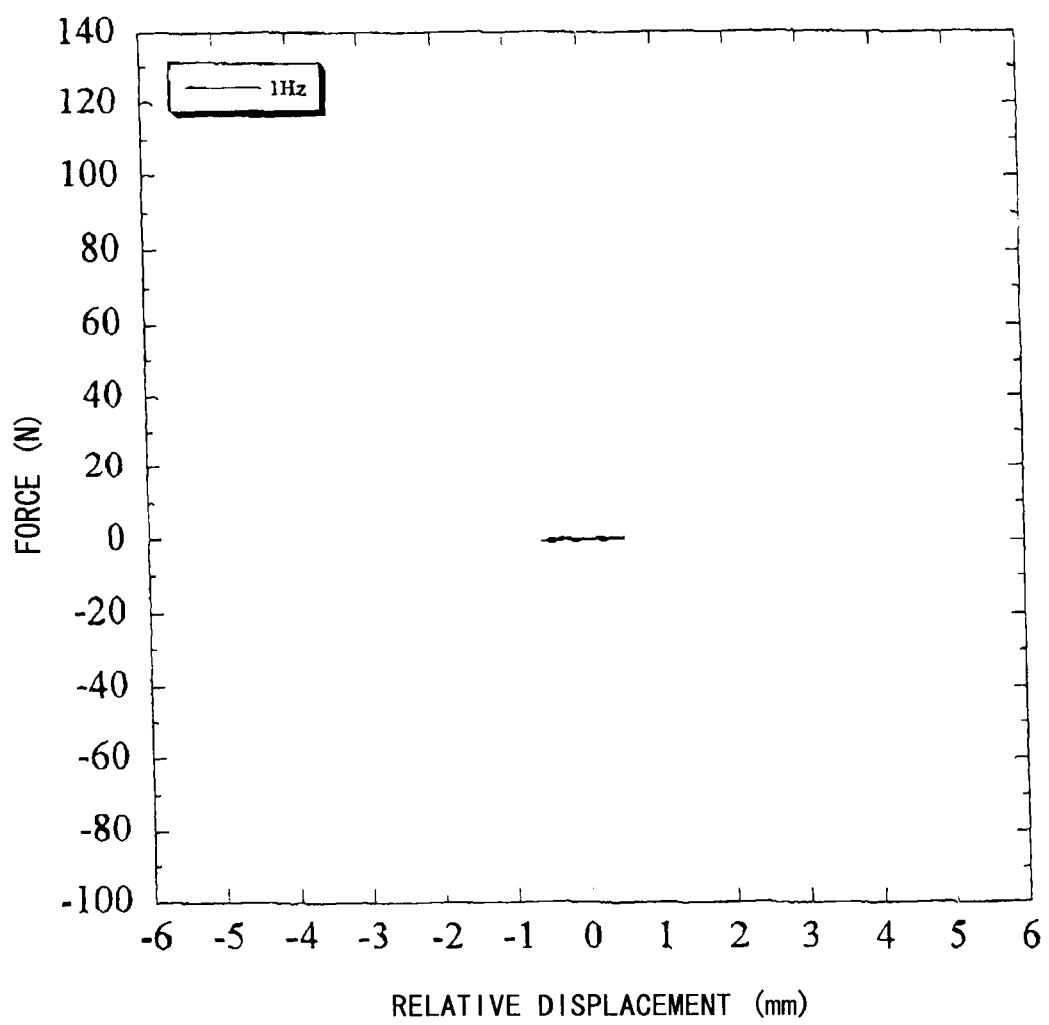
FIG. 52 is a Lissajous figure drawn by setting a weight of 2 kg to the second human body support portion and applying vibration with the one-side amplitude of 2.5 mm (vertical peak-to-peak amplitude of 5 mm) at 1 Hz in test example 2-8.
Figure 53:
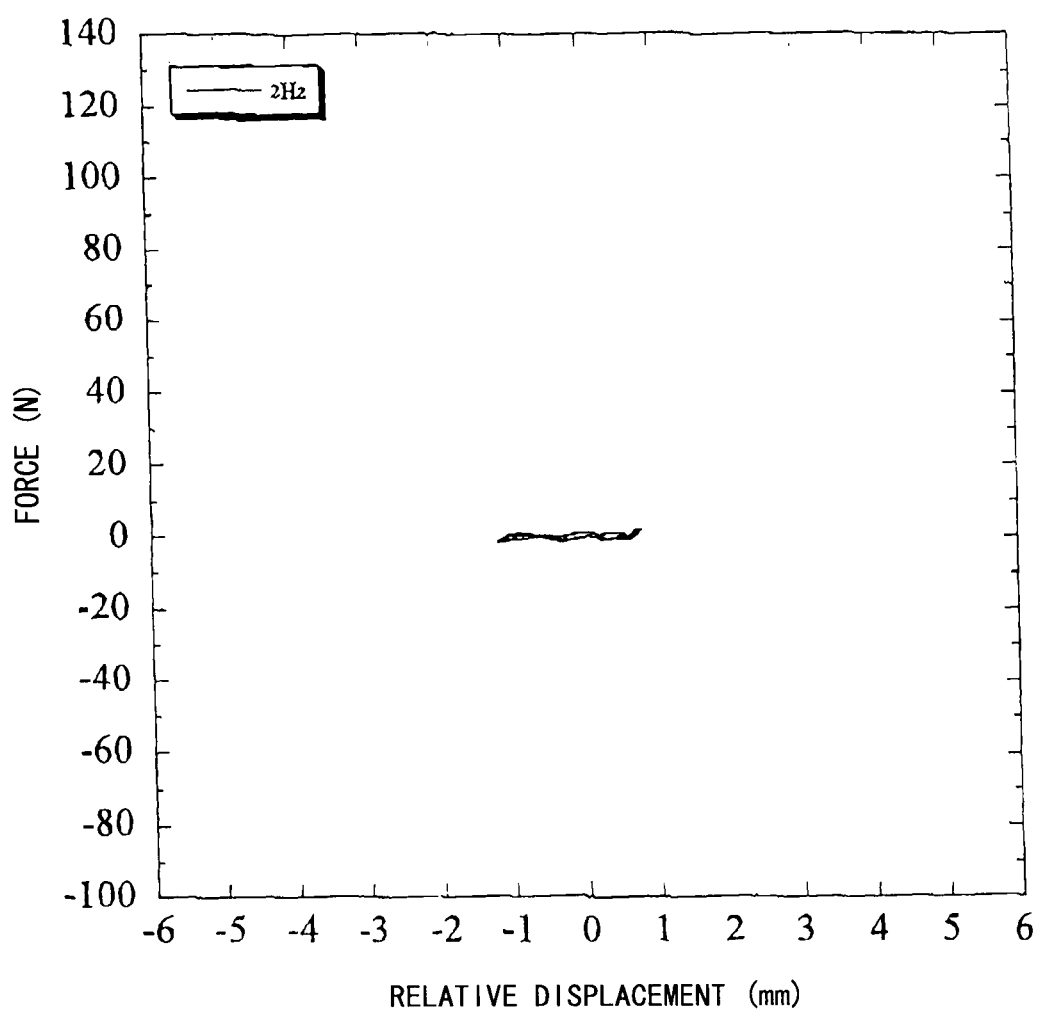
FIG. 53 is a Lissajous figure drawn by setting the weight of 2 kg to the second human body support portion and applying vibration with the one-side amplitude of 2.5 mm (vertical peak-to-peak amplitude of 5 mm) at 2 Hz in the test example 2-8.
Figure 54:
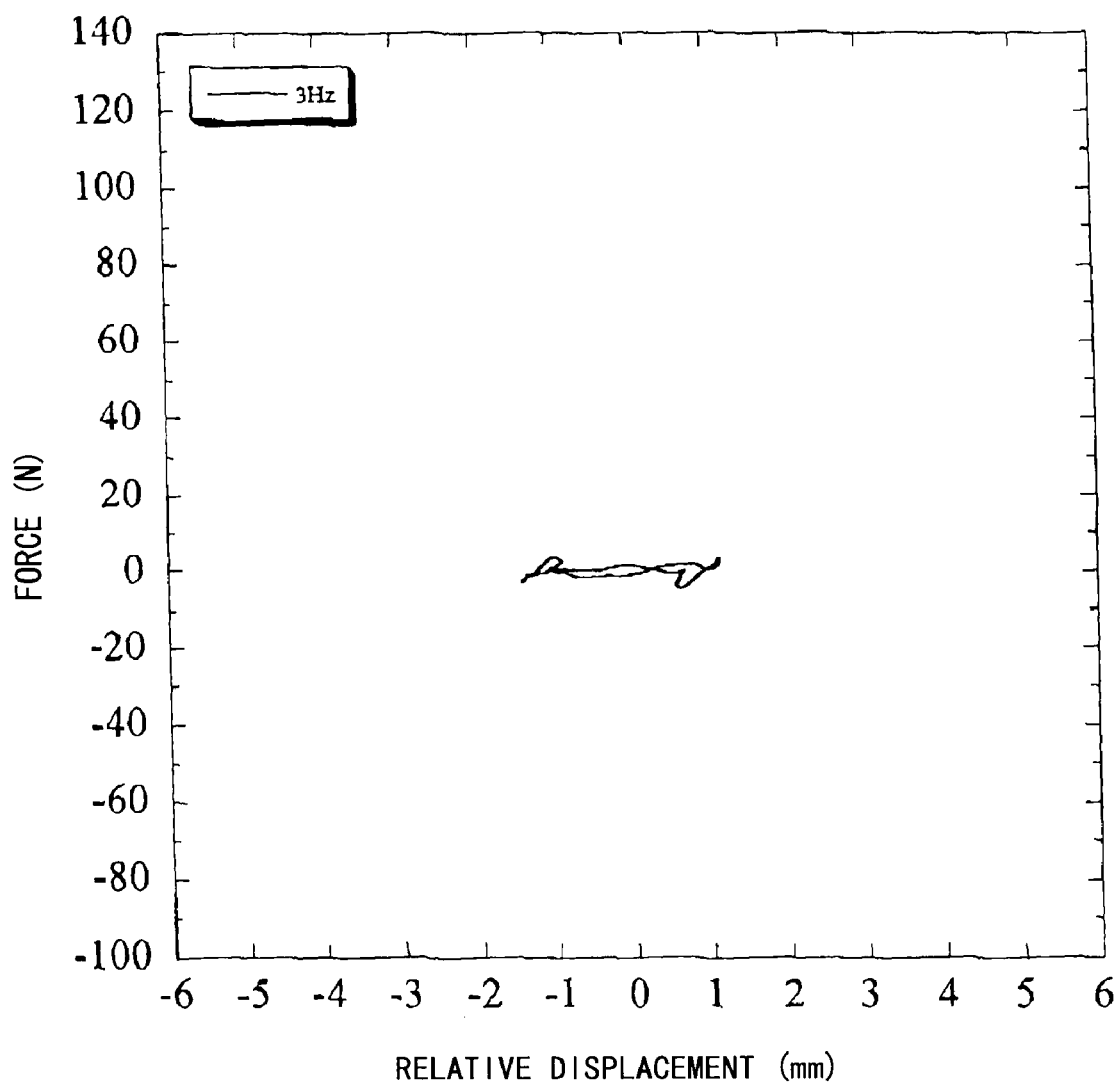
FIG. 54 is a Lissajous figure drawn by setting the weight of 2 kg to the second human body support portion and applying vibration with the one-side amplitude of 2.5 mm (vertical peak-to-peak amplitude of 5 mm) at 3 Hz in the test example 2-8.
Figure 55:
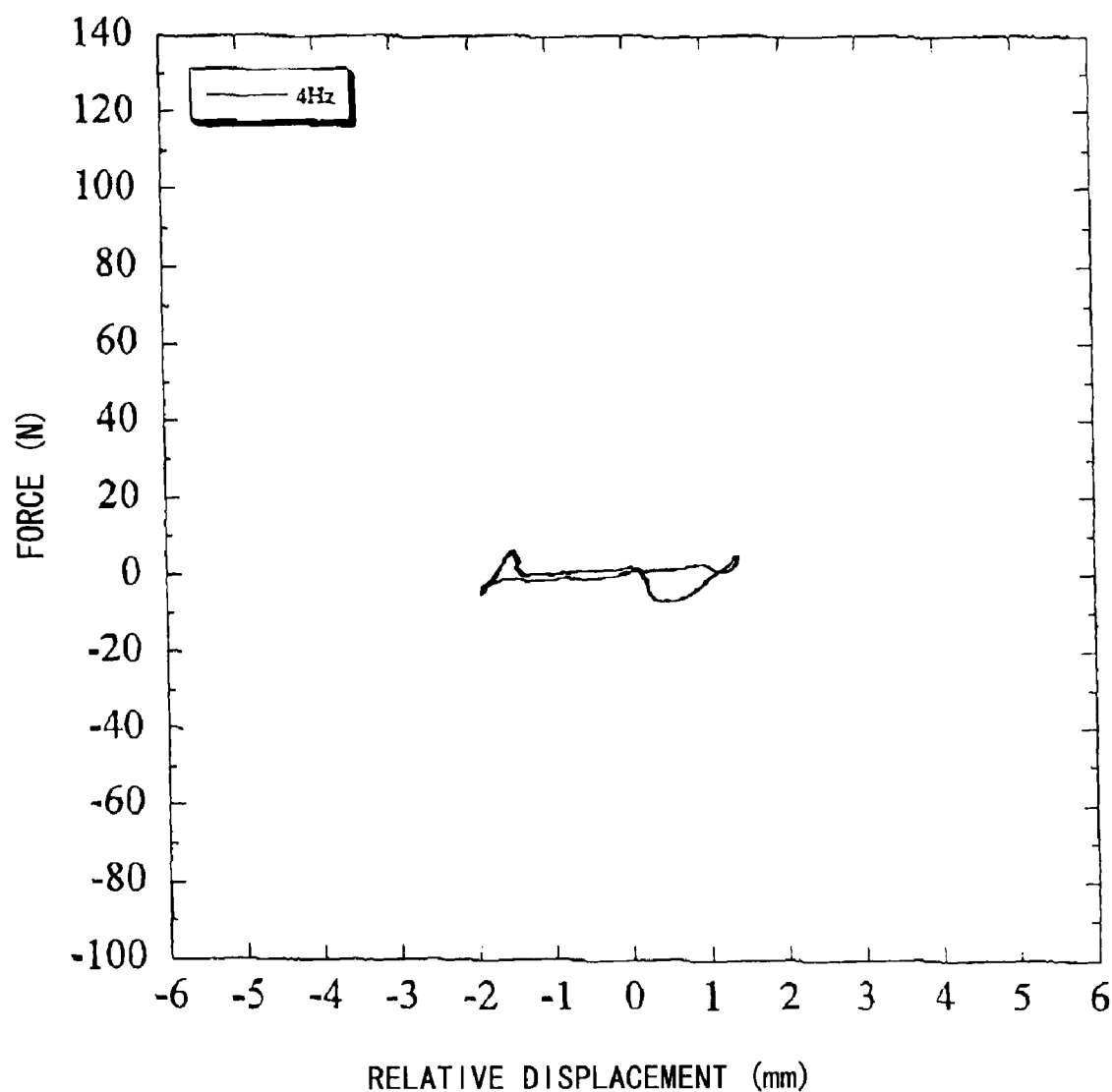
FIG. 55 is a Lissajous figure drawn by setting the weight of 2 kg to the second human body support portion and applying vibration with the one-side amplitude of 2.5 mm (vertical peak-to-peak amplitude of 5 mm) at 4 Hz in the test example 2-8.
Figure 56:
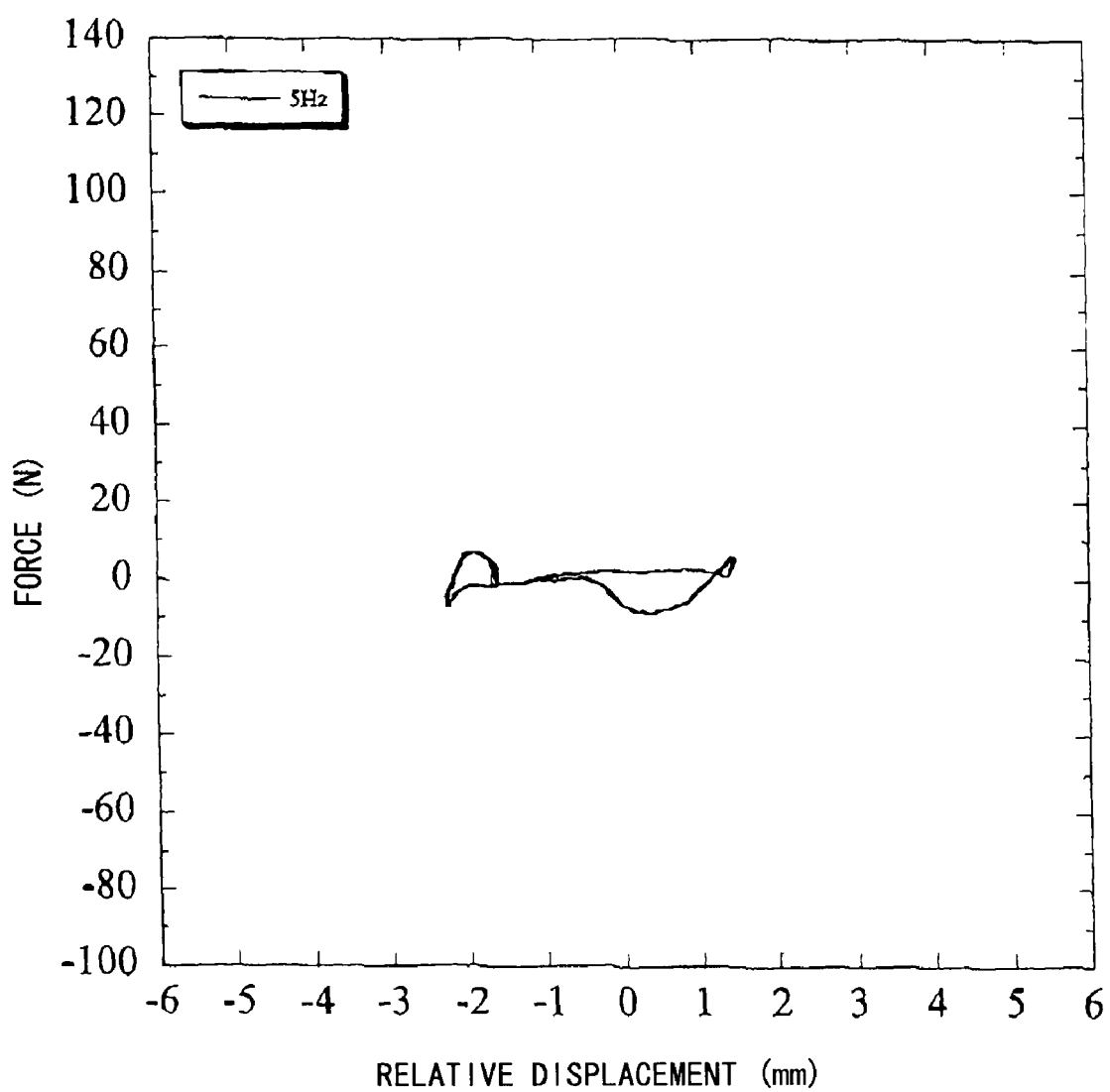
FIG. 56 is a Lissajous figure drawn by setting the weight of 2 kg to the second human body support portion and applying vibration with the one-side amplitude of 2.5 mm (vertical peak-to-peak amplitude of 5 mm) at 5 Hz in the test example 2-8.
Figure 57:
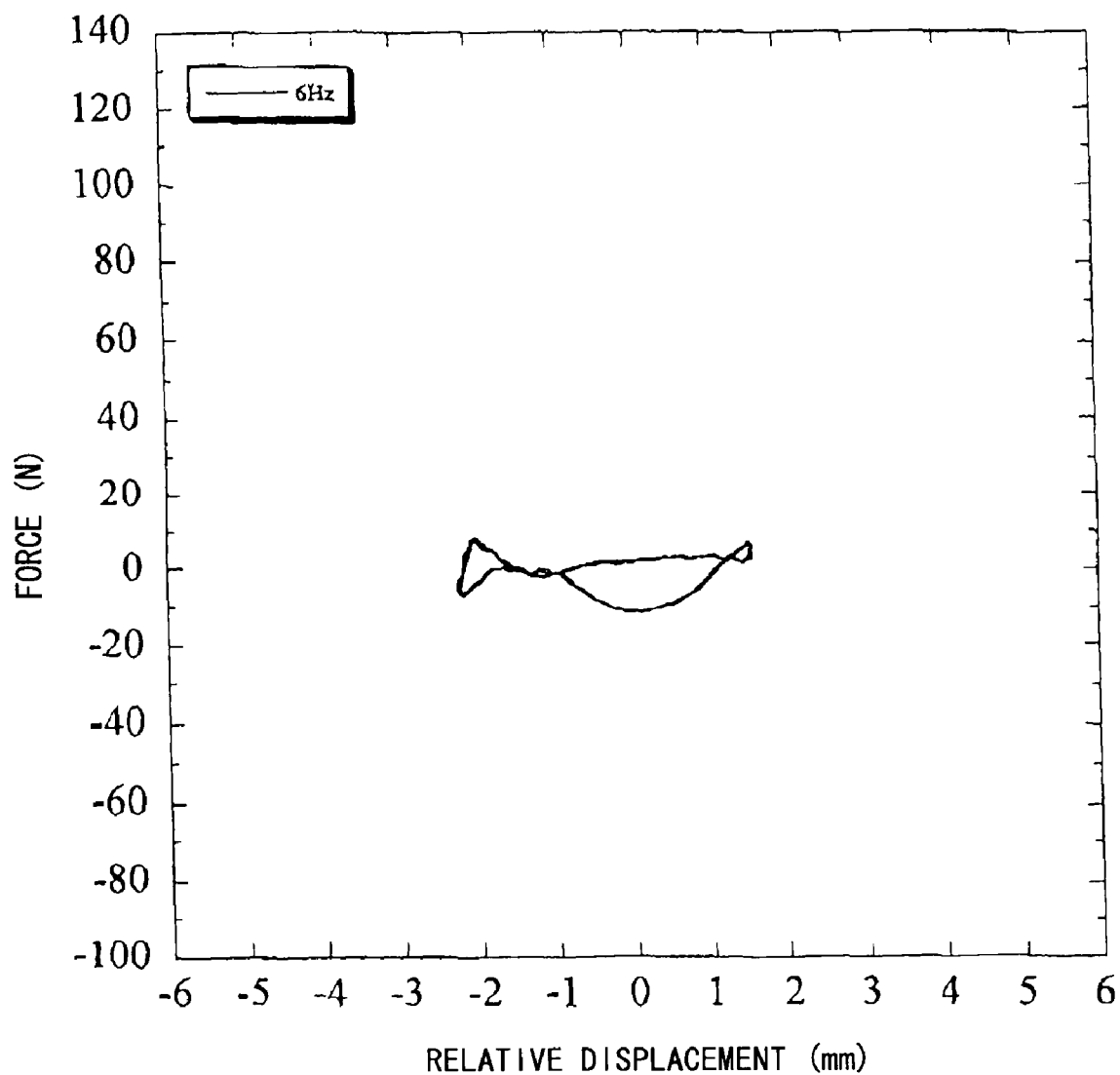
FIG. 57 is a Lissajous figure drawn by setting the weight of 2 kg to the second human body support portion and applying vibration with the one-side amplitude of 2.5 mm (vertical peak-to-peak amplitude of 5 mm) at 6 Hz in the test example 2-8.
Figure 58:
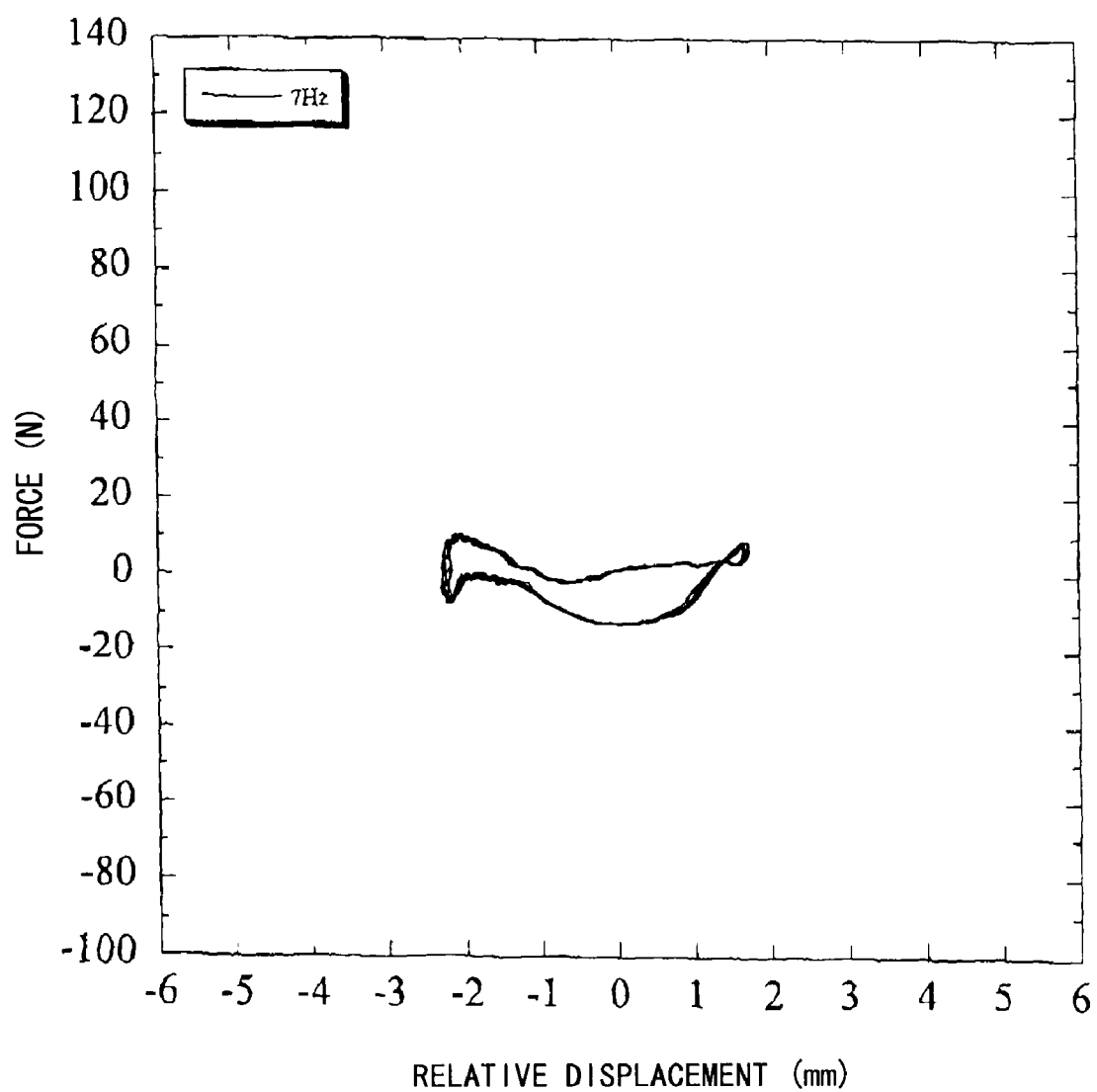
FIG. 58 is a Lissajous figure drawn by setting the weight of 2 kg to the second human body support portion and applying vibration with the one-side amplitude of 2.5 mm (vertical peak-to-peak amplitude of 5 mm) at 7 Hz in the test example 2-8.
Figure 59:
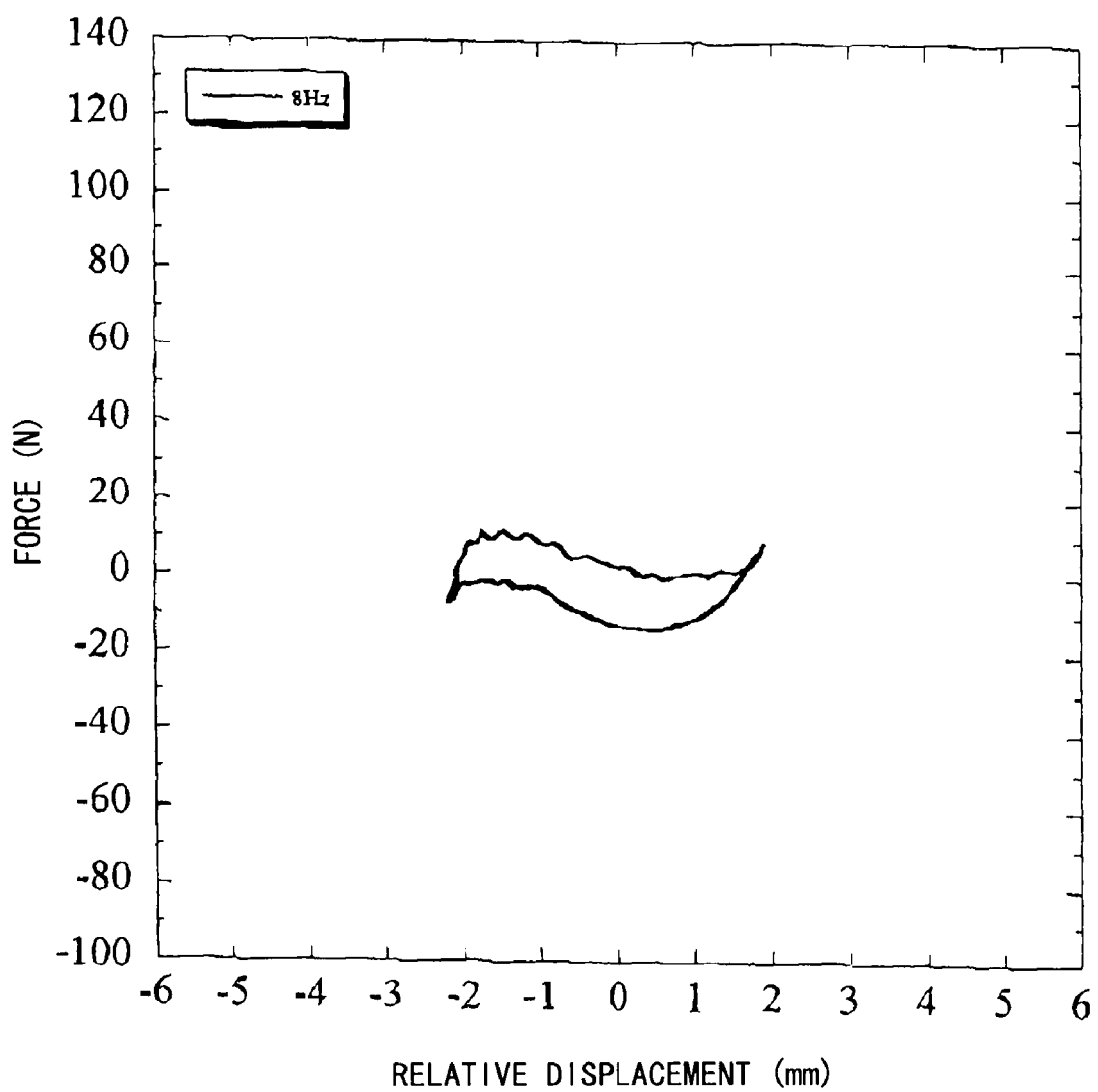
FIG. 59 is a Lissajous figure drawn by setting the weight of 2 kg to the second human body support portion and applying vibration with the one-side amplitude of 2.5 mm (vertical peak-to-peak amplitude of 5 mm) at 8 Hz in the test example 2-8.
Figure 60:
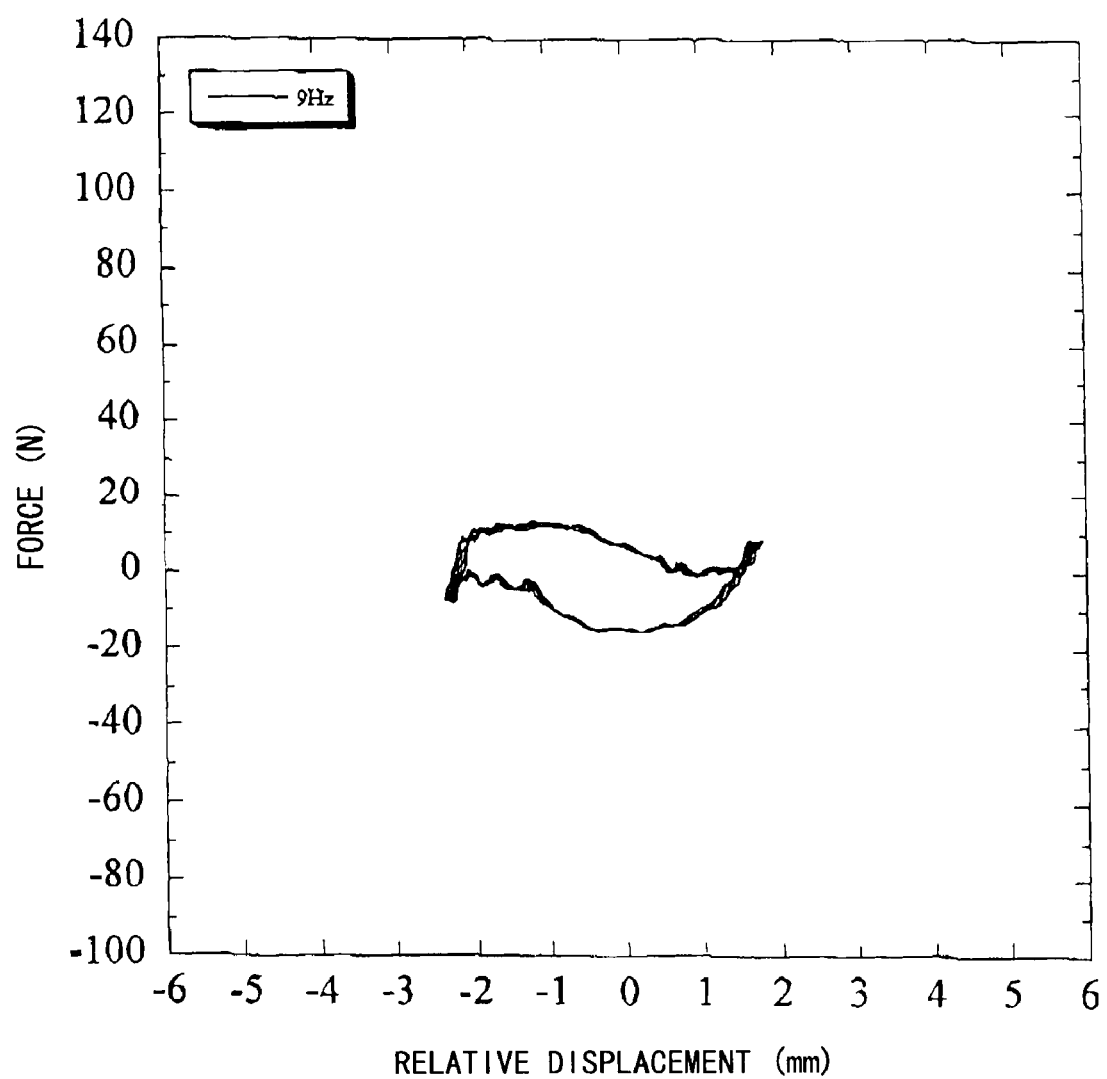
FIG. 60 is a Lissajous figure drawn by setting the weight of 2 kg to the second human body support portion and applying vibration with the one-side amplitude of 2.5 mm (vertical peak-to-peak amplitude of 5 mm) at 9 Hz in the test example 2-8.
Figure 61:
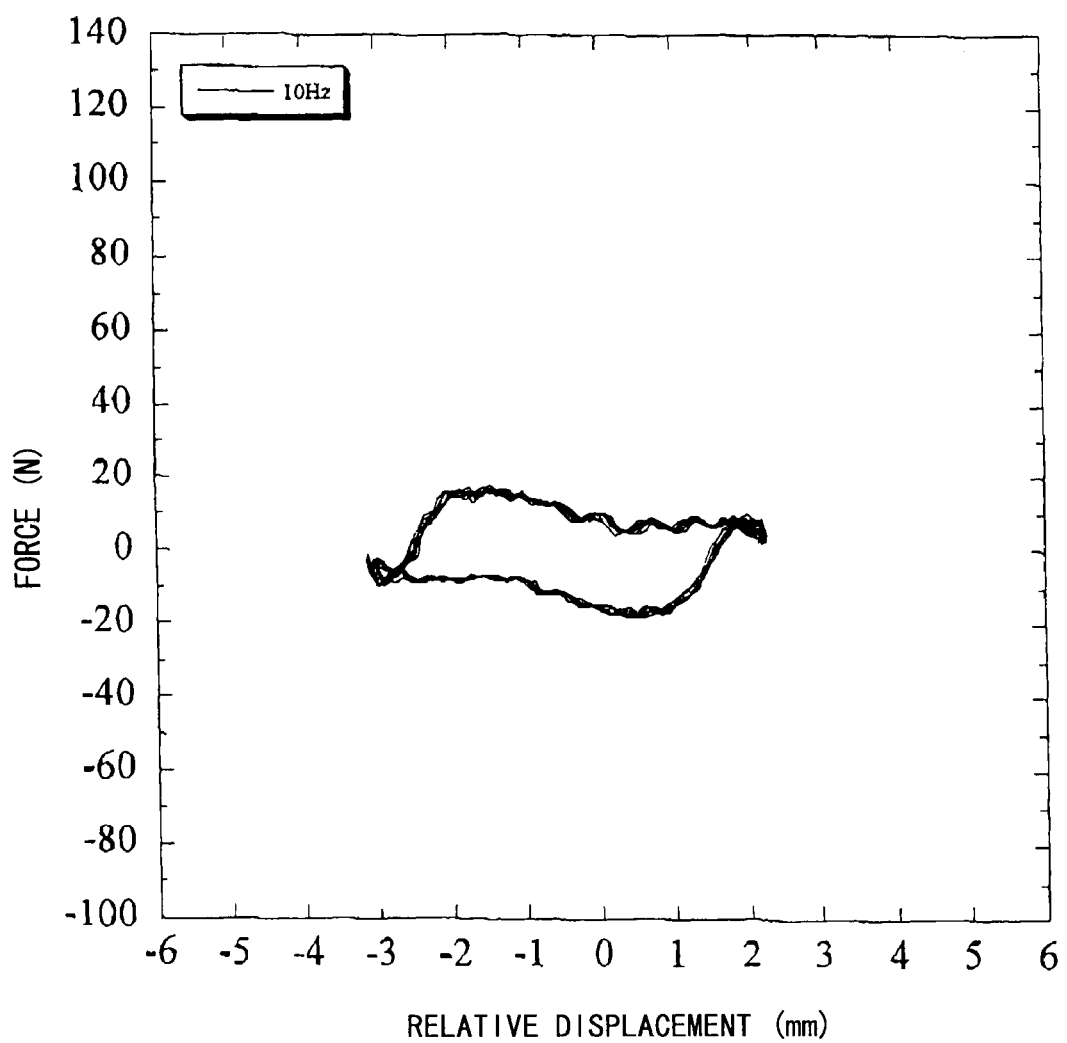
FIG. 61 is a Lissajous figure drawn by setting the weight of 2 kg to the second human body support portion and applying vibration with the one-side amplitude of 2.5 mm (vertical peak-to-peak amplitude of 5 mm) at 10 Hz in the test example 2-8.

As described above, the seat of the present invention is characterized in that the dynamic spring constants are kd1<kd2, and the second human body support portion 12 supporting the femurs becomes the fulcrum of motion. Then as explained in the test example 2-7, from verification using the weight with a diameter of 98 mm and a mass of 6.7 kg, it was found that the second human body support portion 12 has a linear and relatively high static spring characteristic when vibration is inputted normally, and the human body can be supported by the femurs. On the other hand, since the femurs become the fulcrum, it is necessary to decrease the influence of chattering vibration on the femoral muscle and skin surface for realizing comfortable feeling of riding. Accordingly, the influence when chattering vibration is inputted was verified. Since the chattering vibration is direct influence on the femurs to be the fulcrum, the verification is done with a load mass corresponding to a body pressure distribution in the femurs. In the case of the seat of the example 2 (seat used in the test example 2-4 or the like), this corresponds to a mass of 2 kg in the case of the weight with a diameter of 98 mm, as is clear from the body pressure distribution of FIG. 51. When this weight of 2 kg is set to the second human body support portion 12, the Lissajous figures drawn by applying vibration with one-side amplitude of 2.5 mm (vertical peak-to-peak amplitude of 5 mm) are FIG. 52 to FIG. 61. As shown in these figures, the static spring constants are small regardless of the large vibration amplitude, and the reaction force due to chattering vibration is absorbed by the small spring constant as those shown in these diagrams. Thus, the vibration absorbency for chattering vibration is also high. This spring characteristic is the characteristic of a shallow-layer spring member, namely, zero spring characteristic. Therefore, the influence of input of high frequency vibration from the femurs to be the fulcrum is quite low. Note that with this vibration conditions, there is almost no operation of the torsion bar, and the point that such a small spring constant can be realized is largely due to the spring characteristics of the soft leather used as the outer layer member and the three-dimensional knitted fabric used as the flat spring member 20.

EXAMPLE 3

In Example 3, a structure having the dynamic spring constants of the present invention is realized in a structure in which a urethane member is mounted and used on a flat spring member, which is different from the structure in which a three-dimensional knitted fabric is provided by stretching as in the example 1 and the example 2.

Figure 63:
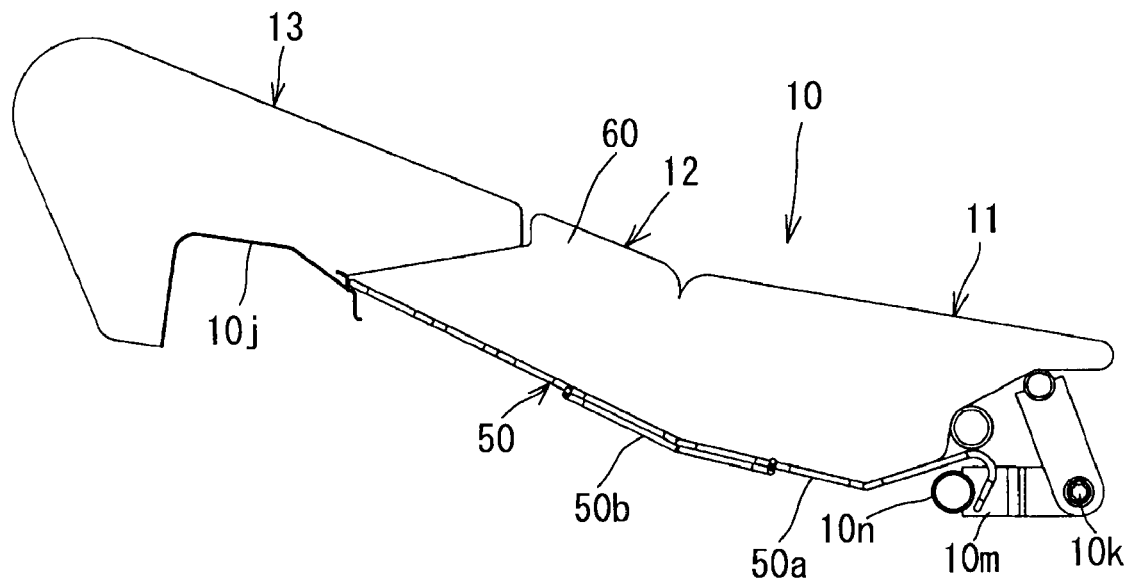
FIG. 63 is a view showing a schematic structure seen from a side face of a seat cushion of the vehicle seat according to the example 3.

Specifically, in this example, as shown in FIG. 62 and FIG. 63, a torsion bar 10k to be a deep-layer spring member is arranged as a rear spring member in the rear portion of the seat cushion 10, an arm member 10m which pivots downward about the torsion bar 10k from a substantially horizontal position in the drawing is provided, and a rear edge support frame 10n is coupled thereto. Then, with this rear edge support frame 10n, a urethane member 60 constituting a middle-layer spring member as well as a rear end of a flat spring member 50 are engaged and supported thereon. A front end of the flat spring member 50 is engaged with a fixing frame 10j located at a front edge portion of the cushion frame. With this structure, the femurs become the fulcrum and the buttocks can easily pivot forward and downward. On the other hand, as shown schematically in FIG. 63, the fixing frame 10j is formed in a plate shape having a predetermined area on a front edge portion.

On an upper portion of the flat spring member 50 supported as such, the urethane member 60 as a pad member is mounted. Then it can be seen that the posture of an occupant when seated is created mainly using elasticity other than that of the torsion bar 10k such that component force by the weight of the occupant operates on a substantially front side of the torsion bar 10k due to bending of the flat spring member 50. Elastic force of the torsion bar 10k is used when acceleration or inertial force from the outside is inputted, or for absorbing a difference in physique sizes. Specifically, when external force occurs, pivoting of the flat spring member 50 forward and downward causes the rear edge support frame 10n supported by the torsion bar 10k moves up and down, and thereby in the first human body support portion 11 elasticity of the torsion bar 10k operates serially in addition to the urethane member 60 and the flat spring member 50. On the other hand, in the second human body support portion 12, elasticity of the urethane member 60 and the flat spring member 50 operates mainly. Further, in the third human body support portion 13, elasticity of the urethane member 60 operates mainly. As a result, there is formed a structure in which the dynamic spring constant kd1 of the first human body support portion 11 is the lowest, and then it becomes higher in order of the dynamic spring constant kd2 of the second human body support portion 12, and the dynamic spring constant kd3 of the third human body support portion 13.

EXAMPLE 4

Figure 64:
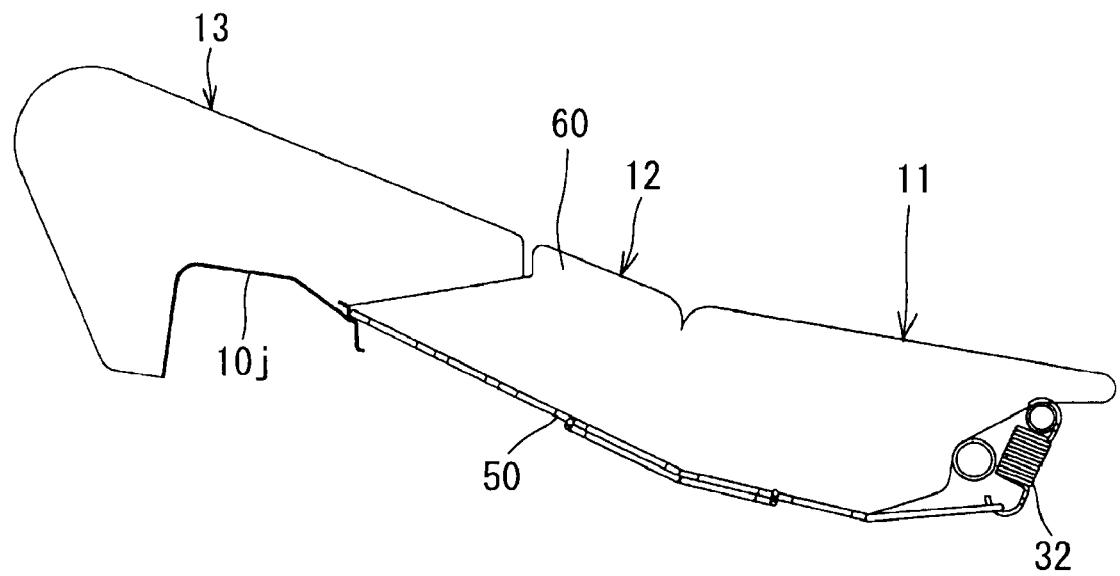
FIG. 64 is a view showing a schematic structure seen from a side face of a seat cushion of a vehicle seat according to example 4.

Example 4 has substantially the same structure as the example 3, but as shown in FIG. 64, it is a structure in which, in addition to the torsion bar 10k of the example 3, a coil spring 32 is used as a rear spring member. Also in this example, similarly to the example 3, in the first human body support portion 11, elasticity of the coil spring 32 functions serially in addition to the elasticity of the urethane member 60 and the flat spring member 50, and hence the dynamic spring constant kd1 becomes small. Note that the coil spring 32 can pivot forward more easily than in the structure having the torsion bar 10k, and hence begins to operate more sensitively than the torsion bar structure. Either of the urethane members 60 of the examples 3 and 4 shown in FIG. 63 and FIG. 64 is provided with a separation slit 60b penetrating obliquely from a front face to a back face at the border between the second human body support portion 12 and the third human body support portion 13, and is divided into two blocks sandwiching the separation slit 60b. This is contrivance for realizing smooth pedal operation, and details of which will be explained in example 5 (FIG. 65), which will be described later.

EXAMPLE 5 TO EXAMPLE 7

Example 5 to example 7, as shown in FIG. 65 to FIG. 68, are the same as the above-described example 3 and example 4 in that the both have a structure in which the urethane member 60 is arranged on the upper portion of the flat spring member 50. However, the rear end of the flat spring member 50 is not supported by elasticity of the rear spring member such as the torsion bar 10k or the coil spring 32 but is engaged with a fixing frame 10p arranged on the rear end of the seat cushion 10. Accordingly, in this structure, it does not happen that the characteristic of a spring located in the deep layer appears corresponding to a load mass or input as in the example 2, but there is a similar tendency, although it is gradual, in the ratios of the dynamic spring constants kd1, kd2, kd3 and in the aspect of pedal operability, due to a difference in rigidity of the urethane.

On the other hand, the urethane member 60 has a slit 60a with a predetermined depth carved in the vicinity of the ischial tuberosities, and is partitioned into a rear pad 61 and a middle pad 62 by this slit 60a. This slit 60a is for creating the zero spring characteristic in the shallow layer and is provided for improving the evenness of a pressure and increasing the feeling of seating, and is formed with a depth to the degree not penetrating the urethane member 60 in a thickness direction, which will be described in detail later. Further, on a slightly front side of middle of the seat cushion, the separation slit 60b inclining forward as it proceeds in a direction from the front face to the back face when viewed from a side face is formed to penetrate from the front face to the back face, and it is partitioned into the middle pad 62 and a front pad 63 with the separation slit 60b being the border. Then the rear pad 61 becomes the first human body support portion, the middle pad 62 becomes the second human body support portion, and the front pad 63 becomes the third human body support portion.

Figure 65:
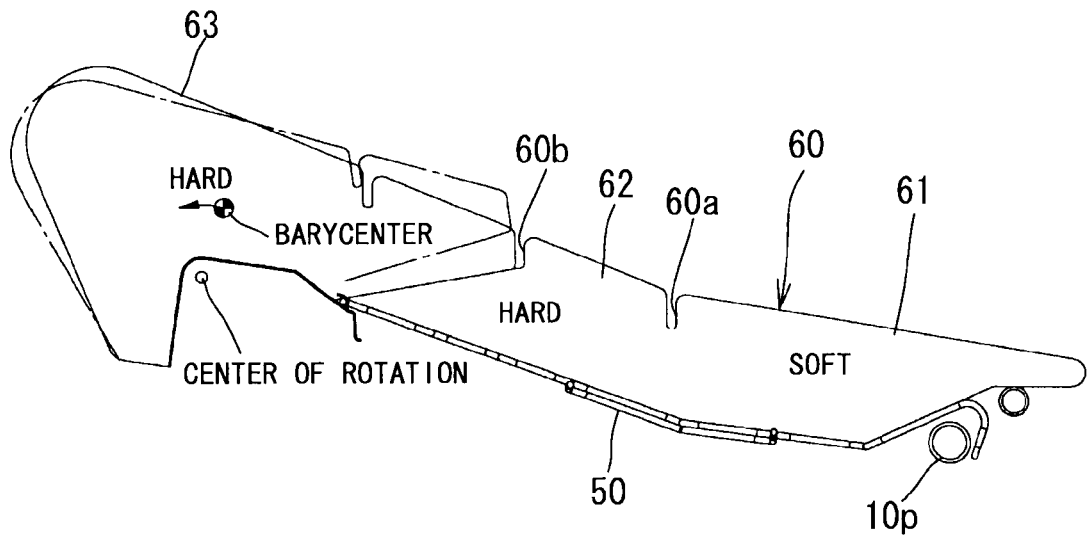
FIG. 65 is a view showing a schematic structure seen from a side face of a seat cushion of a vehicle seat according to example 5.

With the front pad 63 separated from the middle pad 62 by the separation slit 60b, ranges from the vicinities of the backs of knees to front portions of femurs come in contact. Therefore, by bending or extending the knees when operating a pedal, the front pad 63 is pushed from an upper side. In this case, when the front pad 63 is not separated from the middle pad 62 similarly to a normal urethane member, the front pad 63 is deformed like being crushed, and reaction force is given to the ranges from the vicinities of the backs of knees to the front portions of femurs, thereby leading to uncomfortable feeling when operating a pedal. In this aspect, in the structure separating the front pad 63 as in this example, when the front pad 63 is pushed from the upper side by the ranges from the vicinities of the backs of knees to the front portions of femurs, the front pad 63 rotates forward about the center of rotation as shown in FIG. 65. Accordingly, the reaction force when operating a pedal inputted to the ranges from the vicinities of the backs of knees to the front portions of femurs becomes quite small, and the pedal operability improves. Note that for the front pad 63, the barycentric position thereof is preferred to be formed on the slightly more front side than the center of rotation, so as to facilitate the rotational movement. The point that the front pad 63 (third human body support portion 13) is preferred to be separated by the separation slit 60b and is supported rotatably is not limited to this example, but is exactly the same for the other examples. In addition, the separation slit 60b is formed for making the front pad 63 rotatable forward, and is not necessarily formed to penetrate from the front surface to the back surface, and thus can be formed with an appropriate depth. Further, since uncomfortable feeling occurs when it is set close to the buttocks, the position thereof in the forward/backward direction moves forward or backward depending on the stiffness of the urethane.

The slit 60a formed in the vicinity of the ischial tuberosities is curved with a predetermined depth with the width direction of the seat cushion being the longitudinal direction thereof, at a position between 50 mm and less than 100 mm along the longitudinally center line of the seat cushion from the center of the first human body support portion. The center of the first human body support portion is located on the more rear side than the slit 60a, and the center of the second human body support portion is located on the more front side than the slit 60a. As a result, in the case of performing measurement using the pressure board with a diameter of 200 mm, when the center of the first human body support portion is matched with the center of the pressure board, the pressure board is positioned across the slit 60a. Thus, the static spring constant ks1 measured using the pressure board with a diameter of 200 mm becomes higher, while elasticity of the middle pad 62 operating on the static spring constant ks1. On the other hand, the dynamic spring constant can be adjusted to the above-described dynamic spring constants kd1, kd2, kd3 by varying elasticity of the pads 61 to 63 via the slits 60a, 60b.

The example 5 is structured such that, as shown in FIG. 65, the urethane member 60 constituting the rear pad 61, the middle pad 62 and the front pad 63 is changed in material such that a softest urethane member is used for the rear pad 61 of the dynamic spring constant kd1, and hard urethane members stiffer than the rear pad are used for the middle pad 62 and the front pad 63. In the rear pad 61, in addition to soft elasticity of the pad, the elasticity of the flat spring member 50 functions serially, and in the middle pad 62, elasticity of the urethane member stiffer than the rear pad 61 and the elasticity of the flat spring member 50 function serially. In the front pad 63, only elasticity of the urethane member stiffer than the rear pad 61 functions. Thus, there is created a structure in which the dynamic spring constant kd1 is smallest, and kd2, kd3 become larger in this order.

Figure 66:
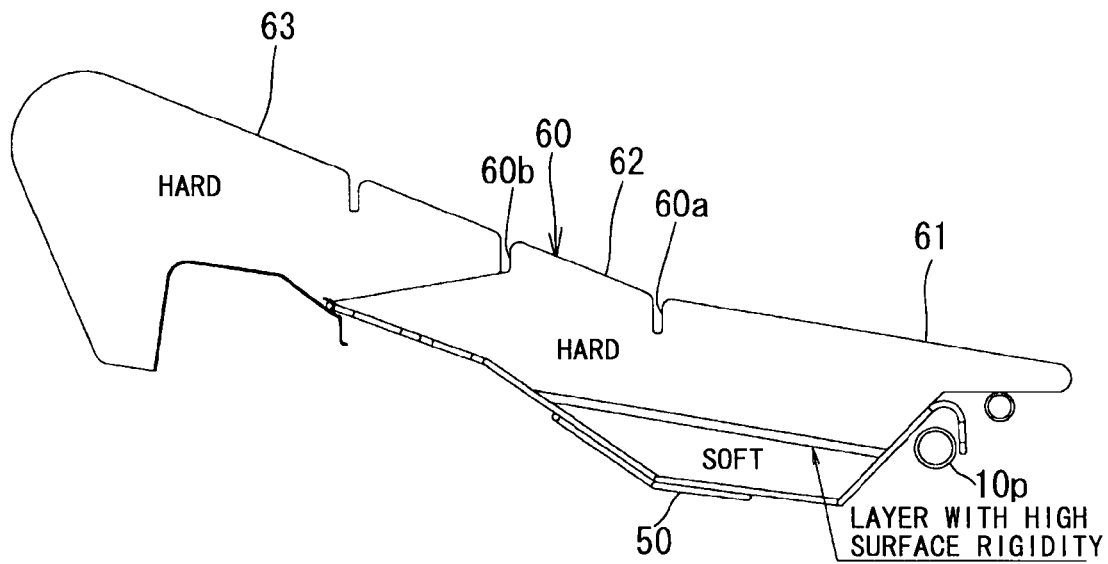
FIG. 66 is a view showing a schematic structure seen from a side face of a seat cushion of a vehicle seat according to example 6.
Figure 67:
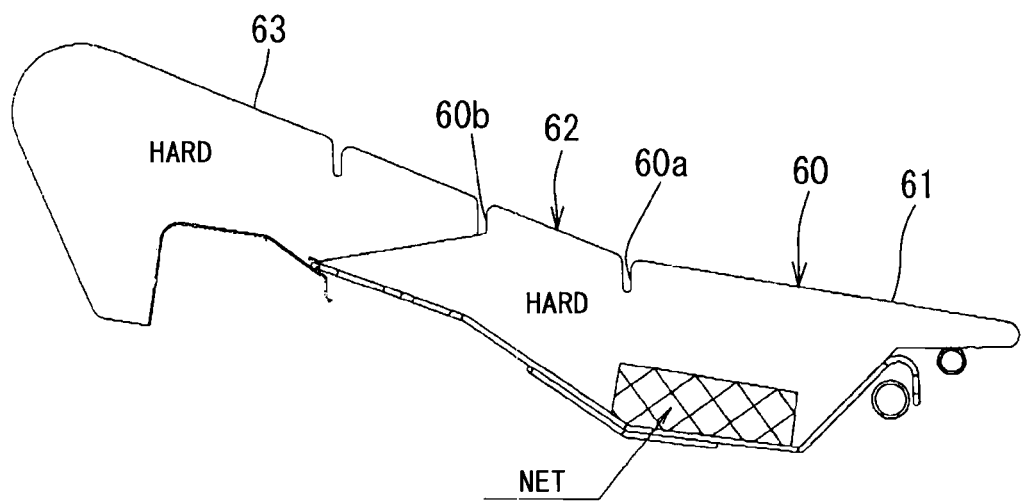
FIG. 67 is a view showing a schematic structure seen from a side face of the seat cushion on which a three-dimensional knitted fabric (net) is disposed instead of a soft urethane member on its position, in the vehicle seat according to the example 6.

In the example 6 as shown in FIG. 66, as the rear pad 61, for example a soft urethane member is arranged as a lower layer and a hard urethane member is arranged as an upper layer with a layer having high surface rigidity intervening therebetween, and they function in series with the elasticity of the flat spring member 50, thereby setting the dynamic spring constants kd1, kd2, kd3 satisfying the above-described conditional expressions, similarly to the example 5. Note that this structure may also be such that, as shown in FIG. 67, a three-dimensional knitted fabric (net) is disposed in the above position instead of the soft urethane member of FIG. 66.

Figure 68:
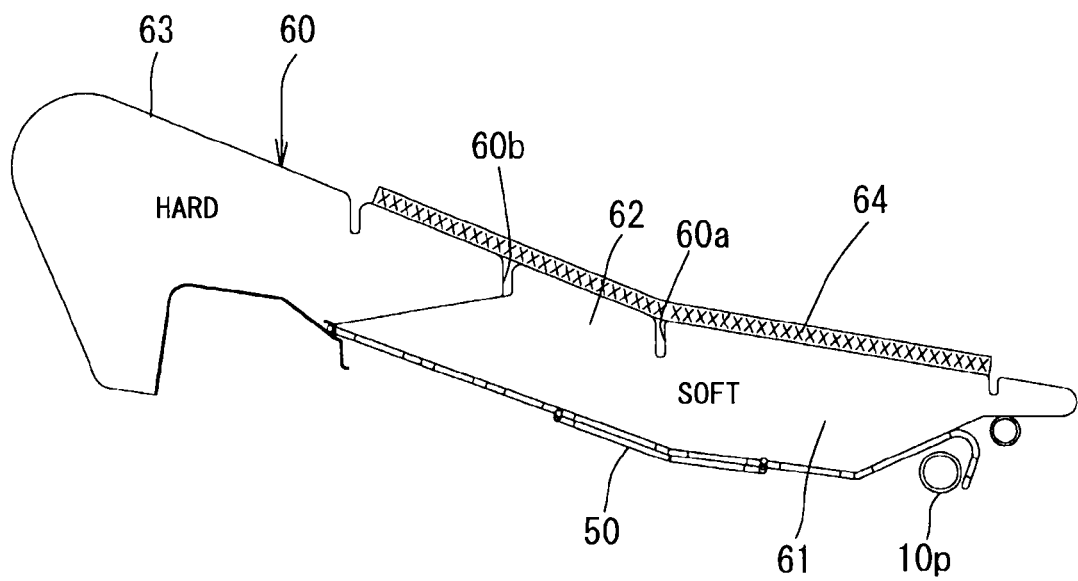
FIG. 68 is a view showing a schematic structure seen from a side face of a seat cushion of a vehicle seat according to example 7.

The example 7 is a structure in which, as shown in FIG. 68, the urethane member 60 with a substantially even thickness is used, and meanwhile a three-dimensional knitted fabric 64 is stacked on the rear pad 61 and the middle pad 62 across the slit 60a, as a member with a different spring characteristic, preferably, one bearing the characteristic of the shallow-layer spring member. As a result, in the rear pad 61, elasticity of the three-dimensional knitted fabric 64, the elasticity of the rear pad 61 and the elasticity of the flat spring member 50 operate in series, and thus the dynamic spring constant kd1 becomes small. In the middle pad 62, the dynamic spring constant kd2 becomes higher than the dynamic spring constant kd1 in the rear pad 61 due to the operation in conjunction with the elasticity of the middle pad 62 and the elasticity of the flat spring member 50. In the front pad 63, the dynamic spring constant kd3 becomes higher since only the elasticity of the front pad 63 functions.

The slit 60a located in the vicinity of the ischial tuberosities formed in the examples 5 to 7 causes the urethane to make two types of springs for the shallow layer and the middle layer depending on the magnitude of the load mass and the magnitude of bending. As shown in FIG. 69, the slit is preferred to be formed with a length of 160 mm to 240 mm substantially perpendicularly to the longitudinally center line of the seat cushion 10, and with a depth of the vicinity of a substantially center in a longitudinal direction is shallower than in the vicinities of both ends thereof. The depth of the vicinity of the substantially center in the longitudinal direction of the slit 60a is in the range of 18 mm to 30 mm, and the depths of the vicinities of the both ends are preferred to be in the range of 23 mm to 50 mm. Further, the width of the slit 60a is in the range of 2 mm to 20 mm, preferably in the range of 3 mm to 10 mm, more preferably in the range of 3 mm to 5 mm. With such a slit shape, the slit shape changes as shown by an allow in FIG. 69C during seating. Specifically, being pulled around the portion below the ischial tuberosities, deformation around the substantially center in the longitudinal direction of the slit is small, and deformation in the vicinities of the both ends thereof becomes large. Accordingly, pressure applied on the seat cushion is applied evenly along the shape of buttocks, and hence evenness of the pressure becomes high. Note that when applied together in the above-described examples 3, 4, the structure of the slit 60a further improves the feeling of seating and hence is preferable.

Figure 70:
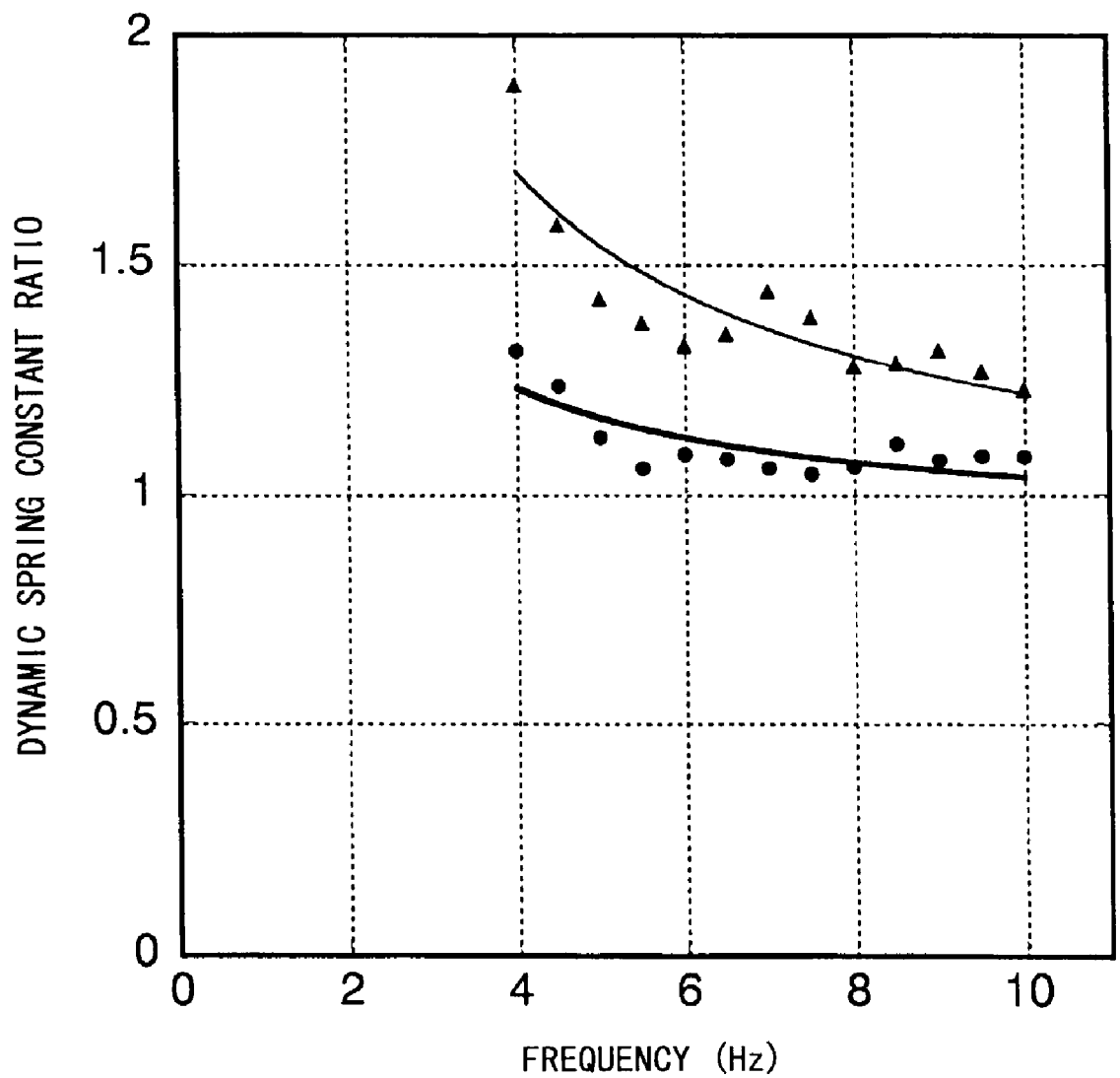
FIG. 70 is a graph of obtaining a ratio kd2/kd1 of dynamic spring constants in a first human body support portion and a second human body support portion when a slit is formed (slit present) and not formed (slit absent) in the seat with the structure shown in FIG. 66.

For example, in the example 6 shown in FIG. 66, uncomfortable feeling may occur since the pad thickness changes. Accordingly, the uncomfortable feeling during seating can be alleviated by providing the slit 60a. FIG. 70 is a graph obtaining the ratio kd2/kd1 of the dynamic spring constants in the first human body support portion 11 and the second human body support portion 12 when the slit 60a is formed (slit present) and not formed (slit absent) in the seat having the structure shown in FIG. 66. Since the rigidity of the layer of the springs arranged under the urethane is high, in this application example, the dynamic spring constant ratio kd2/kd1 is desired to be within 1 to 1.5 because this can give continuous feeling of the support surface. When this ratio becomes too large, support by other spring members with high rigidity is not provided, and loose feeling can be easily felt at 4 Hz. A test is performed such that the weight with a diameter of 98 mm and a mass of 6.7 kg is set to each of the first human body support portion 11 and the second human body support portion 12 and vibration is applied at vibration frequencies of 4 Hz to 10 Hz with a sine wave having one-side amplitude of 1 mm (vertical peak-to-peak amplitude of 2 mm). Further, as shown in FIG. 14 and FIG. 15 described above, regarding minute vibration with one-side amplitude of 1 mm (vertical peak-to-peak amplitude of 2 mm), the example 2 in which kd2/kd1 is close to 1 entirely is more excellent in vibration absorbency (as described above, the vibration absorbency in the high frequency band is high in particular). In FIG. 70, kd2/kd1 is closer to 1 in the case of forming the slit 60a, and thus forming the slit 60a can realize both the supportability of posture and improvement in the vibration absorption characteristic.

EXAMPLE 8

Figure 71:
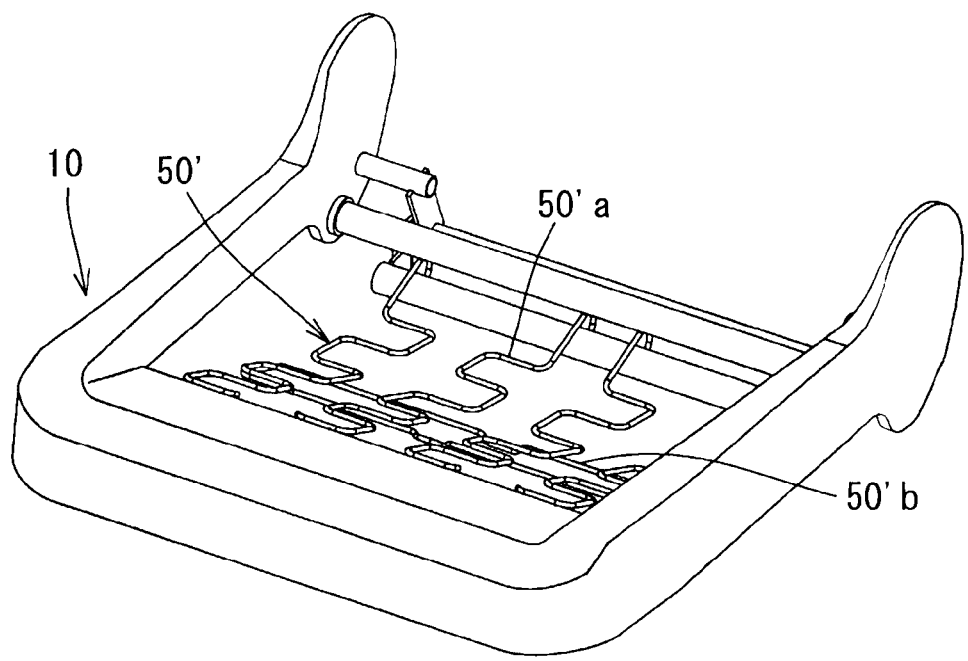
FIG. 71 is a view showing a schematic structure of a seat cushion of a vehicle seat according to example 8.
Figure 72:
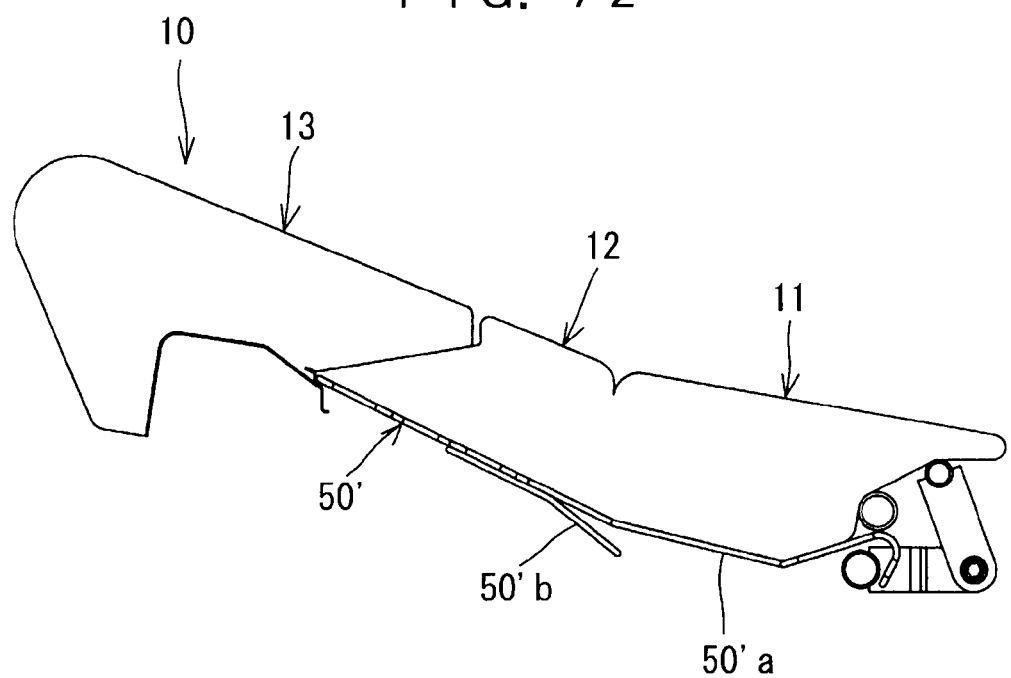
FIG. 72 is a view showing the schematic structure seen from a side face of the seat cushion of the vehicle seat according to the example 8.

Example 8 has almost the same structure as the example 3, and is different in structure of the flat spring member 50'. The flat spring member 50 used in the example 3 is constituted of a combination of a plurality of S-shape springs 50a arranged in the forward/backward direction of the seat cushion and a spring (U-shape spring) 50b stacked on a lower side of the S-shape springs 50a and formed in a substantially U shape coupling the plurality of S-shape springs 50a with each other, as shown in FIG. 62 and FIG. 63. The U-shape spring 50b is fixed to the S-shape springs 50a in the vicinity of the border between the first human body support portion 11 and the second human body support portion 12 so as to cross them when viewed from a side face as shown in FIG. 63. On the other hand, in the example 8, as shown in FIG. 71 and FIG. 72, the vicinity of a rear edge of a U-shape spring 50'b is formed in a shape separated from S-shape springs 50'a, so as not to come in contact with the S-shape springs 50'a. Accordingly, a gap is formed in the vicinity of the rear edge of the U-shape spring 50'b, and hence feeling of spring of the first human body support portion 11 in the vicinity of the ischial tuberosities corresponding to a position that corresponds to the gap becomes softer than in the second human body support portion 12.

Figure 73:
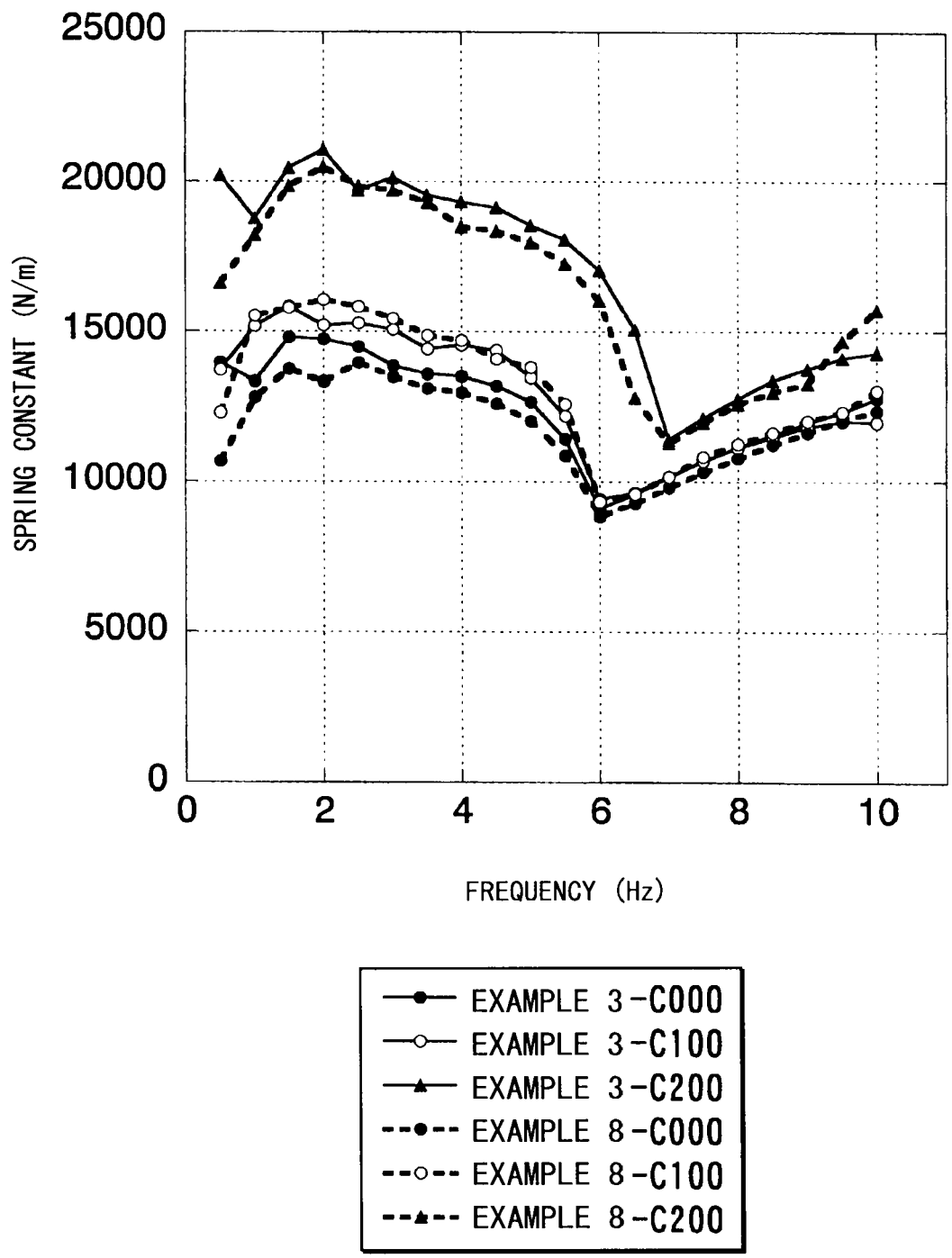
FIG. 73 is a graph comparing the dynamic spring constants in the first human body support portion, the second human body support portion, and the third human body support portion of the example 3 and the example 8.

FIG. 73 compares dynamic spring constants of the first human body support portion 11, the second human body support portion 12, the third human body support portion 13 of the example 3 and the example 8. Basically, there is no significant difference between the both, but the dynamic spring constant in the first human body support portion 11 of the example 8 is slightly lower than that in the example 3. On the other hand, FIG. 74A is a diagram examining a body pressure distribution on the seat cushion of the example 8, and FIG. 75B is a diagram examining a body pressure distribution on the seat cushion of the example 3. The vicinity at a forward-backward distance of 30 cm is the portion corresponding to the ischial tuberosities, but when comparing the both, it can be said that the example 8 is more excellent in body pressure dispersibility. The example 8 is only different from the example 3 in that the U-shape spring 50'b is used, by which the gap is formed with the S-shape springs 50'a in the vicinity of the rear edge. However, the body pressure dispersibility can be improved just by changing the shape of the U-shape spring 50'b in this manner.

Note that in the example 3 to 8, the dynamic spring constant kd1 of the first human body support portion 11, the dynamic spring constant kd2 of the second human body support portion 12, and the dynamic spring constant kd3 of the third human body support portion 13 can satisfy the relationship of kd1<kd2<kd3 as described above, but setting to values satisfying the above-described conditional expressions, namely $1 \leq kd2/kd1 \leq 6$, $1 \leq kd3/kd2 \leq 3$, and $1 \leq kd3/kd1 \leq 7$ can be realized, as a matter of course, by adjusting the elasticity of the various spring members (torsion bars, coil springs, urethane members, flat spring members, and so on) used in the above examples. Further, as described above, the present invention has a structure having characteristics which are different depending on portions with respect to the seat cushion. Specifically, conventionally when the seat cushion and the seat back are compared in a general seat, the seat cushion has an even cushion characteristic with relatively high surface rigidity, whereas the seat back is given a characteristic such that supporting pressure for a cervical vertebra portion or a chest portion is partially high. Considering in this point of view, the present invention can be seen such that, so to speak, the characteristic of the conventional seat back is applied to the seat cushion, the cushion characteristic and support pressure are changed depending on portions, and the characteristic of the conventional seat cushion is applied to the seat back, thereby making a relatively even cushion characteristic with few projections and depressions and high surface rigidity.

It is clarified from the above that a vehicle seat that is excellent in improvement of vibration absorption characteristic, stability of seating posture, and the like can be provided when the dynamic spring constants of the respective human body support portions are set to the predetermined ranges, and further when the static spring constants are set to the predetermined range. Therefore, it is possible to evaluate objectively whether or not it is a vehicle seat able to achieve securing of a high vibration absorption characteristic and a stable seating posture and to alleviate fatigue due to long time seating, by determining using the method performed in the examples whether or not the seat cushion of the vehicle seat satisfies the above-described conditions of the dynamic spring constants and the static spring constants.

The invention claimed is:

1. A vehicle seat comprising:
a plurality of spring members and a seat cushion supporting a human body by operation of the spring members, one of the plurality of spring members functioning dominantly by exhibiting greater reaction force than the other of the plurality of spring members,
the vehicle seat having a structure such that
when a first human body support portion having a center at a position substantially corresponding to a center between the pair of ischial tuberosities of a human body in the seat cushion, and a second human body support portion having a center at a position located forward at a horizontal distance of 100 millimeters along a longitudinal center line of the seat cushion from the first human body support portion are regarded respectively as spring elements made by operation of the plurality of spring members,
a dynamic spring constant kd1 of the first human body support portion and a dynamic spring constant kd2 of the second human body support portion have a relationship of kd1<kd2 and are set so that the second human body support portion becomes a fulcrum of motion during vibration damping operation,
wherein the dynamic spring constants kd1, kd2 are determined such that the one of said plurality of spring members which functions dominantly changes according to an excitation value of the input vibration.

2. The vehicle seat according to claim 1, wherein when a human body support portion having a center at a position located forward at a horizontal distance of 200 millimeters along the longitudinal center line of the seat cushion from the first human body support portion is a third human body support portion, and a dynamic spring constant thereof is kd3, the dynamic spring constants satisfy a relationship of kd1 <kd2 <kd3, and are also set to values which satisfy conditional expressions:

$1 \leq kd2/kd1 \leq 6$, $1 \leq kd3/kd2 \leq 3$, and $1 \leq kd3/kd1 \leq 7$.

3. The vehicle seat according to claim 1, wherein the dynamic spring constants are values each obtained by matching a center of a weight with a diameter of 98 millimeters with a center of each of the human body support portions and applying vibration at a predetermined frequency, with a state that the weight is stable under its own weight being an origin point of the vibration.

4. The vehicle seat according to claim 1, wherein static spring constants, obtained from a load-displacement characteristic when a center of a pressure board with a diameter of 200 millimeters is matched with the center of each of the human body support portions and pressure is applied, are ks1>ks2, where ks1 is a static spring constant of the first human body support portion, and ks2 is a static spring constant of the second human body support portion.

5. The vehicle seat according to claim 1, wherein the center of the first human body support portion is set forward at a horizontal distance in a range of 50 millimeters to 150 millimeters from a border between a seat back and the seat cushion along the longitudinally center line of the seat cushion.

6. The vehicle seat according to claim 5, wherein the center of the first human body support portion is set to a position located forward at a horizontal distance of 100 millimeters from a border between a seat back and the seat cushion along the longitudinal center line of the seat cushion.

7. The vehicle seat according to claim 2, wherein the seat cushion is structured comprising a flat support member stretched elastically in a forward/backward direction and in a leftward/rightward direction.

8. The vehicle seat according to claim 7, wherein a rear edge portion of the flat support member is coupled to a rear spring member disposed on a rear portion of the seat cushion.

9. The vehicle seat according to claim 8, wherein the rear spring member is a torsion bar arranged along a width direction of the seat cushion, and a rear edge portion of the flat support member is coupled to a support frame coupled to an arm member attached to the torsion bar.

10. The vehicle seat according to claim 8, wherein the rear spring member is a coil spring engaged with a rear end frame arranged on a rear end of the seat cushion.

11. The vehicle seat according to claim 8, further comprising a front spring member provided in a front portion of the seat cushion by engaging with a front edge portion of the flat support member so as to support elastically the flat support member together with the rear spring member.

12. The vehicle seat according to claim 11, wherein the front spring member is a torsion bar arranged along a width direction of the seat cushion, and a front edge portion of the flat support member is coupled to a support frame coupled to an arm member attached to the torsion bar.

13. The vehicle seat according to claim 7, wherein on each of side edge portions of the flat support member, side spring members are disposed, which are hooked across each of the side edge portions and each of side frames of the seat cushion, and a combined spring constant of all the side spring members is higher than a combined spring constant of the rear spring member.

14. The vehicle seat according to claim 13, wherein among the side spring members, at least a side spring member disposed closest to a rear end of the seat cushion is disposed at a position corresponding to a region between the center of the first human body support portion and the center of the second human body support portion.

15. The vehicle seat according to claim 7, further comprising a urethane member disposed on an upper portion of the flat support member on a front edge portion of the seat cushion, wherein the center of the third human body support portion is located in a range where the urethane member is disposed.

16. The vehicle seat according to claim 15, wherein the urethane member is provided rotatably forward.

17. The vehicle seat according to claim 15, wherein a three-dimensional knitted fabric covering the urethane member disposed on the flat support member and the front edge portion of the seat cushion is supported on a cushion frame constituting the seat cushion with an extension ratio of 5% or lower in an equilibrium state during seating.

18. The vehicle seat according to claim 1, wherein the seat cushion is structured having a flat support member stretched elastically in a forward/backward direction, and
- an auxiliary flat support member stacked on the flat support member and provided to be stretched in a leftward/rightward direction so that a substantially center portion of a rear end edge is located at a position between 50 millimeters and less than 100 millimeters along the longitudinal center line of the seat cushion from the center of the first human body support portion,
- wherein the center of the first human body support portion is located on the flat support member and the center of the second human body support portion is located in a range where the flat support member and the auxiliary flat support member are stacked.

19. The vehicle seat according to claim 18, wherein on each of side edge portions of the auxiliary flat support member, side spring members are disposed, which are hooked across each of the side edge portions and each of side frames of the seat cushion, and a combined spring constant of all the side spring members is higher than a combined spring constant of the rear spring member.

20. The vehicle seat according to claim 1, wherein the seat cushion is structured having a flat spring member and a urethane member disposed on an upper portion of the flat spring member,
- wherein the urethane member has a slit carved with a predetermined depth with a width direction of the seat cushion being a longitudinal direction thereof, at a position between 50 millimeters and less than 100 millimeters along the longitudinal center line of the seat cushion from the center of the first human body support portion, and
- wherein the center of the first human body support portion is located closer to a rear portion than the slit, and the center of the second human body support portion is located closer to a front portion than the slit.

21. The vehicle seat according to claim 20, wherein the slit is formed with a length of 160 millimeters to 240 millimeters substantially perpendicularly to the longitudinal center line of the seat cushion, and a depth of the slit in a vicinity of a substantially center in a longitudinal direction is shallower than in vicinities of both ends thereof.

22. The vehicle seat according to claim 20, wherein a portion of the urethane member that includes a third human body support portion around a position located forward at a horizontal distance of 200 millimeters along the longitudinally center line of the seat cushion from the first human body support portion is provided rotatably forward.

23. The vehicle seat according to claim 22, wherein a separation slit is formed on a border between a portion including a third human body support portion around a position located forward at a horizontal distance of 200 millimeters along the longitudinally center line of the seat cushion from the first human body support portion and a portion including the second human body support portion, and the portion including the third human body support portion is rotatable forward with the separation slit being a border.

24. The vehicle seat according to claim 22, wherein a barycenter of the portion including the third human body support portion is set on a more front side than a center of forward rotation of the portion.

25. A vehicle seat comprising:
- a plurality of spring members and a seat cushion supporting a human body by operation of the spring members, one of the spring members functioning dominantly by exhibiting greater reaction force than the other of the plurality of spring members,
- the vehicle seat having a structure such that
- when a first human body support portion having a center at a position substantially corresponding to a center between the pair of ischial tuberosities of a human body in the seat cushion, and a second human body support portion having a center at a position located forward at a horizontal distance of 100 millimeters along a longitudinal center line of the seat cushion from the first human body support portion are regarded respectively as spring elements made by operation of the plurality of spring members,
- a dynamic spring constant $kd1$ of the first human body support portion and a dynamic spring constant $kd2$ of the second human body support portion have a relationship of $kd1<kd2$ and are set so that the second human body support portion becomes a fulcrum of motion during vibration damping operation,
- wherein the dynamic spring constants $kd1$, $kd2$ are determined such that the one of said plurality of spring members which functions dominantly changes according to an excitation value of the input vibration,
- wherein static spring constants, obtained from a load-displacement characteristic when a center of a pressure board with a diameter of 200 millimeters is matched with the center of each of the human body support portions and pressure is applied, are $ks1>ks2$, where $ks1$ is a static spring constant of the first human body support portion, and $ks2$ is a static spring constant of the second human body support portion,
- wherein the seat cushion is structured comprising a flat support member stretched elastically in a forward/backward direction,
- wherein a rear edge portion of the flat support member is coupled to a rear spring member disposed on a rear portion of the seat cushion,
- further comprising a front spring member provided in a front portion of the seat cushion by engaging with a front edge portion of the flat support member so as to support elastically the flat support member together with the rear spring member,
- wherein the front spring member is a torsion bar arranged along a width direction of the seat cushion, and a front edge portion of the flat support member is coupled to a support frame coupled to an arm member attached to the torsion bar.

* * * * *